(12) United States Patent
Tsai et al.

(10) Patent No.: US 8,649,113 B1
(45) Date of Patent: Feb. 11, 2014

(54) OPTICAL IMAGE CAPTURING LENS SYSTEM

(75) Inventors: Tsung-Han Tsai, Taichung (TW); Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 13/612,201

(22) Filed: Sep. 12, 2012

(30) Foreign Application Priority Data

Jul. 27, 2012 (TW) .............................. 101127138 A

(51) Int. Cl.
*G02B 3/02* (2006.01)
*G02B 9/60* (2006.01)
(52) U.S. Cl.
USPC ............ 359/714; 359/740; 359/763; 359/770
(58) Field of Classification Search
USPC .................................. 359/714, 740, 763, 770
See application file for complete search history.

(56) References Cited

U.S. PATENT DOCUMENTS

| | | | |
|---|---|---|---|
| 7,446,955 B1 | 11/2008 | Noda | |
| 8,179,470 B2 * | 5/2012 | Chen et al. | 348/335 |
| 8,488,259 B2 * | 7/2013 | Chen et al. | 359/764 |
| 2011/0115962 A1 * | 5/2011 | Chen et al. | 348/335 |
| 2012/0327520 A1 * | 12/2012 | Tsai et al. | 359/714 |
| 2012/0327522 A1 * | 12/2012 | Tsai et al. | 359/715 |

* cited by examiner

*Primary Examiner* — Evelyn A. Lester
(74) *Attorney, Agent, or Firm* — Morris Manning & Martin LLP; Tim Tingkang Xia, Esq.

(57) ABSTRACT

This invention provides an optical image capturing lens system comprising: a negative first lens element having a convex object-side surface and a concave image-side surface at the paraxial region; a positive second lens element; a negative third lens element; a positive fourth lens element having a convex image-side surface at the paraxial region; and a negative plastic fifth lens element having a convex object-side surface at the paraxial region as well as a concave at the paraxial region and convex at the peripheral region image-side surface, at least one of the object-side and image-side surfaces being aspheric. The optical image capturing lens system of the present invention effectively increases the angle of view to a proper range and suppresses the distortion. In addition, the present invention has a tighter arrangement of the lens elements and a smaller back focal length, and therefore is more appropriate for the compact device.

30 Claims, 26 Drawing Sheets

OPTICAL IMAGE CAPTURING LENS SYSTEM

CROSS-REFERENCE TO RELATED APPLICATION

This non-provisional application claims priority under 35 U.S.C. §119(a) on Patent Application No. 101127138 filed in Taiwan (R.O.C.) on Jul. 27, 2012, the entire contents of which are hereby incorporated by reference.

BACKGROUND OF THE INVENTION

1. Field of the Invention

The present invention relates to an optical image capturing lens system, and more particularly, to a compact optical image capturing lens system used in electronic products.

2. Description of the Prior Art

The demand for compact imaging lens assembly has grown in recent years as the popularity of portable electronic products with the photographing function has increased. The sensor of a general photographing camera is none other than CCD (Charge Coupled Device) or CMOS (Complementary Metal Oxide Semiconductor Sensor). Furthermore, as advanced semiconductor manufacturing technology has allowed the pixel size of sensors to be reduced, and the current electronic products are leaning toward a trend of being more compact, there is an increasing demand for compact imaging lens assembly featuring better image quality.

Imaging lenses used in vehicle cameras, security surveillance cameras or electronic game devices typically require a larger field of view to capture an image of a larger area at one time. Generally, a conventional imaging lens assembly with a large angle of view, such as the four-element lens assembly disclosed in U.S. Pat. No. 7,446,955, is arranged in such manner that the front lens group has negative refractive power and the rear lens group has positive refractive power, thereby forming an inverse telephoto structure to achieve a wide field of view. While such arrangement facilitates the enlargement of the field of view, the aberration correction of the optical system is ineffective due to the inclusion of only one lens element in the rear lens group. Moreover, vehicles equipped with rear-view cameras have become more and more common, and there is a trend toward high-resolution, wide-angle lenses for rear-view cameras. Therefore, a need exists in the art for a wide-angle imaging lens assembly, which has a wide field of view, high image quality and a moderate total track length.

SUMMARY OF THE INVENTION

Through the arrangement depicted below, the optical image capturing lens system of the present invention allows the angle of view to increase effectively to a proper range and to suppress the distortion produced by the wide-angle lens system with a large angle of view. In addition, when comparing to other image lens systems with a large angle of view, the present invention has a tighter arrangement of the lens elements and a smaller back focal length, and therefore is more appropriate for the compact device.

The present invention provides an optical image capturing lens system comprising, in order from an object side to an image side: a first lens element with negative refractive power having a convex object-side surface at paraxial region and a concave image-side surface at the paraxial region; a second lens element with positive refractive power; a third lens element with negative refractive power; a fourth lens element with positive refractive power having a convex image-side surface at the paraxial region; a fifth lens element with negative refractive power having a convex object-side surface at the paraxial region as well as a concave at the paraxial region and convex at a peripheral region image-side surface, at least one of an object-side surface and the image-side surface thereof being aspheric, and the fifth lens element is made of plastic; and the lens elements of the optical image capturing lens system with refractive power are the first lens element, the second lens element, the third lens element, the fourth lens element and the fifth lens element; wherein a focal length of the optical image capturing lens system is f, a focal length of the first lens element is f1, an axial distance between the object-side surface of the first lens element and the image-side surface of the fifth lens element of the optical image capturing lens system is Td, a sum of central thicknesses of all lens elements with refractive power of the optical image capturing lens system is $\Sigma CT$, the central thickness of the fourth lens element is CT4, and they satisfy the following relations: $-0.33 < f/f1 < 0$; $1.0 < Td/\Sigma CT < 1.33$; and $0.15 < CT4/f < 0.60$.

On the other hand, the present invention provides an optical image capturing lens system comprising, in order from an object side to an image side: a first lens element with negative refractive power; a second lens element with positive refractive power; a third lens element with negative refractive power; a fourth lens element with positive refractive power having a convex image-side surface at the paraxial region; a fifth lens element with negative refractive power having a concave image-side surface at the paraxial region and convex shape at the peripheral region, at least one of an object-side surface and the image-side surface thereof being aspheric, and the fifth lens element is made of plastic; and the lens elements of the optical image capturing lens system with refractive power are the first lens element, the second lens element, the third lens element, the fourth lens element and the fifth lens element; wherein a focal length of the optical image capturing lens system is f, a focal length of the first lens element is f1, an axial distance between the object-side surface of the first lens element and the image-side surface of the fifth lens element of the optical image capturing lens system is Td, a sum of central thicknesses of all lens elements with refractive power of the optical image capturing lens system is $\Sigma CT$, a curvature radius of the object-side surface of the fifth lens element is R9, a curvature radius of the image-side surface of the fifth lens element is R10, and they satisfy the following relations: $-0.33 < f/f1 < 0$; $1.0 < Td/\Sigma CT < 1.33$; and $0 < |R10/R9| < 0.70$.

Furthermore, the present invention provides an optical image capturing lens system comprising, in order from an object side to an image side: a first lens element with negative refractive power having a convex object-side surface at paraxial region and a concave image-side surface at the paraxial region; a second lens element with positive refractive power having a convex object-side surface at paraxial region; a third lens element with negative refractive power having a concave or plane object-side surface at the paraxial region, both of the object-side and the image-side surfaces thereof being aspheric, and the third lens element is made of plastic; a fourth lens element with positive refractive power having a concave object-side surface at the paraxial region and a convex image-side surface at the paraxial region, both of the object-side and the image-side surfaces thereof being aspheric, and the fourth lens element is made of plastic; a fifth lens element with negative refractive power having a convex object-side surface at the paraxial region as well as a concave at the paraxial region and convex at a peripheral region image-side surface, both of the object-side and the image-side surfaces thereof being aspheric, and the fifth lens element is made of plastic; the lens elements of the optical image capturing lens system with refractive power are the first lens element, the second lens element, the third lens element, the fourth lens element and the fifth lens element; and the optical image capturing lens system further comprises a stop disposed between an object and the second lens element; wherein a focal length of the optical image capturing lens system is f, a focal length of the first lens element is f1, an axial distance between the object-side surface of the first lens element and the image-side surface of the fifth lens element of the optical image capturing lens system is Td, a sum of central thicknesses of all lens elements with refractive power of the optical image capturing lens system is ΣCT, the central thickness of the fourth lens element is CT4, and they satisfy the following relations: $-0.45 < f/f1 < 0$; and $1.0 < Td/\Sigma CT < 1.33$.

In the aforementioned optical image capturing lens system, the first lens element has negative refractive power, and thereby it is favorable for enlarging the field of view of the system. When the second lens element has positive refractive power, and thereby can provide significant refractive power needed for the system and is favorable for reducing the total track length thereof. When the third lens element has negative refractive power, the aberrations produced by the second lens element can be effectively corrected. When the fourth lens element has positive refractive power, the positive refractive power of the second lens element can be effectively distributed for reducing the sensitivity of the system. Moreover, when the fourth lens element has positive refractive power and the fifth lens element has negative refractive power, a positive-negative telephoto structure is formed so that the back focal length of the system is favorably reduced for shortening the total track length of the system.

In the aforementioned optical image capturing lens system, when the first lens element has a convex object-side surface at the paraxial region and a concave image-side surface at the paraxial region, the field of view of the lens system can be favorably enlarged, and the refraction of the incident light is more moderate for preventing the aberrations from being excessively large; therefore, it is favorable for obtaining a better balance between wide field of view and aberration corrections. When the second lens element has a convex object-side surface at the paraxial region, it favorably corrects astigmatic aberrations produced by the first lens element having a concave image-side surface with a stronger curvature. When the third lens element has a concave object-side surface at the paraxial region and a concave image-side surface at the paraxial region, it effectively reinforces the negative refractive power of the third lens element for favorably correcting the aberrations of the lens system. Additionally, when the third lens element has a concave image-side surface at the paraxial region and convex shape at the peripheral region, it favorably corrects the astigmatic aberrations of the optical image capturing lens system thereby. When the fourth lens element has a concave object-side surface at the paraxial region and a convex image-side surface at the paraxial region, it favorably corrects the astigmatism of the lens system. When the fifth lens element has a concave image-side surface at the paraxial region, the principal point of the system can be positioned away from the image plane so that the back focal length of the system is favorably reduced for shortening the total track length in order to keep the system compact. Besides, when the fifth lens element has a concave image-side surface at the paraxial region and convex shape at the peripheral region, the angle at which light projects onto the image sensor from the off-axis field can be effectively reduced so that the sensing efficiency of the image sensor can be improved and the off-axis aberrations can be further corrected.

DETAILED DESCRIPTION OF THE PREFERRED EMBODIMENTS

Figure 1A:
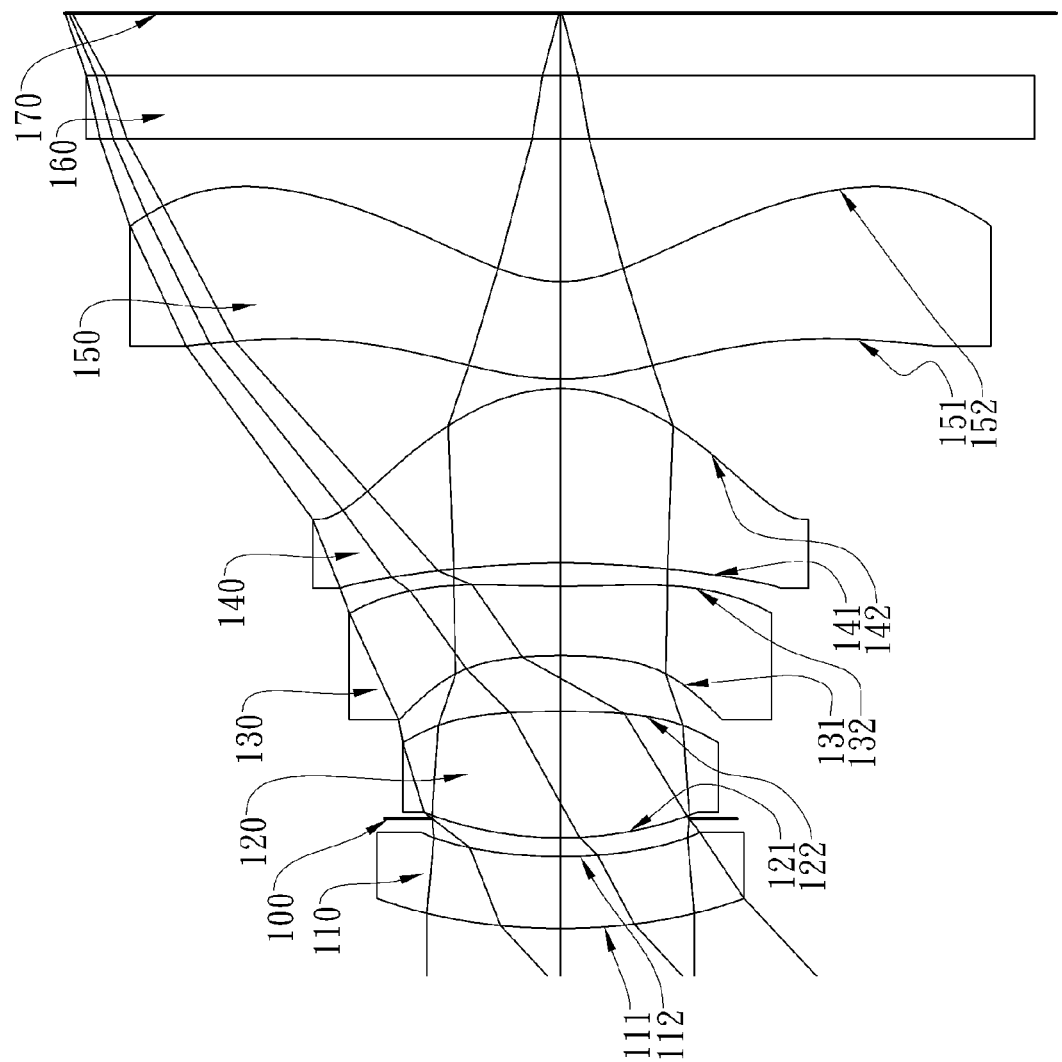
FIG. 1A shows an optical image capturing lens system in accordance with the first embodiment of the present invention.

The present invention provides an optical image capturing lens system comprising, in order from an object side to an image side: a first lens element with negative refractive power having a convex object-side surface at paraxial region and a concave image-side surface at the paraxial region; a second lens element with positive refractive power; a third lens element with negative refractive power; a fourth lens element with positive refractive power having a convex image-side surface at the paraxial region; a fifth lens element with negative refractive power having a convex object-side surface at the paraxial region as well as a concave at the paraxial region and convex at a peripheral region image-side surface, at least one of an object-side surface and the image-side surface thereof being aspheric, and the fifth lens element is made of plastic; and the lens elements of the optical image capturing lens system with refractive power are the first lens element, the second lens element, the third lens element, the fourth lens element and the fifth lens element; wherein a focal length of the optical image capturing lens system is f, a focal length of the first lens element is f1, an axial distance between the object-side surface of the first lens element and the image-side surface of the fifth lens element of the optical image capturing lens system is Td, a sum of central thicknesses of all lens elements with refractive power of the optical image capturing lens system is $\Sigma CT$, the central thickness of the fourth lens element is CT4, and they satisfy the following relations: $-0.33 < f/f1 < 0$; $1.0 < Td/\Sigma CT < 1.33$; and $0.15 < CT4/f < 0.60$.

When the relation of $-0.33 < f/f1 < 0$ is satisfied, the field of view of the lens system can be enlarged, and the refraction of the incident light is more moderate for preventing the aberrations from being excessively large; therefore, it is favorable for obtaining a better balance between wide field of view and aberration corrections; preferably, the following relation is satisfied: $-0.25 \leq f/f1 < 0$.

When the relation of $1.0 < Td/\Sigma CT < 1.33$ is satisfied, the central thickness of the lens elements are more favorable for manufacturing and molding in order to raise the yield rate, resulting in a more condensed arrangement and keeping the system compact; preferably, the following relation is satisfied: $1.05 < Td/\Sigma CT \leq 1.25$.

When the relation of $0.15 < CT4/f < 0.60$ is satisfied, the central thickness of the fourth lens element is better suited for obtaining a good balance between the manufacturing yields and correcting the aberrations of the system.

In the aforementioned optical image capturing lens system, an Abbe number of the second lens element is V2, an Abbe number of the third lens element is V3, and they preferably satisfy the following relation: $1.5 < V2/V3 < 3.0$. When the above relation is satisfied, the chromatic aberration of the system can be favorably corrected.

In the aforementioned optical image capturing lens system, an axial distance between the third lens element and the fourth lens element is T34, an axial distance between the fourth lens element and the fifth lens element is T45, a central thickness of the fourth lens element is CT4, and they preferably satisfy the following relation: $0.10 < (T34+T45)/CT4 < 0.50$. When the above relation is satisfied, the arrangement for each lens element is more suitable for assembling with an appropriate total track length.

In the aforementioned optical image capturing lens system, a curvature radius of the object-side surface of the fifth lens element is R9, a curvature radius of the image-side surface of the fifth lens element is R10, and they preferably satisfy the following relation: $0 < |R10/R9| < 0.70$. When the above relation is satisfied, the principal point of the system can be positioned away from the image plane so that the total track length is shortened to keep the system compact.

In the aforementioned optical image capturing lens system, the maximal field of view of the optical image capturing lens system is FOV, and preferably, when it satisfies the following relation: 72 degrees<FOV<95 degrees, the angle of view of the optical image capturing lens system is more suitable.

In the aforementioned optical image capturing lens system, the system further comprises a stop, an axial distance between the aperture stop and the image-side surface of the second lens element is Dsr4, an axial distance between the object-side surface of the first lens element and the image-side surface of the second lens element is Dr1r4, and they preferably satisfy the following relation: $0.30 < Dsr4/Dr1r4 < 0.95$. When the above relation is satisfied, the relative position of the aperture stop and the nearby lens elements thereof can be effectively controlled for improving the sensing efficiency and image quality.

In the aforementioned optical image capturing lens system, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and preferably, when T23 has the largest axial distance among T12, T23, T34, T45, it is favorable for the second lens element to correct the field curvature.

On the other hand, the present invention provides an optical image capturing lens system comprising, in order from an object side to an image side: a first lens element with negative refractive power; a second lens element with positive refractive power; a third lens element with negative refractive power; a fourth lens element with positive refractive power having a convex image-side surface at the paraxial region; a fifth lens element with negative refractive power having a concave image-side surface at the paraxial region and convex shape at the peripheral region, at least one of an object-side surface and the image-side surface thereof being aspheric, and the fifth lens element is made of plastic; and the lens elements of the optical image capturing lens system with refractive power are the first lens element, the second lens element, the third lens element, the fourth lens element and the fifth lens element; wherein a focal length of the optical image capturing lens system is f, a focal length of the first lens element is f1, an axial distance between the object-side surface of the first lens element and the image-side surface of the fifth lens element of the optical image capturing lens system is Td, a sum of central thicknesses of all lens elements with refractive power of the optical image capturing lens system is $\Sigma CT$, a curvature radius of the object-side surface of the fifth lens element is R9, a curvature radius of the image-side surface of the fifth lens element is R10, and they satisfy the following relations: $-0.33 < f/f1 < 0$; $1.0 < Td/\Sigma CT < 1.33$; and $0 < |R10/R9| < 0.70$.

When the relation of $-0.33 < f/f1 < 0$ is satisfied, the field of view of the lens system can be enlarged, and the refraction of the incident light is more moderate for preventing the aberrations from being excessively large; therefore, it is favorable for obtaining a better balance between wide field of view and aberration corrections; preferably, the following relation is satisfied: $-0.25 \leq f/f1 < 0$.

When the relation of $1.0 < Td/\Sigma CT < 1.33$ is satisfied, the central thickness of the lens elements are more favorable for manufacturing and molding in order to raise the yield rate, resulting in a more condensed arrangement and keeping the system compact; preferably, the following relation is satisfied: $1.05 < Td/\Sigma CT \leq 1.25$.

When the relation of $0 < |R10/R9| < 0.70$ is satisfied, the principal point of the system can be positioned away from the image plane so that the total track length is shortened to keep the system compact.

In the aforementioned optical image capturing lens system, a curvature radius of the object-side surface of the fourth lens element is R7, a curvature radius of the image-side surface of the fourth lens element is R8, and they preferably satisfy the following relation: $0.75 < (R7+R8)/(R7-R8) < 2.5$. When the above relation is satisfied, the curvature of the fourth lens element is more suitable and thereby the aberration of the system can be corrected favorably.

In the aforementioned optical image capturing lens system, the system further comprises an aperture stop, an axial distance between the aperture stop and the image-side surface of the second lens element is Dsr4, an axial distance between the object-side surface of the first lens element and the image-side surface of the second lens element is Dr1r4, and they preferably satisfy the following relation: $0.30 < Dsr4/Dr1r4 < 0.95$. When the above relation is satisfied, the relative position of the aperture stop and the nearby lens elements thereof can be effectively controlled for arrangement and assembly of the lens elements and the aperture stop.

In the aforementioned optical image capturing lens system, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and preferably, when T23 has the largest axial distance among T12, T23, T34, T45, it is favorable for the second lens element to correct the field curvature.

In the aforementioned optical image capturing lens system, an axial distance between the object-side surface of the first lens element and the image-side surface of the fifth lens element of the optical image capturing lens system is Td, a sum of central thicknesses of all lens elements with refractive power of the optical image capturing lens system is $\Sigma CT$, and they preferably satisfy the following relation: $1.05 < Td/\Sigma CT \leq 1.25$. When the above relation is satisfied, the central thickness of the lens elements are more favorable for manufacturing and molding in order to raise the yield rate, resulting in a more condensed arrangement and keeping the system compact.

In the aforementioned optical image capturing lens system, an Abbe number of the second lens element is V2, an Abbe number of the third lens element is V3, and they preferably satisfy the following relation: $1.5 < V2/V3 < 3.0$. When the above relation is satisfied, the chromatic aberration of the system can be favorably corrected.

In the aforementioned optical image capturing lens system, the maximal field of view of the optical image capturing lens system is FOV, and preferably, when it satisfies the following relation: 72 degrees<FOV<95 degrees, the angle of view of the optical image capturing lens system is more suitable.

Furthermore, the present invention provides an optical image capturing lens system comprising, in order from an object side to an image side: a first lens element with negative refractive power having a convex object-side surface at paraxial region and a concave image-side surface at the paraxial region; a second lens element with positive refractive power having a convex object-side surface at paraxial region; a third lens element with negative refractive power having a concave or plane object-side surface at the paraxial region, both of the object-side and the image-side surfaces thereof being aspheric, and the third lens element is made of plastic; a fourth lens element with positive refractive power having a concave object-side surface at the paraxial region and a convex image-side surface at the paraxial region, both of the object-side and the image-side surfaces thereof being aspheric, and the fourth lens element is made of plastic; a fifth lens element with negative refractive power having a convex object-side surface at the paraxial region as well as a concave at the paraxial region and convex at a peripheral region image-side surface, both of the object-side and the image-side surfaces thereof being aspheric, and the fifth lens element is made of plastic; the lens elements of the optical image capturing lens system with refractive power are the first lens element, the second lens element, the third lens element, the fourth lens element and the fifth lens element; and the optical image capturing lens system further comprises an aperture stop disposed between an object and the second lens element; wherein a focal length of the optical image capturing lens system is f, a focal length of the first lens element is f1, an axial distance between the object-side surface of the first lens element and the image-side surface of the fifth lens element of the optical image capturing lens system is Td, a sum of central thicknesses of all lens elements with refractive power of the optical image capturing lens system is $\Sigma CT$, the central thickness of the fourth lens element is CT4, and they satisfy the following relations: $-0.45 < f/f1 < 0$; and $1.0 < Td/\Sigma CT < 1.33$.

When the relation of $-0.45 < f/f1 < 0$ is satisfied, the field of view of the lens system can be enlarged, and the refraction of the incident light is more moderate for preventing the aberrations from being excessively large; therefore, it is favorable for obtaining a better balance between wide field of view and aberration corrections.

When the relation of $1.0 < Td/\Sigma CT < 1.33$ is satisfied, the central thickness of the lens elements are more favorable for manufacturing and molding in order to raise the yield rate, resulting in a more condensed arrangement and keeping the system compact; preferably, the following relation is satisfied: $1.05 < Td/\Sigma CT \leq 1.25$.

In the aforementioned optical image capturing lens system, the system further comprises an aperture stop, an axial distance between the aperture stop and the image-side surface of the second lens element is Dsr4, an axial distance between the object-side surface of the first lens element and the image-side surface of the second lens element is Dr1r4, and they preferably satisfy the following relation: $0.30 < Dsr4/Dr1r4 < 0.95$. When the above relation is satisfied, the relative position of the aperture stop and the nearby lens elements thereof can be effectively controlled for arrangement and assembly of the lens elements and the aperture stop.

In the aforementioned optical image capturing lens system, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and preferably, when T23 has the largest axial distance among T12, T23, T34, T45, it is favorable for the second lens element to correct the field curvature.

In the aforementioned optical image capturing lens system, a curvature radius of the object-side surface of the fifth lens element is R9, a curvature radius of the image-side surface of the fifth lens element is R10, and they preferably satisfy the following relation: 0<|R10/R9|<0.70. When the above relation is satisfied, the principal point of the system can be positioned away from the image plane so that the total track length is shortened to keep the system compact.

In the aforementioned optical image capturing lens system, the lens elements can be made of glass or plastic material. If the lens elements are made of glass, the freedom for distributing the refractive power of the optical image capturing lens system can be increased. If plastic material is adopted to produce the lens elements, the production cost will be reduced effectively. Furthermore, the surfaces of the lens elements can be aspheric and easily made into non-spherical profiles, allowing more design parameter freedom which can be used to reduce aberrations and the number of the lens elements used in an optical system. Consequently, the total track length of the optical image capturing lens system can be effectively reduced.

In the present optical image capturing lens system of the present invention, if a lens element has a convex surface, it means the portion of the surface in proximity to the axis is convex; if a lens element has a concave surface, it means the portion of the surface in proximity to the axis is concave.

In the present optical image capturing lens system, there can be at least one stop provided, such as an aperture stop, a glare stop or a field stop. Said glare stop or field stop for eliminating the stray light and thereby improving the image resolution thereof. Moreover, in the present optical image capturing lens system, the aperture stop can be configured as a front stop (before the first lens element), a middle stop (between the first lens element and the image plane), or disposed before the image plane, and the configuration of the aperture stop is decided based on the plan of the optical designer.

Preferred embodiments of the present invention will be described in the following paragraphs by referring to the accompanying drawings.

Embodiment 1

Figure 1B:
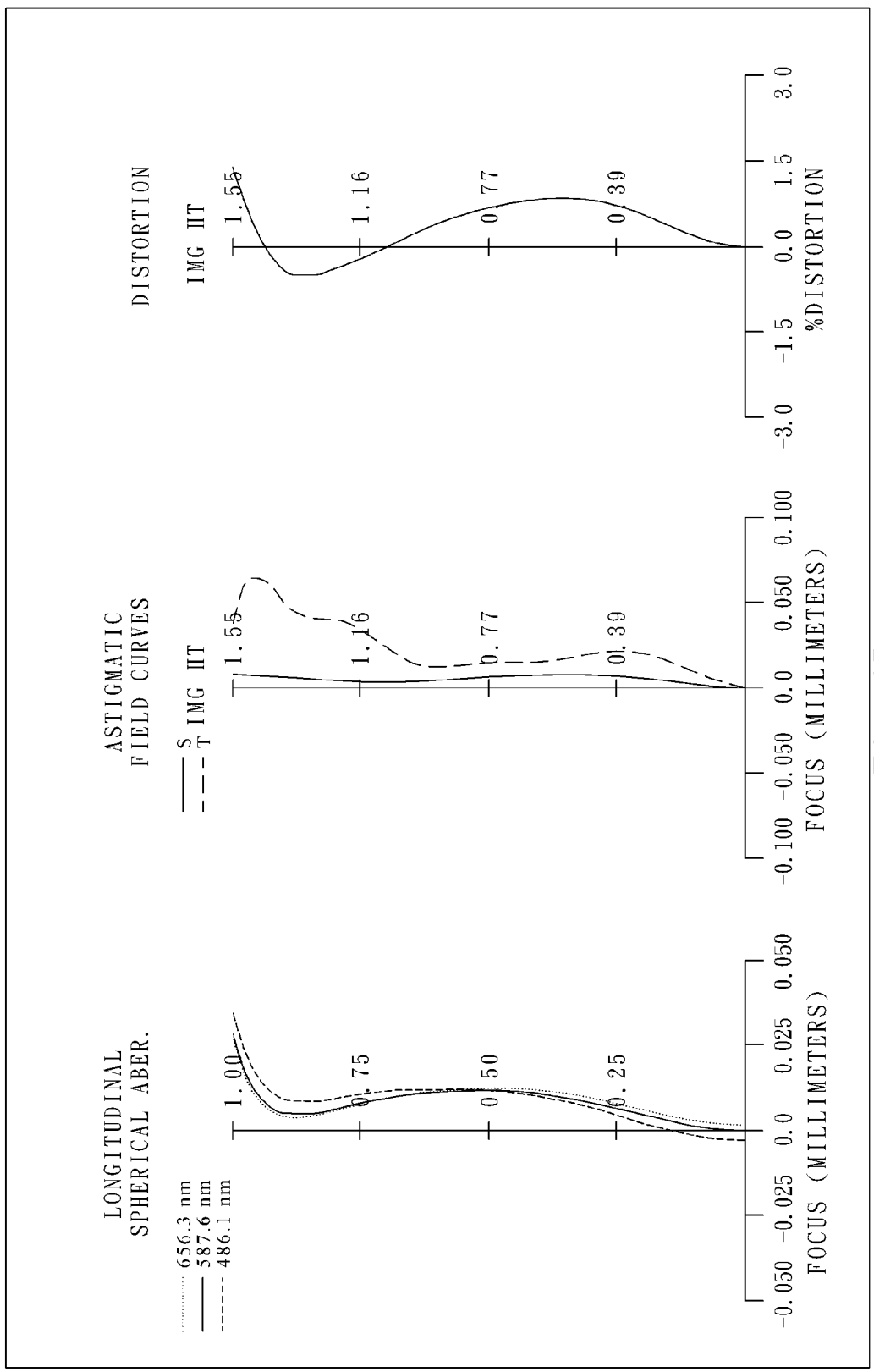
FIG. 1B shows the aberration curves of the first embodiment of the present invention.

FIG. 1A shows an optical image capturing lens system in accordance with the first embodiment of the present invention, and FIG. 1B shows the aberration curves of the first embodiment of the present invention. The optical image capturing lens system of the first embodiment of the present invention mainly comprises five lens elements with refractive power, in order from an object side to an image side:

a plastic first lens element 110 with negative refractive power having a convex object-side surface 111 at the paraxial region and a concave image-side surface 112 at the paraxial region, the object-side and image-side surfaces 111 and 112 thereof being aspheric;

a plastic second lens element 120 with positive refractive power having a convex object-side surface 121 at the paraxial region and a convex image-side surface 122 at the paraxial region, the object-side and image-side surfaces 121 and 122 thereof being aspheric;

a plastic third lens element 130 with negative refractive power having a concave object-side surface 131 at the paraxial region and a concave image-side surface 132 at the paraxial region and convex shape at the peripheral region, the object-side and image-side surfaces 131 and 132 thereof being aspheric;

a plastic fourth lens element 140 with positive refractive power having a concave object-side surface 141 at the paraxial region and a convex image-side surface 142 at the paraxial region, the object-side and image-side surfaces 141 and 142 thereof being aspheric; and a plastic fifth lens element 150 with negative refractive power having a convex object-side surface 151 at the paraxial region and a concave image-side surface 152 at the paraxial region and convex shape at the peripheral region, the object-side and image-side surfaces 151 and 152 thereof being aspheric;

wherein the lens elements of the optical image capturing lens system with refractive power are five lens elements which are the first lens element 110, the second lens element 120, the third lens element 130, the fourth lens element 140 and the fifth lens element 150;

wherein an aperture stop 100 is disposed between the first lens element 110 and the second lens element 120;

the optical image capturing lens system further comprises an IR filter 160 disposed between the image-side surface 152 of the fifth lens element 150 and an image plane 170, and the IR filter 160 is made of glass and has no influence on the focal length of the optical image capturing lens system.

The detailed optical data of the first embodiment is shown in TABLE 1, and the aspheric surface data is shown in TABLE 2, wherein the units of the curvature radius, the central thickness and the focal length are expressed in mm, and HFOV is defined as half of the maximal field of view.

TABLE 1

(Embodiment 1)
f = 3.56 mm, Fno = 1.90, HFOV = 37.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.915 | ASP | 0.227 | Plastic | 1.640 | 23.3 | −15.88 |
| 2 | | 1.537 | ASP | 0.120 | | | | |
| 3 | Ape. Stop | Plano | | −0.061 | | | | |
| 4 | Lens 2 | 1.165 | ASP | 0.399 | Plastic | 1.535 | 56.3 | 1.71 |
| 5 | | −3.779 | ASP | 0.175 | | | | |
| 6 | Lens 3 | −2.128 | ASP | 0.220 | Plastic | 1.640 | 23.3 | −2.03 |
| 7 | | 3.456 | ASP | 0.073 | | | | |
| 8 | Lens4 | −2.564 | ASP | 0.551 | Plastic | 1.535 | 56.3 | 1.09 |
| 9 | | −0.510 | ASP | 0.030 | | | | |
| 10 | Lens 5 | 0.804 | ASP | 0.307 | Plastic | 1.535 | 56.3 | −2.12 |
| 11 | | 0.408 | ASP | 0.450 | | | | |
| 12 | IR-filter | Plano | | 0.200 | Glass | 1.517 | 64.2 | — |
| 13 | | Plano | | 0.197 | | | | |
| 14 | Image | Plano | | — | | | | |

Note:
Reference Wavelength is 587.6 nm (d–line).

TABLE 2

Aspheric Coefficients

| Surface # | 1 | 2 | 4 | 5 | 6 |
|---|---|---|---|---|---|
| k = | −1.0000E+00 | −1.0000E+00 | −2.2297E+00 | −2.8152E+01 | −2.1972E+01 |
| A4 = | 6.4366E−03 | 2.7322E−01 | 1.7401E−01 | −1.1631E+00 | −2.8920E+00 |
| A6 = | 7.8667E−01 | −1.9321E+00 | −1.6261E+00 | 1.0469E+00 | 3.1839E+00 |
| A8 = | −4.6545E+00 | 2.2846E+01 | 1.0087E+01 | −1.2946E+01 | −3.9165E+01 |
| A10 = | 1.2411E+01 | −1.0852E+02 | −1.5011E+01 | 3.7583E+01 | 2.2935E+02 |
| A12 = | −1.1410E+01 | 2.9842E+02 | | | −3.4474E+02 |

| Surface # | 7 | 8 | 9 | 10 | 11 |
|---|---|---|---|---|---|
| k = | −2.9990E+01 | 1.1476E+01 | −2.0237E+00 | −1.9244E+00 | −2.9271E+00 |
| A4 = | −1.1784E+00 | 5.7759E−01 | −4.4393E−01 | −1.2906E+00 | −7.4430E−01 |
| A6 = | 1.7273E+00 | −3.1415E+00 | −2.1194E−01 | 2.5808E+00 | 1.4635E+00 |
| A8 = | −1.4943E+00 | 1.5240E+01 | 2.6801E+00 | −3.7084E+00 | −2.0676E+00 |
| A10 = | | −5.0848E+01 | −4.8931E+00 | 3.6661E+00 | 1.8777E+00 |
| A12 = | | 1.1337E+01 | 2.5612E+00 | −2.3302E+00 | −1.0516E+00 |
| A14 = | | −1.4186E+02 | 1.4085E+01 | 8.5344E−01 | 3.2523E−01 |
| A16 = | | 7.5574E+01 | −1.6274E+01 | −1.3599E−01 | −4.2050E−02 |

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the relative distance between a point on the aspheric surface at a distance Y from the optical axis and the tangential plane at the aspheric surface vertex;

Y: the distance from the point on the curve of the aspheric surface to the optical axis;

R: curvature radius;

k: the conic coefficient;

Ai: the aspheric coefficient of order i.

In the first embodiment of the present optical image capturing lens system, the focal length of the optical image capturing lens system is f, and it satisfies the relation: f=1.64 (mm).

In the first embodiment of the present optical image capturing lens system, the f-number of the optical image capturing lens system is Fno, and it satisfies the relation: Fno=1.95.

In the first embodiment of the present optical image capturing lens system, half of the maximal field of view of the optical image capturing lens system is HFOV, and it satisfies the relation: HFOV=42.8 deg.

In the first embodiment of the present optical image capturing lens system, an Abbe number of the second lens element 120 is V2, an Abbe number of the third lens element 130 is V3, and they satisfy the relation: V2/V3=2.42.

In the first embodiment of the present optical image capturing lens system, a central thickness of the fourth lens element 140 on the optical axis is CT4, a focal length of the optical image capturing lens system is f, and they satisfy the relation: CT4/f=0.34.

In the first embodiment of the present optical image capturing lens system, an axial distance between the third lens element 130 and the fourth lens element 140 is T34, an axial distance between the fourth lens element 140 and the fifth lens element 150 is T45, a central thickness of the fourth lens element 140 on the optical axis is CT4, and they satisfy the relation: (T34+T45)/CT4=0.19.

In the first embodiment of the present optical image capturing lens system, curvature radius of the object-side surface 141 of the fourth lens element 140 is R7, curvature radius of the image-side surface 142 of the fourth lens element 140 is R8, and they satisfy the following relation: (R7+R8)/(R7−R8)=1.50.

In the aforementioned optical image capturing lens system, a curvature radius of the object-side surface 151 of the fifth lens element 150 is R9, a curvature radius of the image-side surface 152 of the fifth lens element 150 is R10, and they satisfy the following relation: |R10/R9|=0.51.

In the first embodiment of the present optical image capturing lens system, a focal length of the optical image capturing lens system is f, a focal length of the first lens element 110 is f1, and they satisfy the relation: f/f1=−0.103.

In the first embodiment of the present optical image capturing lens system, an axial distance between the object-side surface 111 of the first lens element 110 and the image-side surface 152 of the fifth lens element 150 of the optical image capturing lens system is Td, a sum of central thicknesses of all lens elements with refractive power of the optical image capturing lens system is ΣCT, and they satisfy the relation: Td/ΣCT=1.20.

In the first embodiment of the present optical image capturing lens system, an axial distance between the aperture stop 100 and the image-side surface 122 of the second lens element 120 is Dsr4, an axial distance between the object-side surface 111 of the first lens element 110 and the image-side surface 122 of the second lens element 120 is Dr1r4, and they satisfy the following relation: Dsr4/Dr1r4=0.49.

In the first embodiment of the present optical image capturing lens system, a maximal field of view of the optical image capturing lens system is FOV, and it satisfies the relation: FOV=85.7 deg.

Embodiment 2

Figure 2A:
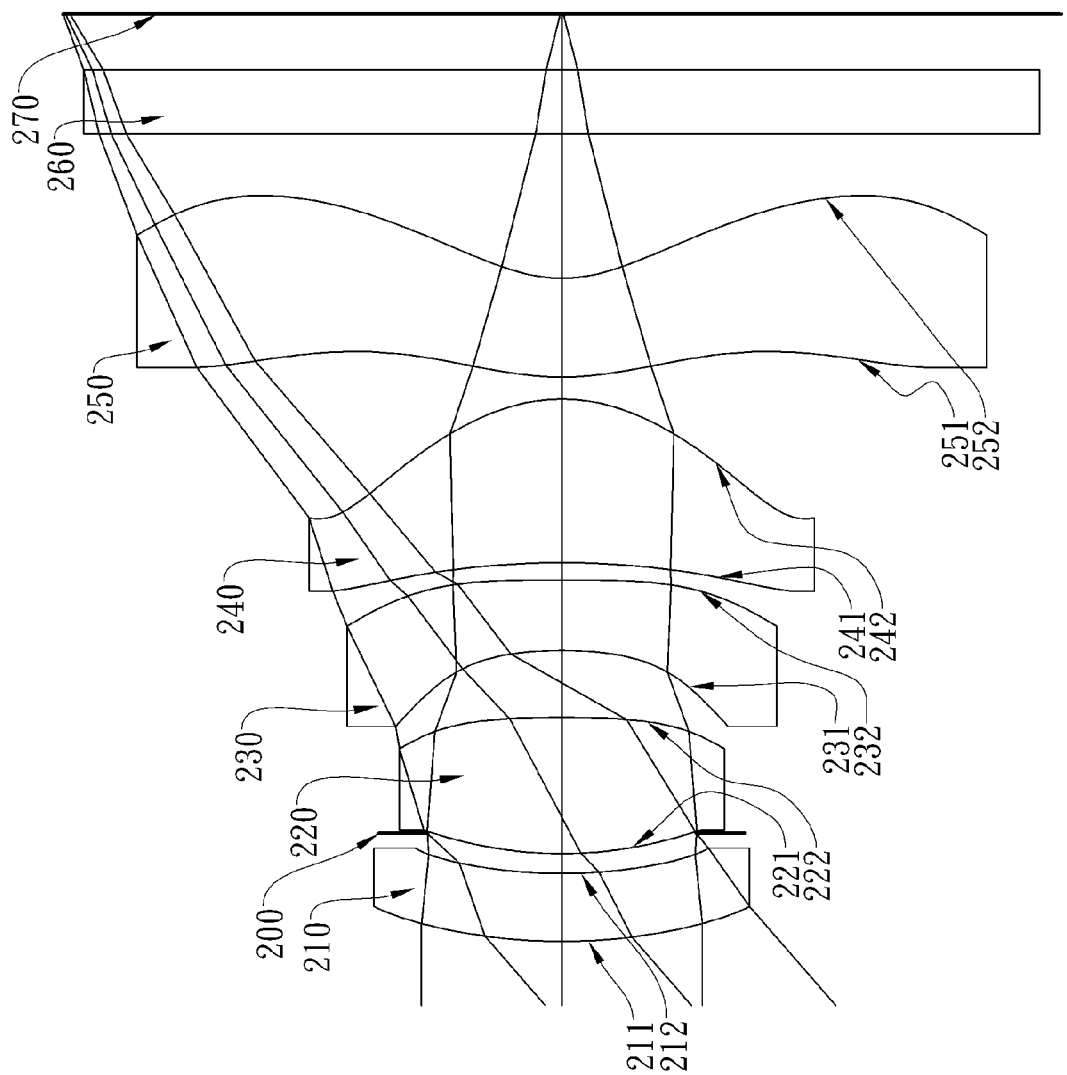
FIG. 2A shows an optical image capturing lens system in accordance with the second embodiment of the present invention.
Figure 2B:
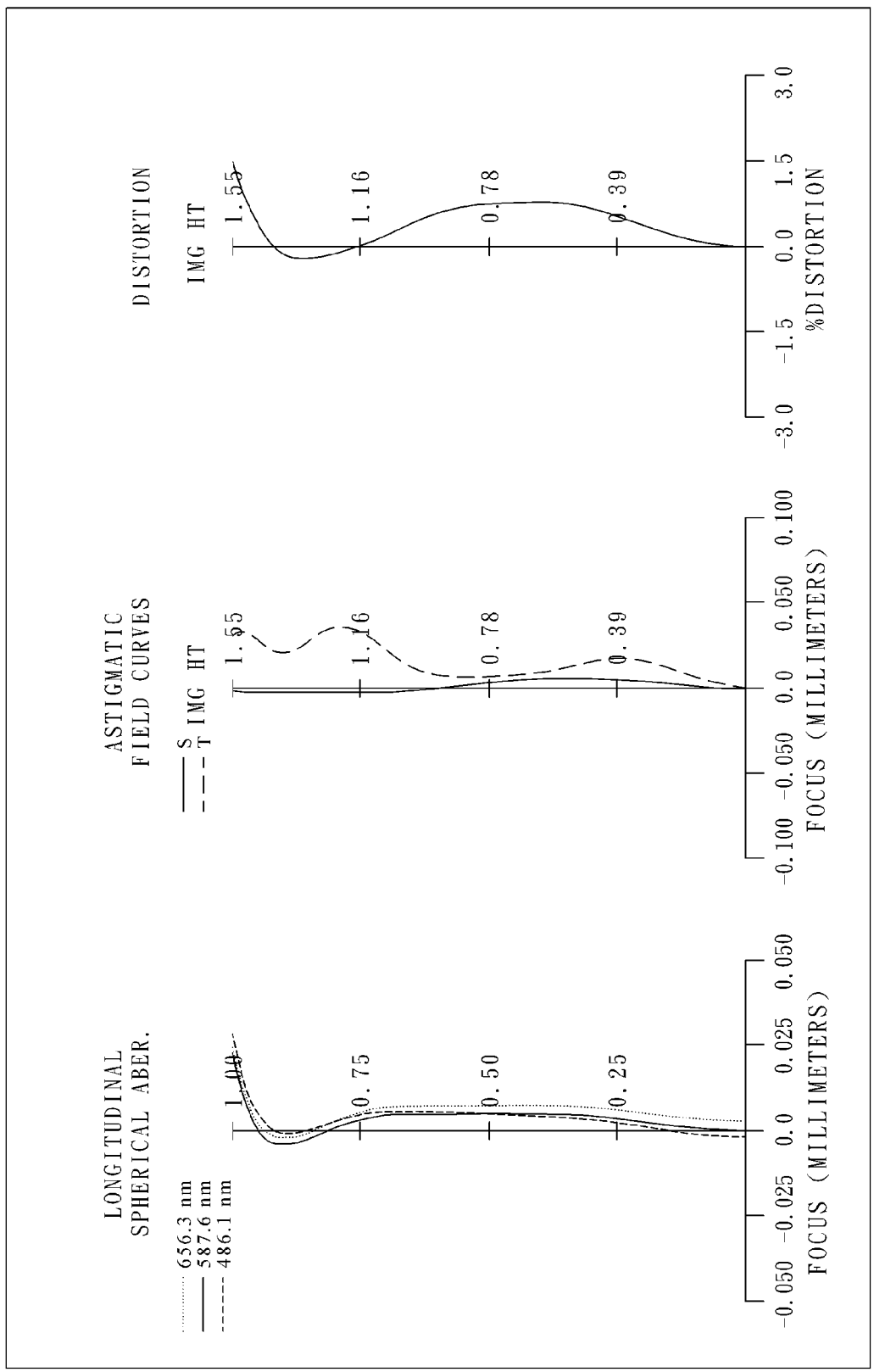
FIG. 2B shows the aberration curves of the second embodiment of the present invention.

FIG. 2A shows an optical image capturing lens system in accordance with the second embodiment of the present invention, and FIG. 2B shows the aberration curves of the second embodiment of the present invention. The optical image capturing lens system of the second embodiment of the present invention mainly comprises five lens elements with refractive power, in order from an object side to an image side:

a plastic first lens element 210 with negative refractive power having a convex object-side surface 211 at the paraxial region and a concave image-side surface 212 at the paraxial region, the object-side and image-side surfaces 211 and 212 thereof being aspheric;

a plastic second lens element 220 with positive refractive power having a convex object-side surface 221 at the paraxial region and a convex image-side surface 222 at the paraxial region, the object-side and image-side surfaces 221 and 222 thereof being aspheric;

a plastic third lens element 230 with negative refractive power having a concave object-side surface 231 at the paraxial region and a convex image-side surface 232 at the paraxial region and convex shape at the peripheral region, the object-side and image-side surfaces 231 and 232 thereof being aspheric;

a plastic fourth lens element 240 with positive refractive power having a concave object-side surface 241 at the paraxial region and a convex image-side surface 242 at the paraxial region, the object-side and image-side surfaces 241 and 242 thereof being aspheric; and a plastic fifth lens element 250 with negative refractive power having a convex object-side surface 251 at the paraxial region and a concave image-side surface 252 at the paraxial region and convex shape at the peripheral region, the object-side and image-side surfaces 251 and 252 thereof being aspheric;

wherein the lens elements of the optical image capturing lens system with refractive power are five lens elements which are the first lens element 210, the second lens element 220, the third lens element 230, the fourth lens element 240 and the fifth lens element 250;

wherein an aperture stop 200 is disposed between the first lens element 210 and the second lens element 220;

the optical image capturing lens system further comprises an IR filter 260 disposed between the image-side surface 252 of the fifth lens element 250 and an image plane 270, and the IR filter 260 is made of glass and has no influence on the focal length of the optical image capturing lens system.

The detailed optical data of the second embodiment is shown in TABLE 3, and the aspheric surface data is shown in TABLE 4, wherein the units of the curvature radius, the central thickness and the focal length are expressed in mm, and HFOV is defined as half of the maximal field of view.

TABLE 3

(Embodiment 2)
f = 1.75 mm, Fno = 2.00, HFOV = 41.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.726 | ASP | 0.212 | Plastic | 1.650 | 21.4 | −30.34 |
| 2 | | 1.510 | ASP | 0.126 | | | | |
| 3 | Ape. Stop | Plano | | −0.064 | | | | |
| 4 | Lens 2 | 1.180 | ASP | 0.426 | Plastic | 1.544 | 55.9 | 1.75 |
| 5 | | −4.304 | ASP | 0.209 | | | | |
| 6 | Lens 3 | −1.356 | ASP | 0.220 | Plastic | 1.650 | 21.4 | −2.12 |
| 7 | | −94.591 | ASP | 0.055 | | | | |
| 8 | Lens 4 | −2.424 | ASP | 0.511 | Plastic | 1.544 | 55.9 | 1.16 |
| 9 | | −0.540 | ASP | 0.069 | | | | |
| 10 | Lens 5 | 0.906 | ASP | 0.309 | Plastic | 1.535 | 56.3 | −2.02 |
| 11 | | 0.435 | ASP | 0.450 | | | | |
| 12 | IR-filter | Plano | | 0.200 | Glass | 1.517 | 64.2 | — |
| 13 | | Plano | | 0.176 | | | | |
| 14 | Image | Plano | | — | | | | |

Note:
Reference Wavelength is 587.6 nm (d-line)

TABLE 4

Aspheric Coefficients

| Surface # | 1 | 2 | 4 | 5 | 6 |
|---|---|---|---|---|---|
| k = | −1.8643E+00 | −6.0705E+00 | −4.8165E+00 | −2.4982E+01 | −8.5197E+00 |
| A4 = | −4.5130E−02 | 7.0237E−02 | 8.1620E−02 | −9.9036E−01 | −2.7435E+00 |
| A6 = | 8.2378E−01 | −8.6492E−01 | −1.2391E+00 | 6.0278E−01 | 3.5328E+00 |
| A8 = | −4.3370E+00 | 2.0150E+01 | 8.6857E+00 | −1.3254E+01 | −4.4443E+01 |
| A10 = | 1.3160E+01 | −1.0577E+02 | −7.6515E+00 | 3.8796E+01 | 2.3948E+02 |
| A12 = | −1.1410E+01 | 2.9842E+02 | 1.8784E−05 | 1.8781E−05 | −3.4474E+02 |

| Surface # | 7 | 8 | 9 | 10 | 11 |
|---|---|---|---|---|---|
| k = | 3.0000E+00 | 9.3694E+00 | −2.0529E+00 | −2.4077E+00 | −3.1374E+00 |
| A4 = | −1.1872E+00 | 4.2389E−01 | −3.7868E−01 | −1.3379E+00 | −7.6768E−01 |
| A6 = | 1.4593E+00 | −2.9795E+00 | −1.5132E−01 | 2.6024E+00 | 1.4708E+00 |
| A8 = | −1.1961E+00 | 1.5361E+01 | 2.6632E+00 | −3.6887E+00 | −2.0664E+00 |
| A10 = | 8.7514E−01 | −5.0865E+01 | −4.9993E+00 | 3.6702E+00 | 1.8749E+00 |
| A12 = | −1.3412E−01 | 1.1337E+02 | 2.4968E+00 | −2.3360E+00 | −1.0500E+00 |
| A14 = | | −1.4172E+02 | 1.4032E+01 | 8.5350E−01 | 3.2543E−01 |
| A16 = | | 7.6176E+01 | −1.6051E+01 | −1.3629E−01 | −4.2181E−02 |

The equation of the aspheric surface profiles of the second embodiment has the same form as that of the first embodiment. Moreover, the definitions of the parameters of the relations are the same as those set forth in the first embodiment, but the value of the relations of the second embodiment are listed in TABLE 5 as presented below:

TABLE 5

(Embodiment 2)

| f [mm] | 1.75 | (R7 + R8)/(R7 − R8) | 1.57 |
|---|---|---|---|
| Fno | 2.00 | |R10/R9| | 0.48 |
| HFOV [deg.] | 41.0 | f/f1 | −0.058 |
| V2/V3 | 2.61 | Td/ΣCT | 1.24 |
| CT4/f | 0.29 | Dsr4/Dr1r4 | 0.52 |
| (T34 + T45)/CT4 | 0.24 | FOV [deg.] | 82.0 |

Embodiment 3

Figure 3A:
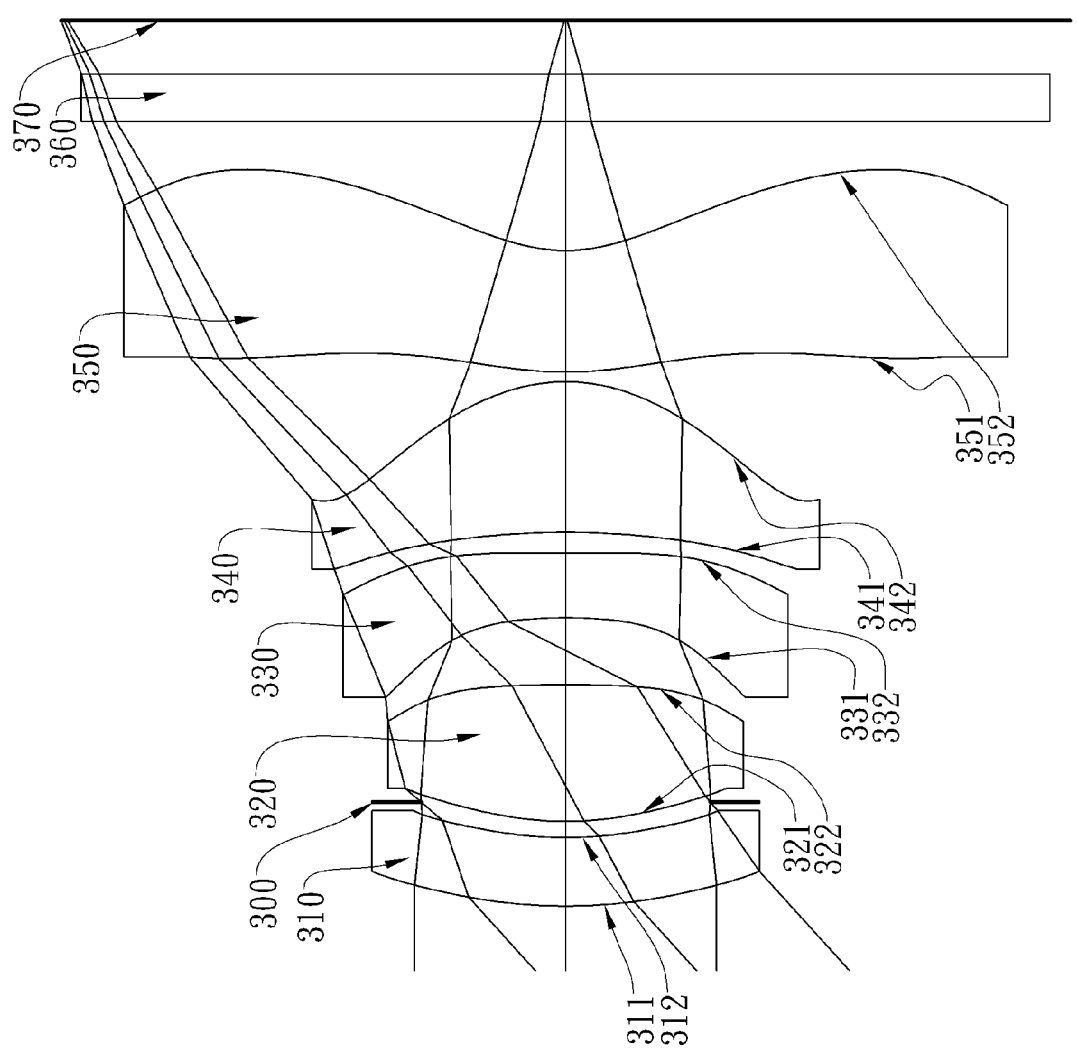
FIG. 3A shows an optical image capturing lens system in accordance with the third embodiment of the present invention.
Figure 3B:
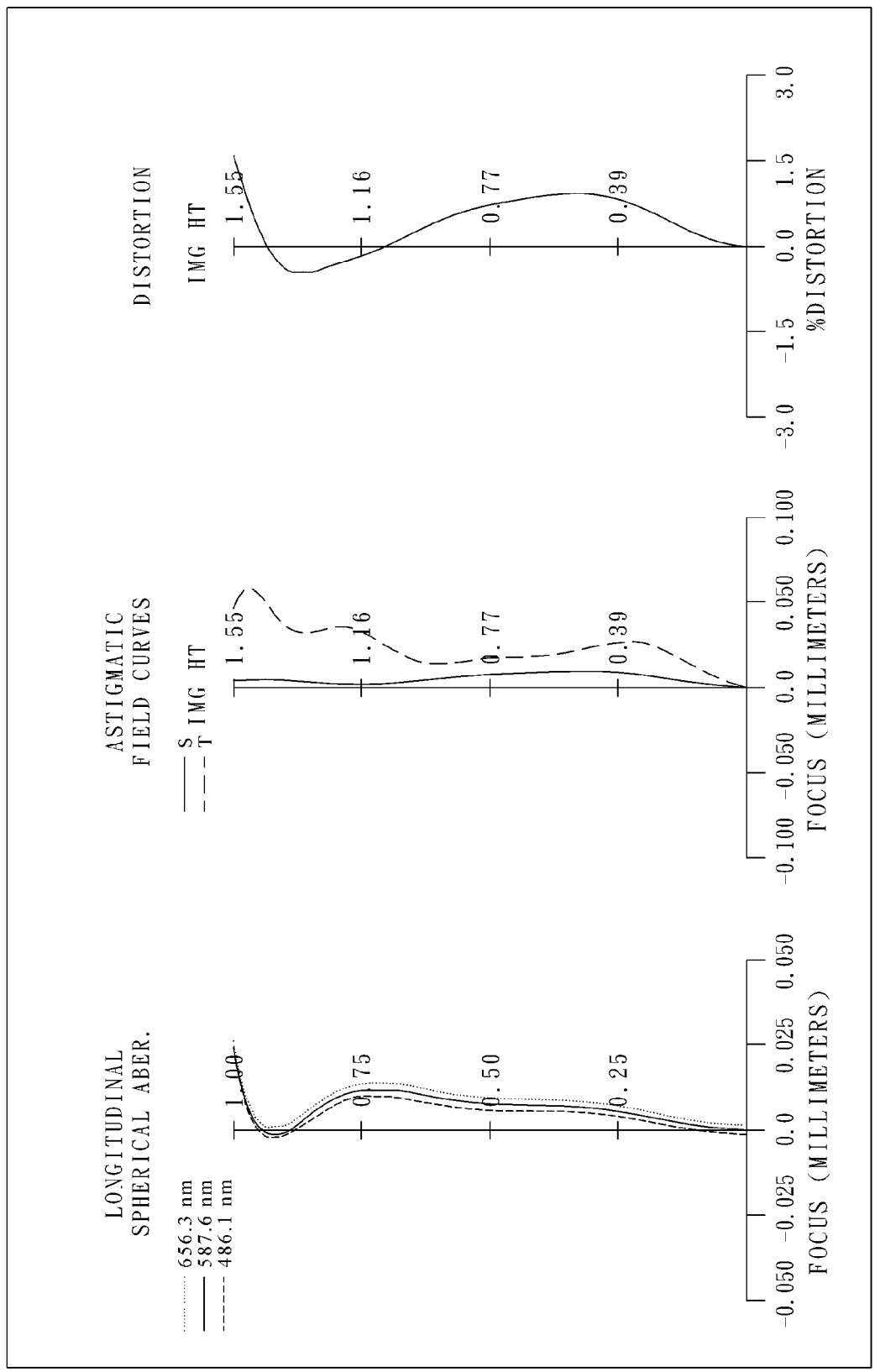
FIG. 3B shows the aberration curves of the third embodiment of the present invention.

FIG. 3A shows an optical image capturing lens system in accordance with the third embodiment of the present invention, and FIG. 3B shows the aberration curves of the third embodiment of the present invention. The optical image capturing lens system of the third embodiment of the present invention mainly comprises five lens elements with refractive power, in order from an object side to an image side:

a plastic first lens element 310 with negative refractive power having a convex object-side surface 311 at the paraxial region and a concave image-side surface 312 at the paraxial region, the object-side and image-side surfaces 311 and 312 thereof being aspheric;

a glass second lens element 320 with positive refractive power having a convex object-side surface 321 at the paraxial region and a convex image-side surface 322 at the paraxial region, the object-side and image-side surfaces 321 and 322 thereof being aspheric;

a plastic third lens element 330 with negative refractive power having a concave object-side surface 331 at the paraxial region and a concave image-side surface 332 at the paraxial region and convex shape at the peripheral region, the object-side and image-side surfaces 331 and 332 thereof being aspheric;

a plastic fourth lens element 340 with positive refractive power having a concave object-side surface 341 at the paraxial region and a convex image-side surface 342 at the paraxial region, the object-side and image-side surfaces 341 and 342 thereof being aspheric; and a plastic fifth lens element 350 with negative refractive power having a convex object-side surface 351 at the paraxial region and a concave image-side surface 352 at the paraxial region and convex shape at the peripheral region, the object-side and image-side surfaces 351 and 352 thereof being aspheric;

wherein the lens elements of the optical image capturing lens system with refractive power are five lens elements which are the first lens element 310, the second lens element 320, the third lens element 330, the fourth lens element 340 and the fifth lens element 350;

wherein an aperture stop 300 is disposed between the first lens element 310 and the second lens element 320;

the optical image capturing lens system further comprises an IR filter 360 disposed between the image-side surface 352 of the fifth lens element 350 and an image plane 370, and the IR filter 360 is made of glass and has no influence on the focal length of the optical image capturing lens system.

The detailed optical data of the third embodiment is shown in TABLE 6, and the aspheric surface data is shown in TABLE 7, wherein the units of curvature radius, the central thickness and the focal length are expressed in mm, and HFOV is defined as half of the maximal field of view.

TABLE 6

(Embodiment 3)
f = 1.68 mm, Fno = 1.80, HFOV = 42.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.523 | ASP | 0.212 | Plastic | 1.634 | 23.8 | −9.48 |
| 2 | | 1.150 | ASP | 0.110 | | | | |
| 3 | Ape. Stop | Plano | | −0.060 | | | | |
| 4 | Lens 2 | 0.989 | ASP | 0.423 | Glass | 1.566 | 61.1 | 1.53 |
| 5 | | −5.785 | ASP | 0.207 | | | | |
| 6 | Lens 3 | −1.764 | ASP | 0.200 | Plastic | 1.634 | 23.8 | −2.34 |
| 7 | | 9.801 | ASP | 0.065 | | | | |
| 8 | Lens 4 | −2.393 | ASP | 0.466 | Plastic | 1.544 | 55.9 | 1.20 |
| 9 | | −0.548 | ASP | 0.030 | | | | |
| 10 | Lens 5 | 1.126 | ASP | 0.376 | Plastic | 1.535 | 56.3 | −2.04 |
| 11 | | 0.490 | ASP | 0.400 | | | | |
| 12 | IR-filter | Plano | | 0.145 | Glass | 1.517 | 64.2 | — |
| 13 | | Plano | | 0.166 | | | | |
| 14 | Image | Plano | | — | | | | |

Note:
Reference Wavelength is 587.6 nm (d-line)

TABLE 7

Aspheric Coefficients

| Surface # | 1 | 2 | 4 | 5 | 6 |
|---|---|---|---|---|---|
| k = | −5.6495E+00 | −8.7155E+00 | −7.3605E+00 | 2.8962E+00 | −9.4514E+00 |
| A4 = | −8.4024E−02 | −1.4275E−01 | 1.5757E−01 | −8.4685E−01 | −2.5335E+00 |
| A6 = | 9.3628E−01 | −4.8681E−01 | −9.2219E−01 | 7.6116E−01 | 3.7733E+00 |
| A8 = | −4.4050E+00 | 1.9264E+01 | 1.3880E+00 | −1.3650E+01 | −4.8117E+01 |

TABLE 7-continued

| Aspheric Coefficients | | | | |
|---|---|---|---|---|
| A10 = | 9.8354E+00 | −1.1734E+02 | 6.5949E+00 | 3.3102E+01 | 2.4757E+02 |
| A12 = | −5.5437E+00 | 2.9842E+02 | 1.9939E−05 | 1.9924E−05 | −3.4474E+02 |

| Surface # | 7 | 8 | 9 | 10 | 11 |
|---|---|---|---|---|---|
| k = | −3.0000E+01 | 9.0796E+00 | −1.8525E+00 | −1.7084E+00 | −3.2981E+00 |
| A4 = | −1.2027E+00 | 3.7949E−01 | −3.7972E−01 | −1.3366E+00 | −7.3563E−01 |
| A6 = | 1.4241E+00 | −2.8423E+00 | −1.0438E−01 | 2.6365E+00 | 1.4589E+00 |
| A8 = | −9.8271E−01 | 1.5210E+01 | 2.7920E+00 | −3.6904E+00 | −2.0618E+00 |
| A10 = | 7.7164E−01 | −5.1702E+01 | −4.9822E+00 | 3.6529E+00 | 1.8780E+00 |
| A12 = | −1.3412E−01 | 1.1228E+02 | 2.5001E+00 | −2.3332E+00 | −1.0513E+00 |
| A14 = | | −1.4167E+02 | 1.3873E+01 | 8.5449E−01 | 3.2352E−01 |
| A16 = | | 8.2318E+01 | −1.6218E+01 | −1.3607E−01 | −4.1413E−02 |

The equation of the aspheric surface profiles of the third embodiment has the same form as that of the first embodiment. Moreover, the definitions of the parameters of the relations are the same as those set forth in the first embodiment, but the value of the relations of the third embodiment are listed in TABLE 8:

TABLE 8

(Embodiment 3)

| f [mm] | 1.68 | (R7 + R8)/(R7 − R8) | 1.59 |
|---|---|---|---|
| Fno | 1.80 | |R10/R9| | 0.44 |
| HFOV [deg.] | 42.2 | f/f1 | −0.177 |
| V2/V3 | 2.57 | Td/ΣCT | 1.21 |
| CT4/f | 0.28 | Dsr4/Dr1r4 | 0.53 |
| (T34 + T45)/CT4 | 0.20 | FOV [deg.] | 84.4 |

Embodiment 4

Figure 4A:
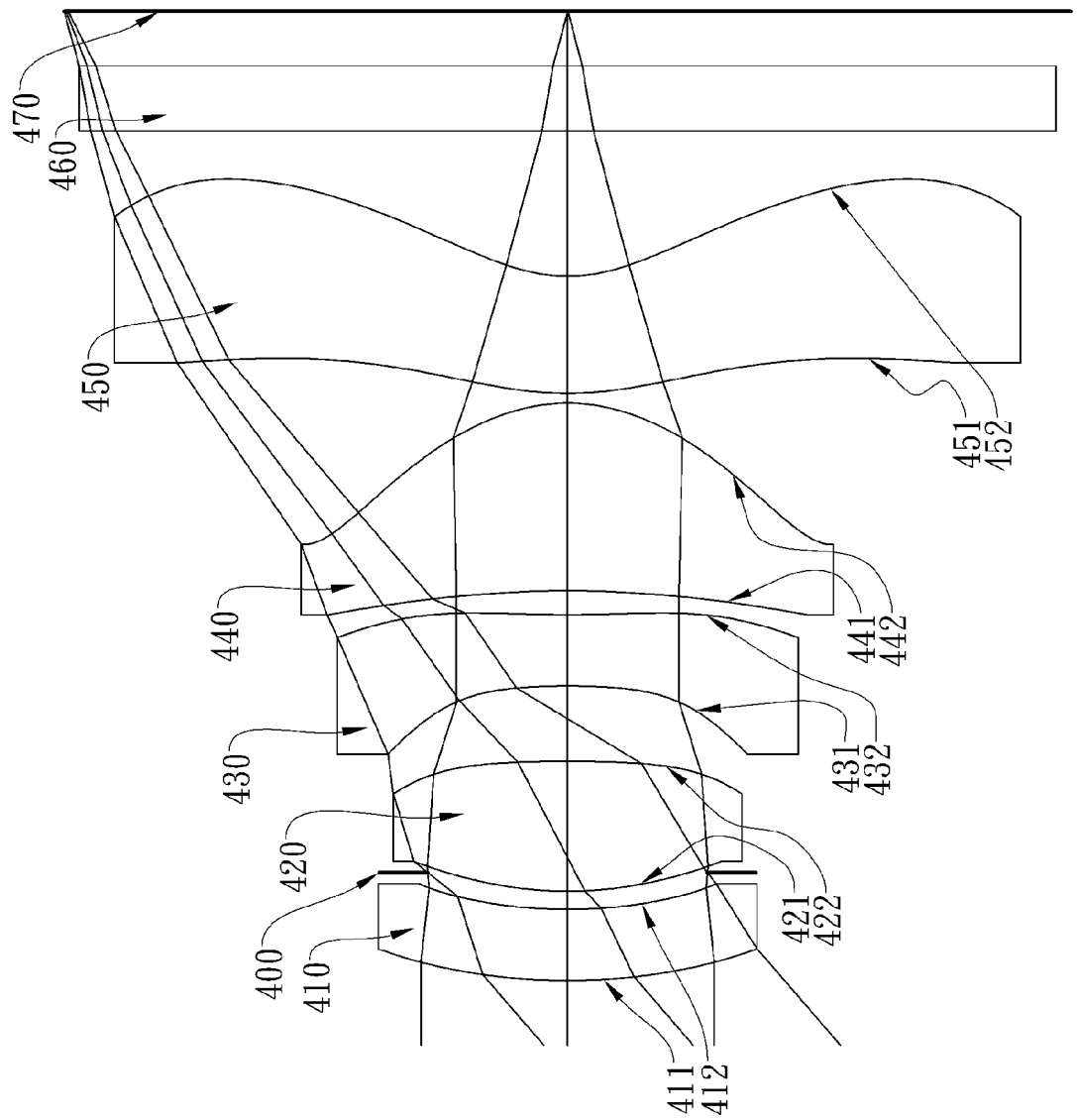
FIG. 4A shows an optical image capturing lens system in accordance with the fourth embodiment of the present invention.
Figure 4B:
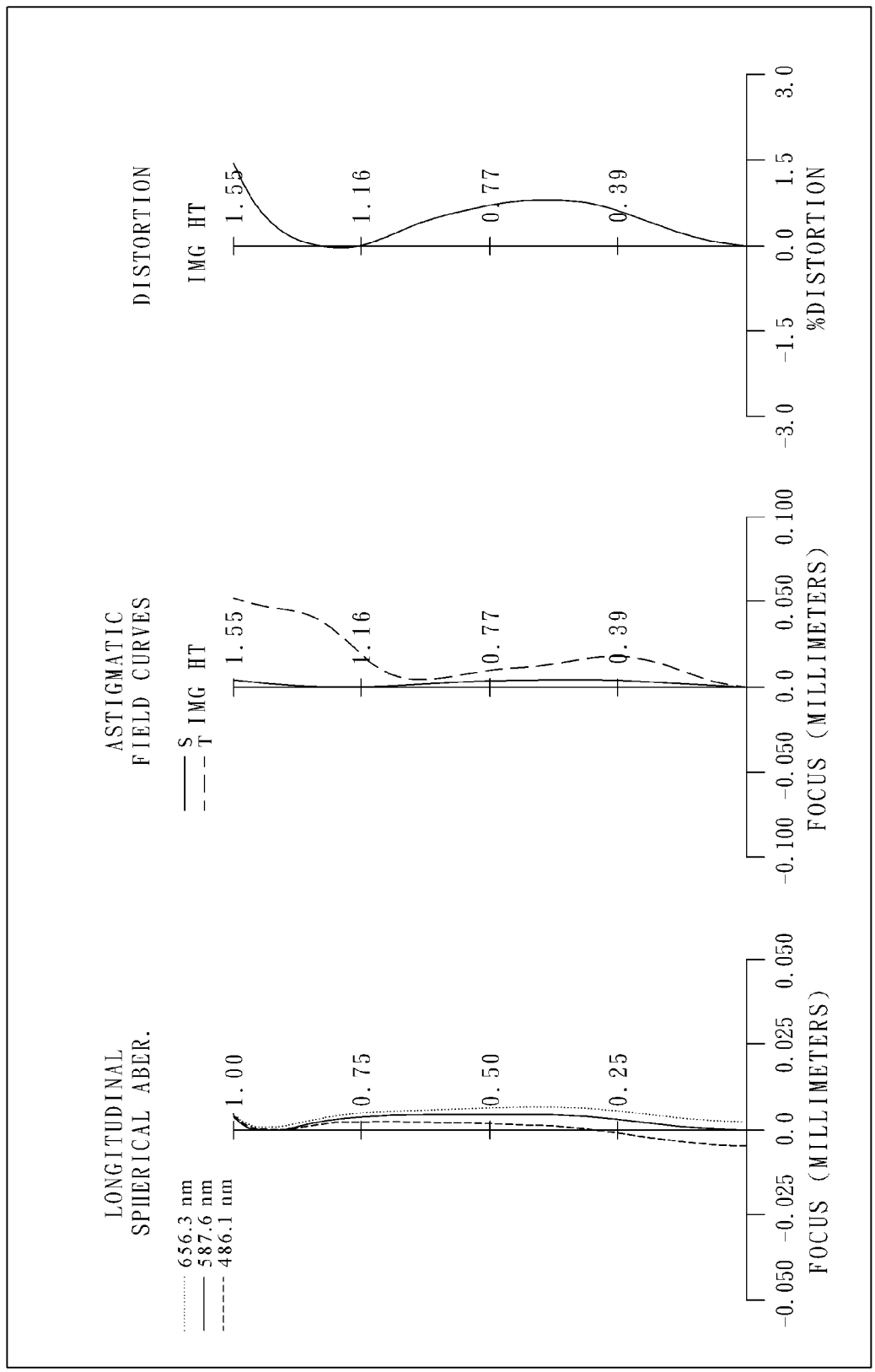
FIG. 4B shows the aberration curves of the fourth embodiment of the present invention.

FIG. 4A shows an optical image capturing lens system in accordance with the fourth embodiment of the present invention, and FIG. 4B shows the aberration curves of the fourth embodiment of the present invention. The optical image capturing lens system of the fourth embodiment of the present invention mainly comprises five lens elements with refractive power, in order from an object side to an image side:

a plastic first lens element 410 with negative refractive power having a convex object-side surface 411 at the paraxial region and a concave image-side surface 412 at the paraxial region, the object-side and image-side surfaces 411 and 412 thereof being aspheric;

a plastic second lens element 420 with positive refractive power having a convex object-side surface 421 at the paraxial region and a convex image-side surface 422 at the paraxial region, the object-side and image-side surfaces 421 and 422 thereof being aspheric;

a plastic third lens element 430 with negative refractive power having a concave object-side surface 431 at the paraxial region and a concave image-side surface 432 at the paraxial region and convex shape at the peripheral region, the object-side and image-side surfaces 431 and 432 thereof being aspheric;

a plastic fourth lens element 440 with positive refractive power having a concave object-side surface 441 at the paraxial region and a convex image-side surface 442 at the paraxial region, the object-side and image-side surfaces 441 and 442 thereof being aspheric; and a plastic fifth lens element 450 with negative refractive power having a convex object-side surface 451 at the paraxial region and a concave image-side surface 452 at the paraxial region and convex shape at the peripheral region, the object-side and image-side surfaces 451 and 452 thereof being aspheric;

wherein the lens elements of the optical image capturing lens system with refractive power are five lens elements which are the first lens element 410, the second lens element 420, the third lens element 430, the fourth lens element 440 and the fifth lens element 450;

wherein an aperture stop 400 is disposed between the first lens element 410 and the second lens element 420;

the optical image capturing lens system further comprises an IR filter 460 disposed between the image-side surface 452 of the fifth lens element 450 and an image plane 470, and the IR filter 460 is made of glass and has no influence on the focal length of the optical image capturing lens system.

The detailed optical data of the fourth embodiment is shown in TABLE 9, and the aspheric surface data is shown in TABLE 10, wherein the units of curvature radius, the central thickness and the focal length are expressed in mm, and HFOV is defined as half of the maximal field of view.

TABLE 9

(Embodiment 4)
f = 1.77 mm, Fno = 1.95, HFOV = 40.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.865 | ASP | 0.220 | Plastic | 1.722 | 29.2 | −14.19 |
| 2 | | 1.500 | ASP | 0.114 | | | | |
| 3 | Ape. Stop | Plano | | −0.058 | | | | |
| 4 | Lens 2 | 1.161 | ASP | 0.402 | Plastic | 1.544 | 55.9 | 1.79 |
| 5 | | −5.362 | ASP | 0.233 | | | | |
| 6 | Lens 3 | −2.576 | ASP | 0.220 | Plastic | 1.640 | 23.3 | −2.30 |

TABLE 9-continued (Embodiment 4)
f = 1.77 mm, Fno = 1.95, HFOV = 40.8 deg.

| Surface # | | Curvature Radius | | Thickness | Material | Index | Abbe # | Focal Length |
|---|---|---|---|---|---|---|---|---|
| 7 | | 3.555 | ASP | 0.075 | | | | |
| 8 | Lens 4 | −2.865 | ASP | 0.580 | Plastic | 1.544 | 55.9 | 1.16 |
| 9 | | −0.553 | ASP | 0.030 | | | | |
| 10 | Lens 5 | 1.011 | ASP | 0.362 | Plastic | 1.535 | 56.3 | −2.07 |
| 11 | | 0.462 | ASP | 0.450 | | | | |
| 12 | IR-filter | Plano | | 0.200 | Glass | 1.517 | 64.2 | — |
| 13 | | Plano | | 0.169 | | | | |
| 14 | Image | Plano | | — | | | | |

Note:
Reference Wavelength is 587.6 nm (d-line)

TABLE 10

Aspheric Coefficients

| Surface # | 1 | 2 | 4 | 5 | 6 |
|---|---|---|---|---|---|
| k = | −1.0222E+00 | −1.9680E+00 | −3.3757E+00 | −2.8010E+01 | −2.2070E+01 |
| A4 = | 5.1907E−03 | 9.5066E−02 | 9.8436E−02 | −7.7480E−01 | −2.1094E+00 |
| A6 = | 3.9131E−01 | −4.1732E−01 | −5.9664E−01 | 4.7749E−01 | 1.9799E+00 |
| A8 = | −1.8086E+00 | 9.4320E+00 | 3.0059E+00 | −7.1787E+00 | −2.0062E+01 |
| A10 = | 4.5104E+00 | −4.1262E+01 | −4.1252E+00 | 1.4131E+01 | 9.4028E+01 |
| A12 = | −3.8141E+00 | 9.9756E+01 | | | −1.1524E+02 |

| Surface # | 7 | 8 | 9 | 10 | 11 |
|---|---|---|---|---|---|
| k= | −2.4398E+01 | 1.1451E+01 | −2.0144E+00 | −2.2187E+00 | −3.1200E+00 |
| A4 = | −9.0742E−01 | 4.1631E−01 | −3.3929E−01 | −9.3793E−01 | −5.5265E−01 |
| A6 = | 1.0296E+00 | −1.8991E+00 | −1.2574E−01 | 1.5733E+00 | 8.8762E−01 |
| A8 = | −4.7261E−01 | 7.5847E+00 | 1.3717E+00 | −1.8471E+00 | −1.0322E+00 |
| A10 = | | −2.0738E+01 | −1.9373E+00 | 1.4946E+00 | 7.6568E−01 |
| A12 = | | 3.7869E+01 | 9.1210E−01 | −7.7896E−01 | −3.5011E−01 |
| A14 = | | −3.8675E+01 | 3.9190E+00 | 2.3373E−01 | 8.8585E−02 |
| A16 = | | 1.6961E+01 | −3.6682E+00 | −3.0512E−02 | −9.4217E−03 |

The equation of the aspheric surface profiles of the fourth embodiment has the same form as that of the first embodiment. Moreover, the definitions of the parameters of the relations are the same as those set forth in the first embodiment, but the value of the relations of the fourth embodiment are listed in TABLE 11:

TABLE 11

(Embodiment 4)

| f [mm] | 1.77 | (R7 + R8)/(R7 − R8) | 1.48 |
|---|---|---|---|
| Fno | 1.95 | |R10/R9| | 0.46 |
| HFOV [deg.] | 40.8 | f/fl | −0.125 |
| V2/V3 | 2.40 | Td/ΣCT | 1.22 |
| CT4/f | 0.33 | Dsr4/Dr1r4 | 0.51 |
| (T34 + T45)/CT4 | 0.18 | FOV [deg.] | 81.6 |

Embodiment 5

Figure 5A:
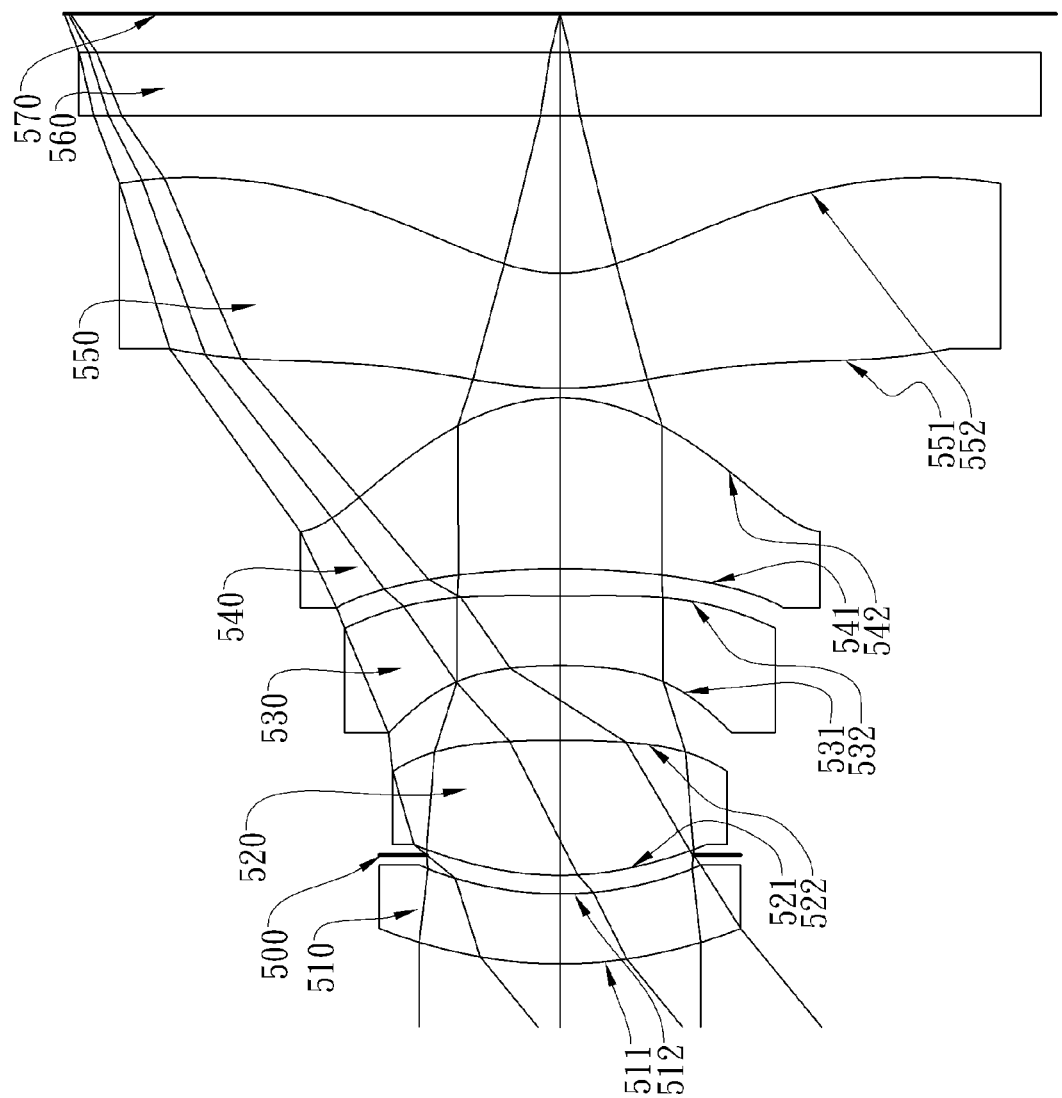
FIG. 5A shows an optical image capturing lens system in accordance with the fifth embodiment of the present invention.
Figure 5B:
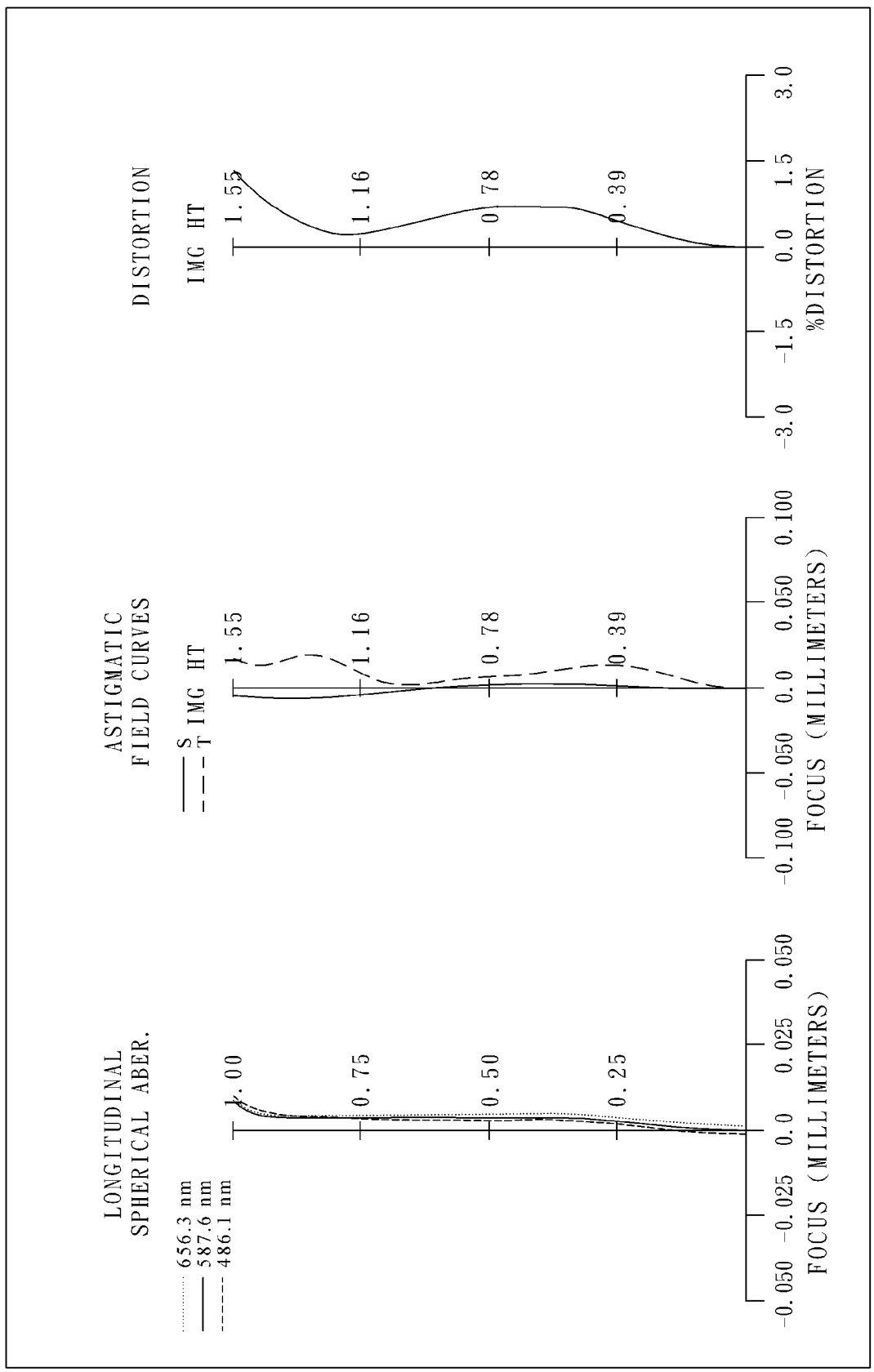
FIG. 5B shows the aberration curves of the fifth embodiment of the present invention.

FIG. 5A shows an optical image capturing lens system in accordance with the fifth embodiment of the present invention, and FIG. 5B shows the aberration curves of the fifth embodiment of the present invention. The optical image capturing lens system of the fifth embodiment of the present invention mainly comprises five lens elements with refractive power, in order from an object side to an image side:

a plastic first lens element 510 with negative refractive power having a convex object-side surface 511 at the paraxial region and a concave image-side surface 512 at the paraxial region, the object-side and image-side surfaces 511 and 512 thereof being aspheric;

a plastic second lens element 520 with positive refractive power having a convex object-side surface 521 at the paraxial region and a convex image-side surface 522 at the paraxial region, the object-side and image-side surfaces 521 and 522 thereof being aspheric;

a plastic third lens element 530 with negative refractive power having a concave object-side surface 531 at the paraxial region and a concave image-side surface 532 at the paraxial region and convex shape at the peripheral region, the object-side and image-side surfaces 531 and 532 thereof being aspheric;

a plastic fourth lens element 540 with positive refractive power having a concave object-side surface 541 at the paraxial region and a convex image-side surface 542 at the paraxial region, the object-side and image-side surfaces 541 and 542 thereof being aspheric; and a plastic fifth lens element 550 with negative refractive power having a convex object-side surface 551 at the paraxial region and a concave image-side surface 552 at the paraxial region and convex shape at the peripheral region, the object-side and image-side surfaces 551 and 552 thereof being aspheric;

wherein the lens elements of the optical image capturing lens system with refractive power are five lens elements which are the first lens element 510, the second lens element 520, the third lens element 530, the fourth lens element 540 and the fifth lens element 550;

wherein an aperture stop 500 is disposed between the first lens element 510 and the second lens element 520;

the optical image capturing lens system further comprises an IR filter 560 disposed between the image-side surface 552 of the fifth lens element 550 and an image plane 570, and the IR filter 560 is made of glass and has no influence on the focal length of the optical image capturing lens system.

The detailed optical data of the fifth embodiment is shown in TABLE 12, and the aspheric surface data is shown in TABLE 13, wherein the units of curvature radius, the central thickness and the focal length are expressed in mm, and HFOV is defined as half of the maximal field of view.

TABLE 12

(Embodiment 5)
f =1.86 mm, Fno =2.10, HFOV =39.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.403 | ASP | 0.220 | Plastic | 1.640 | 23.3 | −8.33 |
| 2 | | 1.042 | ASP | 0.123 | | | | |
| 3 | Ape. Stop | Plano | | −0.064 | | | | |
| 4 | Lens 2 | 0.996 | ASP | 0.426 | Plastic | 1.544 | 55.9 | 1.54 |
| 5 | | −4.466 | ASP | 0.236 | | | | |
| 6 | Lens 3 | −1.669 | ASP | 0.220 | Plastic | 1.640 | 23.3 | −2.32 |
| 7 | | 13.859 | ASP | 0.085 | | | | |
| 8 | Lens 4 | −2.614 | ASP | 0.540 | Plastic | 1.544 | 55.9 | 1.19 |
| 9 | | −0.558 | ASP | 0.030 | | | | |
| 10 | Lens 5 | 1.130 | ASP | 0.363 | Plastic | 1.535 | 56.3 | −1.87 |
| 11 | | 0.471 | ASP | 0.497 | | | | |
| 12 | IR-filter | Plano | | 0.200 | Glass | 1.517 | 64.2 | — |
| 13 | | Plano | | 0.121 | | | | |
| 14 | Image | Plano | | — | | | | |

Note:
Reference Wavelength is 587.6 nm (d-line)

TABLE 13

| Aspheric Coefficients | | | | | |
|---|---|---|---|---|---|
| Surface # | 1 | 2 | 4 | 5 | 6 |
| k = | −2.6412E+00 | −3.9716E+00 | −4.2013E+00 | −3.0000E+01 | −1.2372E+01 |
| A4 = | −3.4497E−02 | 1.4603E−02 | 7.3475E−02 | −7.4838E−01 | −2.0848E+00 |
| A6 = | 4.5512E−01 | 8.2405E−02 | −1.2970E−01 | 3.3345E−01 | 2.2555E+00 |
| A8 = | −1.7212E+00 | 8.6389E+00 | 1.9621E+00 | −7.0990E+00 | −2.0045E+01 |
| A10 = | 4.0526E+00 | −3.9934E+01 | −3.4987E+00 | 1.4266E+01 | 9.2900E+01 |
| A12 = | −3.8141E+00 | 9.9756E+01 | | | −1.1524E+02 |

| Surface # | 7 | 8 | 9 | 10 | 11 |
|---|---|---|---|---|---|
| k = | −2.0137E+01 | 1.1220E+01 | −2.1578E+00 | −3.1243E+00 | −3.3422E+00 |
| A4 = | −9.2376E−01 | 2.6196E−01 | −3.2395E−01 | −9.0975E−01 | −5.4722E−01 |
| A6 = | 9.2853E−01 | −1.8270E+00 | −1.0228E−01 | 1.5942E+00 | 8.8974E−01 |
| A8 = | −2.9975E−01 | 7.7652E+00 | 1.3949E+00 | −1.8408E+00 | −1.0272E+00 |
| A10 = | | −2.0907E+01 | −1.9261E+00 | 1.4923E+00 | 7.6664E−01 |
| A12 = | | 3.7542E+01 | 8.7814E−01 | −7.8122E−01 | −3.5000E−01 |
| A14 = | | −3.8675E+01 | 3.8299E+00 | 2.3287E−01 | 8.8677E−02 |
| A16 = | | 1.6961E+01 | −3.9423E+00 | −2.9849E−02 | −9.5444E−03 |

The equation of the aspheric surface profiles of the fifth embodiment has the same form as that of the first embodiment. Moreover, the definitions of the parameters of the relations are the same as those set forth in the first embodiment, but the value of the relations of the fifth embodiment are listed in the following TABLE 14:

TABLE 14

| (Embodiment 5) | | | |
|---|---|---|---|
| f [mm] | 1.86 | (R7 + R8)/(R7 − R8) | 1.54 |
| Fno | 2.10 | |R10/R9| | 0.42 |
| HFOV [deg.] | 39.3 | f/fl | −0.224 |

| | |
|---|---|
| V2/V3 | 2.40 |
| Td/ΣCT | 1.23 |
| CT4/f | 0.29 |
| Dsr4/Dr1r4 | 0.51 |
| (T34 + T45)/CT4 | 0.21 |
| FOV [deg.] | 78.6 |

Embodiment 6

Figure 6A:
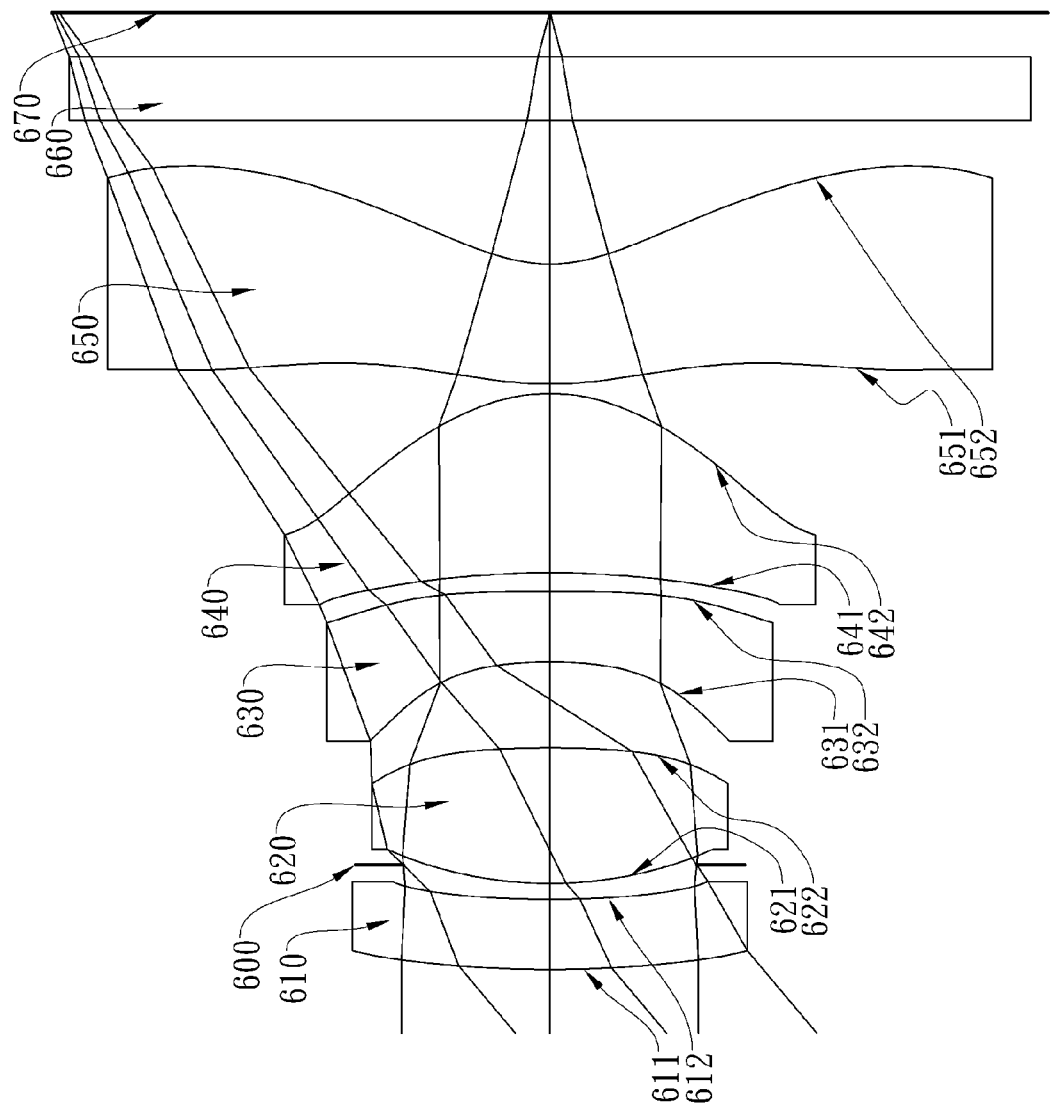
FIG. 6A shows an optical image capturing lens system in accordance with the sixth embodiment of the present invention.
Figure 6B:
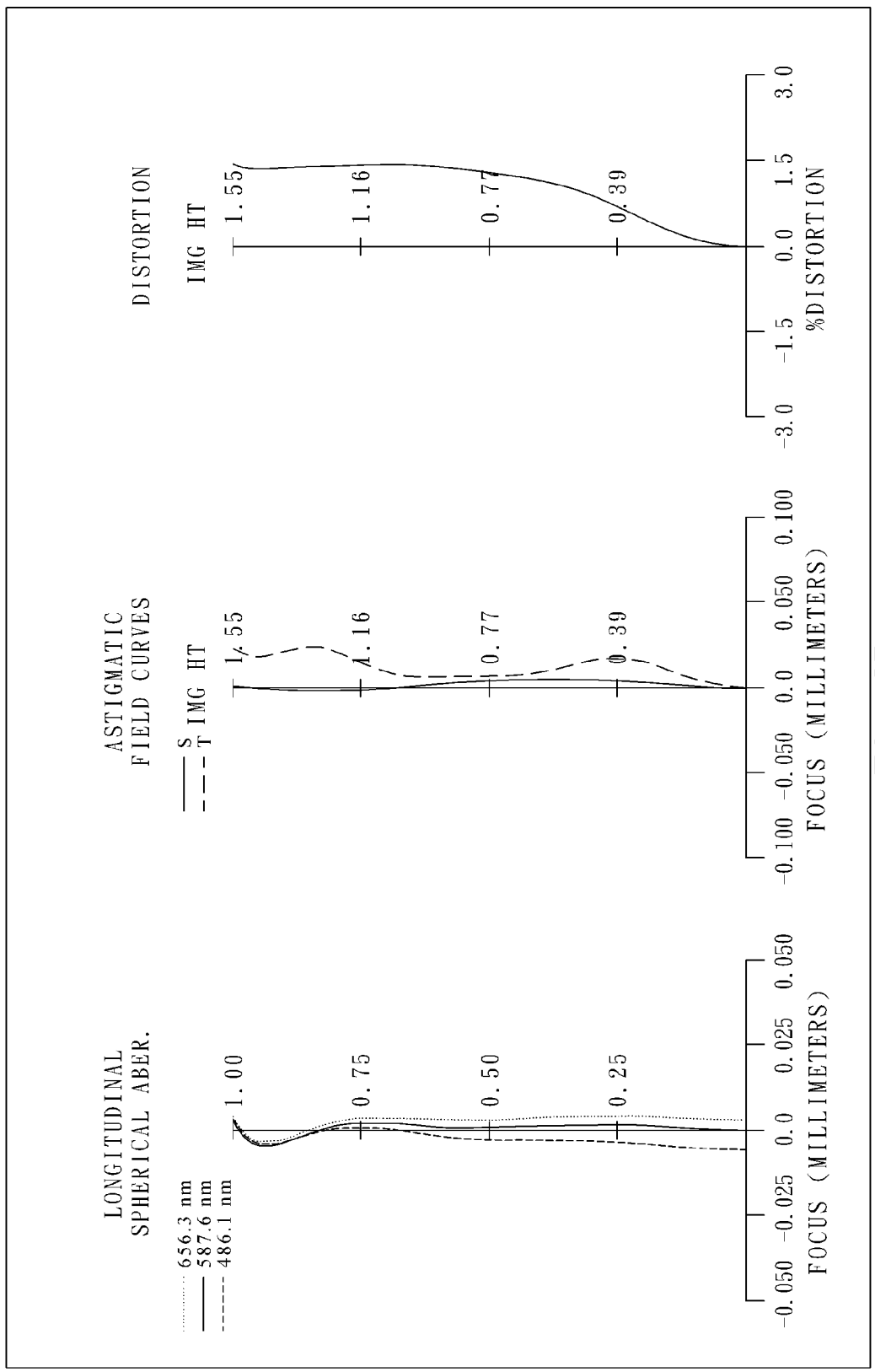
FIG. 6B shows the aberration curves of the sixth embodiment of the present invention.

FIG. 6A shows an optical image capturing lens system in accordance with the sixth embodiment of the present invention, and FIG. 6B shows the aberration curves of the sixth embodiment of the present invention. The optical image capturing lens system of the sixth embodiment of the present invention mainly comprises five lens elements with refractive power, in order from an object side to an image side:

a plastic first lens element 610 with negative refractive power having a convex object-side surface 611 at the paraxial region and a concave image-side surface 612 at the paraxial region, the object-side and image-side surfaces 611 and 612 thereof being aspheric;

a plastic second lens element 620 with positive refractive power having a convex object-side surface 621 at the paraxial region and a convex image-side surface 622 at the paraxial region, the object-side and image-side surfaces 621 and 622 thereof being aspheric;

a plastic third lens element 630 with negative refractive power having a concave object-side surface 631 at the paraxial region and a plane image-side surface 632 at the paraxial region and convex shape at the peripheral region, the object-side and image-side surfaces 631 and 632 thereof being aspheric;

a plastic fourth lens element 640 with positive refractive power having a concave object-side surface 641 at the paraxial region and a convex image-side surface 642 at the paraxial region, the object-side and image-side surfaces 641 and 642 thereof being aspheric; and a plastic fifth lens element 650 with negative refractive power having a convex object-side surface 651 at the paraxial region and a concave image-side surface 652 at the paraxial region and convex shape at the peripheral region, the object-side and image-side surfaces 651 and 652 thereof being aspheric;

wherein the lens elements of the optical image capturing lens system with refractive power are five lens elements which are the first lens element 610, the second lens element 620, the third lens element 630, the fourth lens element 640 and the fifth lens element 650;

wherein an aperture stop 600 is disposed between the first lens element 610 and the second lens element 620;

the optical image capturing lens system further comprises an IR filter 660 disposed between the image-side surface 652 of the fifth lens element 650 and an image plane 670, and the IR filter 660 is made of glass and has no influence on the focal length of the optical image capturing lens system.

The detailed optical data of the sixth embodiment is shown in TABLE 15, and the aspheric surface data is shown in TABLE 16, wherein the units of curvature radius, the central thickness and the focal length are expressed in mm, and HFOV is defined as half of the maximal field of view.

TABLE 15

(Embodiment 6)
f = 1.82 mm, Fno = 1.95, HFOV = 40.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.425 | ASP | 0.220 | Plastic | 1.640 | 23.3 | −72.92 |
| 2 | | 3.111 | ASP | 0.108 | | | | |
| 3 | Ape. Stop | Plano | | −0.058 | | | | |
| 4 | Lens 2 | 1.273 | ASP | 0.425 | Plastic | 1.544 | 55.9 | 1.82 |
| 5 | | −3.915 | ASP | 0.270 | | | | |
| 6 | Lens 3 | −1.427 | ASP | 0.220 | Plastic | 1.640 | 23.3 | −2.23 |
| 7 | | ∞ | ASP | 0.060 | | | | |
| 8 | Lens 4 | −2.654 | ASP | 0.562 | Plastic | 1.544 | 55.9 | 1.19 |
| 9 | | −0.558 | ASP | 0.030 | | | | |
| 10 | Lens 5 | 1.155 | ASP | 0.376 | Plastic | 1.535 | 56.3 | −1.83 |
| 11 | | 0.469 | ASP | 0.450 | | | | |
| 12 | IR-filter | Plano | | 0.200 | Glass | 1.517 | 64.2 | — |
| 13 | | Plano | | 0.138 | | | | |
| 14 | Image | Plano | | — | | | | |

Note:
Reference Wavelength is 587.6 nm (d-line)

TABLE 16

Aspheric Coefficients

| Surface # | 1 | 2 | 4 | 5 | 6 |
|---|---|---|---|---|---|
| k = | −9.2415E+00 | −3.7352E+00 | −2.2117E+00 | −2.4921E+01 | −7.9075E+00 |
| A4 = | −3.8794E−02 | 9.1554E−02 | 1.4911E−01 | −7.0087E−01 | −2.1212E+00 |
| A6 = | 3.4248E−01 | −4.2385E−01 | −3.2616E−01 | 4.0807E−01 | 2.1723E+00 |
| A8 = | −1.5333E+00 | 9.7067E+00 | 1.5391E+00 | −6.4340E+00 | −1.9919E+01 |
| A10 = | 4.5717E+00 | −4.3669E+01 | −1.4863E+00 | 1.3714E+01 | 9.5386E+01 |

TABLE 16-continued

Aspheric Coefficients

| A12 = | −3.8141E+00 | 9.9756E+01 | | | −1.1524E+02 |
|---|---|---|---|---|---|

| Surface # | 7 | 8 | 9 | 10 | 11 |
|---|---|---|---|---|---|
| k = | 3.0000E+00 | 1.1479E+01 | −2.0581E+00 | −3.4524E+00 | −3.2680E+00 |
| A4 = | −8.5466E−01 | 3.6193E−01 | −3.1121E−01 | −9.5149E−01 | −5.5387E−01 |
| A6 = | 1.0275E+00 | −1.7654E+00 | −9.0946E−02 | 1.5959E+00 | 9.0404E−01 |
| A8 = | −2.2851E−01 | 7.6836E+00 | 1.3648E+00 | −1.8369E+00 | −1.0319E+00 |
| A10 = | | −2.0920E+01 | −1.9941E+00 | 1.4960E+00 | 7.6333E−01 |
| A12 = | | 3.7651E+01 | 8.1631E−01 | −7.8164E−01 | −3.4968E−01 |
| A14 = | | −3.8675E+01 | 3.7906E+00 | 2.3266E−01 | 8.9100E−02 |
| A16 = | | 1.6961E+01 | −3.8064E+00 | −3.0162E−02 | −9.5781E−03 |

The equation of the aspheric surface profiles of the sixth embodiment has the same form as that of the first embodiment. Moreover, the definitions of the parameters of the relations are the same as those set forth in the first embodiment, but the value of the relations of the sixth embodiment are listed in TABLE 17:

TABLE 17

(Embodiment 6)

| f [mm] | 1.82 | (R7 + R8)/(R7 − R8) | 1.53 |
|---|---|---|---|
| Fno | 1.95 | |R10/R9| | 0.41 |
| HFOV [deg.] | 40.1 | f/fl | −0.025 |
| V2/V3 | 2.40 | Td/ΣCT | 1.23 |
| CT4/f | 0.31 | Dsr4/Dr1r4 | 0.53 |
| (T34 + T45)/CT4 | 0.16 | FOV [deg.] | 80.1 |

Embodiment 7

Figure 7A:
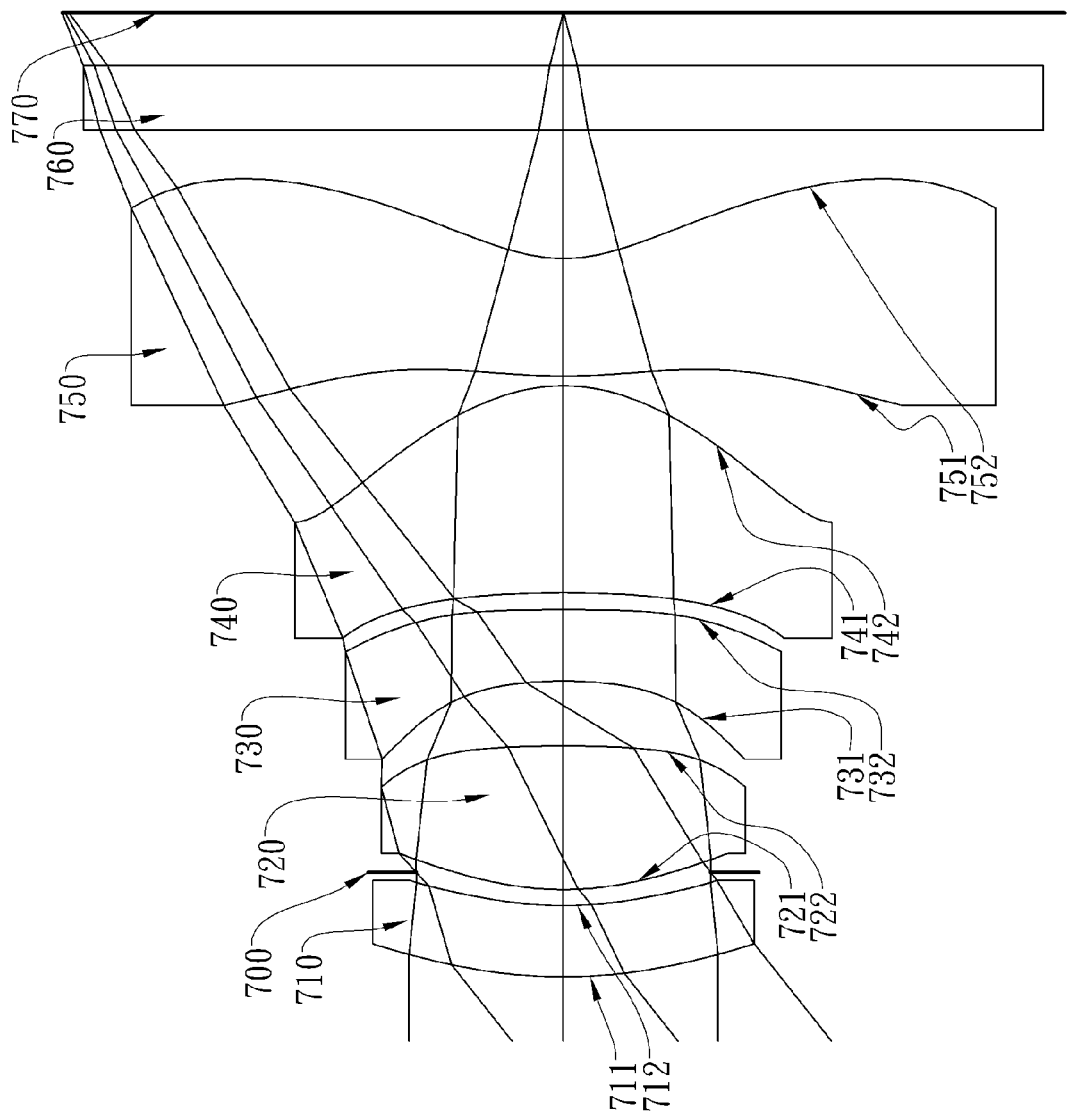
FIG. 7A shows an optical image capturing lens system in accordance with the seventh embodiment of the present invention.
Figure 7B:
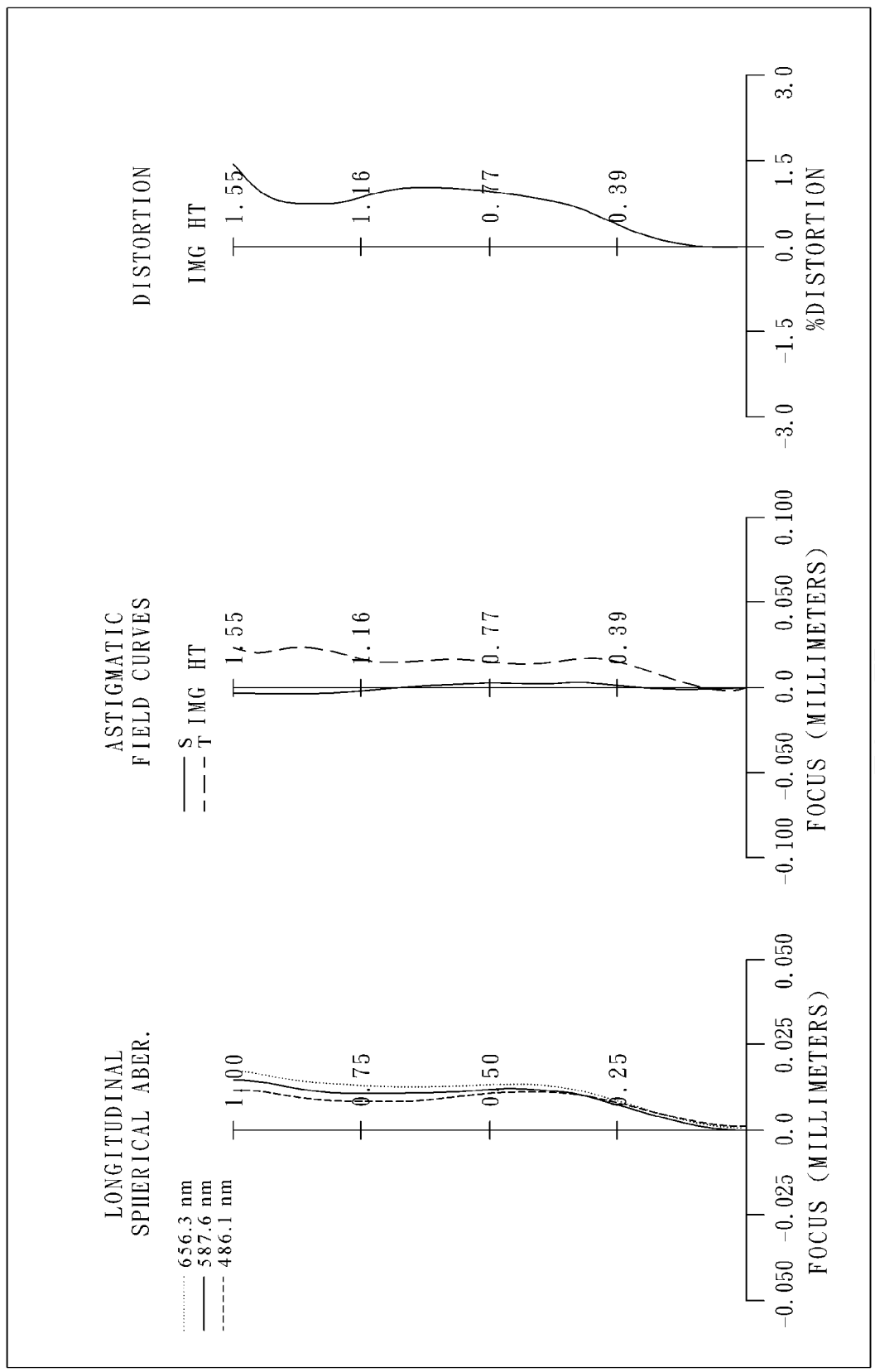
FIG. 7B shows the aberration curves of the seventh embodiment of the present invention.

FIG. 7A shows an optical image capturing lens system in accordance with the seventh embodiment of the present invention, and FIG. 7B shows the aberration curves of the seventh embodiment of the present invention. The optical image capturing lens system of the seventh embodiment of the present invention mainly comprises five lens elements with refractive power, in order from an object side to an image side:

a plastic first lens element 710 with negative refractive power having a convex object-side surface 711 at the paraxial region and a concave image-side surface 712 at the paraxial region, the object-side and image-side surfaces 711 and 712 thereof being aspheric;

a glass second lens element 720 with positive refractive power having a convex object-side surface 721 at the paraxial region and a convex image-side surface 722 at the paraxial region, the object-side and image-side surfaces 721 and 722 thereof being aspheric;

a plastic third lens element 730 with negative refractive power having a concave object-side surface 731 at the paraxial region and a convex image-side surface 732 at the paraxial region and convex shape at the peripheral region, the object-side and image-side surfaces 731 and 732 thereof being aspheric;

a plastic fourth lens element 740 with positive refractive power having a concave object-side surface 741 at the paraxial region and a convex image-side surface 742 at the paraxial region, the object-side and image-side surfaces 741 and 742 thereof being aspheric; and a plastic fifth lens element 750 with negative refractive power having a convex object-side surface 751 at the paraxial region and a concave image-side surface 752 at the paraxial region and convex shape at the peripheral region, the object-side and image-side surfaces 751 and 752 thereof being aspheric;

wherein the lens elements of the optical image capturing lens system with refractive power are five lens elements which are the first lens element 710, the second lens element 720, the third lens element 730, the fourth lens element 740 and the fifth lens element 750;

wherein an aperture stop 700 is disposed between the first lens element 710 and the second lens element 720;

the optical image capturing lens system further comprises an IR filter 760 disposed between the image-side surface 752 of the fifth lens element 750 and an image plane 770, and the IR filter 760 is made of glass and has no influence on the focal length of the optical image capturing lens system.

The detailed optical data of the seventh embodiment is shown in TABLE 18, and the aspheric surface data is shown in TABLE 19, wherein the units of curvature radius, the central thickness and the focal length are expressed in mm, and HFOV is defined as half of the maximal field of view.

TABLE 18

(Embodiment 7)
f = 1.92 mm, Fno = 2.00, HFOV = 38.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.501 | ASP | 0.222 | Plastic | 1.640 | 23.3 | −10.50 |
| 2 | | 1.156 | ASP | 0.104 | | | | |
| 3 | Ape. Stop | Plano | | −0.054 | | | | |
| 4 | Lens 2 | 0.937 | ASP | 0.447 | Glass | 1.542 | 62.9 | 1.50 |
| 5 | | −5.020 | ASP | 0.202 | | | | |
| 6 | Lens 3 | −1.419 | ASP | 0.222 | Plastic | 1.640 | 23.3 | −2.46 |
| 7 | | −15.048 | ASP | 0.053 | | | | |
| 8 | Lens 4 | −3.658 | ASP | 0.645 | Plastic | 1.544 | 55.9 | 1.08 |
| 9 | | −0.539 | ASP | 0.030 | | | | |

TABLE 18-continued (Embodiment 7)
f = 1.92 mm, Fno = 2.00, HFOV = 38.4 deg.

| Surface # | | Curvature Radius | | Thickness | Material | Index | Abbe # | Focal Length |
|---|---|---|---|---|---|---|---|---|
| 10 | Lens 5 | 1.857 | ASP | 0.366 | Plastic | 1.535 | 56.3 | −1.31 |
| 11 | | 0.473 | ASP | 0.400 | | | | |
| 12 | IR-filter | Plano | | 0.200 | Glass | 1.517 | 64.2 | — |
| 13 | | Plano | | 0.165 | | | | |
| 14 | Image | Plano | | — | | | | |

Note:
Reference Wavelength is 587.6 nm (d-line)

TABLE 19

Aspheric Coefficients

| Surface # | 1 | 2 | 4 | 5 | 6 |
|---|---|---|---|---|---|
| k = | −6.4556E+00 | −1.1381E+01 | −6.2902E+00 | 2.7627E+00 | −7.3732E+00 |
| A4 = | 1.2126E−02 | 2.9490E−02 | 7.4625E−02 | −5.9573E−01 | −1.9015E+00 |
| A6 = | 4.0015E−01 | −5.7583E−01 | 5.6077E−01 | −7.8982E−01 | 2.3422E+00 |
| A8 = | −2.0946E+00 | 8.8588E+00 | −3.1300E+00 | −2.5487E+00 | −2.3528E+01 |
| A10 = | 3.4613E+00 | −4.5710E+01 | 3.9237E+00 | 5.5140E+00 | 1.0045E+02 |
| A12 = | −7.5684E−01 | 9.9756E+01 | | | −1.1523E+02 |

| Surface # | 7 | 8 | 9 | 10 | 11 |
|---|---|---|---|---|---|
| k = | 3.0000E+00 | 9.4016E+00 | −2.6399E+00 | −1.3859E+01 | −3.9880E+00 |
| A4 = | −9.0697E−01 | −7.9448E−02 | −3.9853E−01 | −9.1265E−01 | −5.3884E−01 |
| A6 = | 9.1558E−01 | −1.7171E+00 | 3.7001E−03 | 1.5858E+00 | 8.7568E−01 |
| A8 = | −2.9475E−01 | 8.1449E+00 | 1.4023E+00 | −1.8295E+00 | −1.0188E+00 |
| A10 = | | −2.2390E+01 | −2.1333E+00 | 1.4891E+00 | 7.5798E−01 |
| A12 = | | 3.6842E+01 | 6.2356E−01 | −7.8392E−01 | −3.4947E−01 |
| A14 = | | −3.8397E+01 | 3.7807E+00 | 2.3349E−01 | 8.9776E−02 |
| A16 = | | 1.6931E+01 | −3.3487E+00 | −3.0062E−02 | −9.7537E−03 |

The equation of the aspheric surface profiles of the seventh embodiment has the same form as that of the first embodiment. Moreover, the definitions of the parameters of the relations are the same as those set forth in the first embodiment, but the value of the relations of the seventh embodiment are listed in the following TABLE 20:

TABLE 20

(Embodiment 7)

| f [mm] | 1.92 | (R7 + R8)/(R7 − R8) | 1.35 |
|---|---|---|---|
| Fno | 2.00 | |R10/R9| | 0.25 |
| HFOV [deg.] | 38.4 | f/f1 | −0.183 |
| V2/V3 | 2.70 | Td/ΣCT | 1.18 |
| CT4/f | 0.34 | Dsr4/Dr1r4 | 0.55 |
| (T34 + T45)/CT4 | 0.13 | FOV [deg.] | 76.7 |

Embodiment 8

Figure 8A:
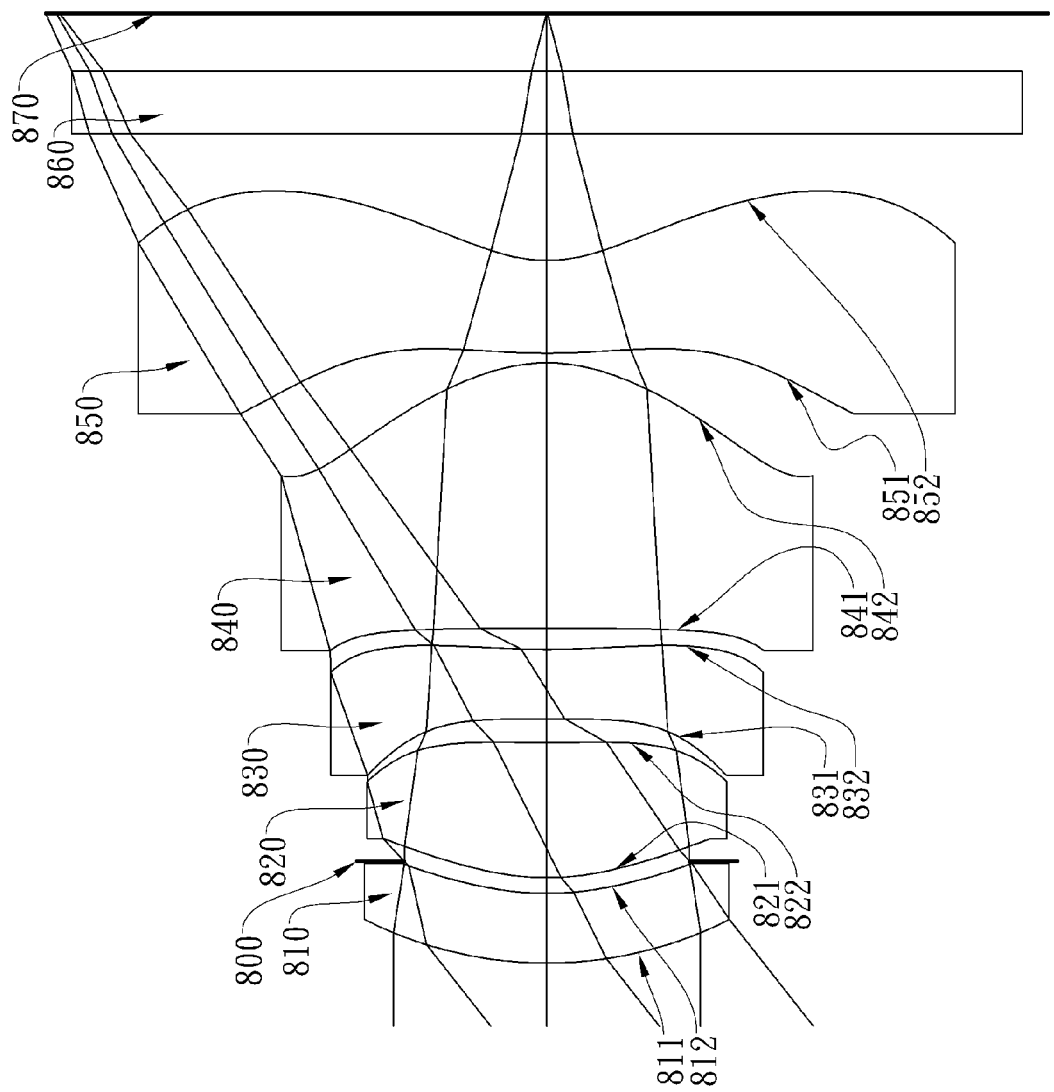
FIG. 8A shows an optical image capturing lens system in accordance with the eighth embodiment of the present invention.
Figure 8B:
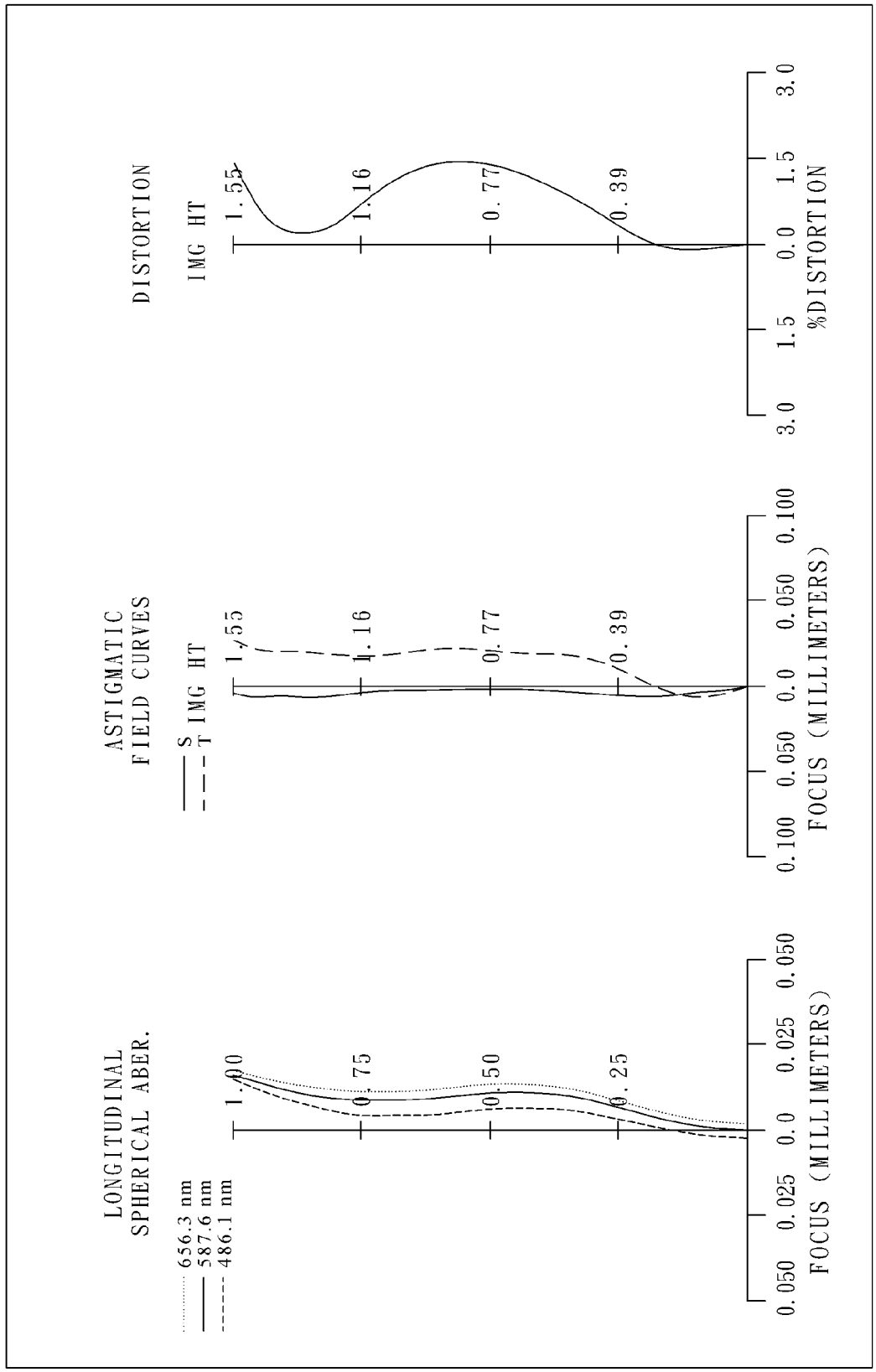
FIG. 8B shows the aberration curves of the eighth embodiment of the present invention.

FIG. 8A shows an optical image capturing lens system in accordance with the eighth embodiment of the present invention, and FIG. 8B shows the aberration curves of the eighth embodiment of the present invention. The optical image capturing lens system of the eighth embodiment of the present invention mainly comprises five lens elements with refractive power, in order from an object side to an image side:

a plastic first lens element 810 with negative refractive power having a convex object-side surface 811 at the paraxial region and a concave image-side surface 812 at the paraxial region, the object-side and image-side surfaces 811 and 812 thereof being aspheric;

a plastic second lens element 820 with positive refractive power having a convex object-side surface 821 at the paraxial region and a concave image-side surface 822 at the paraxial region, the object-side and image-side surfaces 821 and 822 thereof being aspheric;

a plastic third lens element 830 with negative refractive power having a concave object-side surface 831 at the paraxial region and a concave image-side surface 832 at the paraxial region and convex shape at the peripheral region, the object-side and image-side surfaces 831 and 832 thereof being aspheric;

a plastic fourth lens element 840 with positive refractive power having a concave object-side surface 841 at the paraxial region and a convex image-side surface 842 at the paraxial region, the object-side and image-side surfaces 841 and 842 thereof being aspheric; and a plastic fifth lens element 850 with negative refractive power having a convex object-side surface 851 at the paraxial region and a concave image-side surface 852 at the paraxial region and convex shape at the peripheral region, the object-side and image-side surfaces 851 and 852 thereof being aspheric;

wherein the lens elements of the optical image capturing lens system with refractive power are five lens elements which are the first lens element 810, the second lens element 820, the third lens element 830, the fourth lens element 840 and the fifth lens element 850;

wherein an aperture stop 800 is disposed between the first lens element 810 and the second lens element 820;

the optical image capturing lens system further comprises an IR filter 860 disposed between the image-side surface 852 of the fifth lens element 850 and an image plane 870, and the IR filter 860 is made of glass and has no influence on the focal length of the optical image capturing lens system.

The detailed optical data of the eighth embodiment is shown in TABLE 21, and the aspheric surface data is shown in TABLE 22, wherein the units of curvature radius, the central thickness and the focal length are expressed in mm, and HFOV is defined as half of the maximal field of view.

TABLE 21

(Embodiment 8)
f = 1.94 mm, Fno = 2.00, HFOV = 38.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.205 | ASP | 0.220 | Plastic | 1.640 | 23.3 | −6.09 |
| 2 | | 0.855 | ASP | 0.102 | | | | |
| 3 | Ape. Stop | Plano | | −0.052 | | | | |
| 4 | Lens 2 | 0.787 | ASP | 0.427 | Plastic | 1.544 | 55.9 | 1.56 |
| 5 | | 8.796 | ASP | 0.075 | | | | |
| 6 | Lens 3 | −37.866 | ASP | 0.220 | Plastic | 1.640 | 23.3 | −4.02 |
| 7 | | 2.769 | ASP | 0.067 | | | | |
| 8 | Lens 4 | −14.073 | ASP | 0.839 | Plastic | 1.544 | 55.9 | 0.98 |
| 9 | | −0.524 | ASP | 0.030 | | | | |
| 10 | Lens 5 | 2.002 | ASP | 0.293 | Plastic | 1.535 | 56.3 | −1.08 |
| 11 | | 0.426 | ASP | 0.400 | | | | |
| 12 | IR-filter | Plano | | 0.200 | Glass | 1.517 | 64.2 | — |
| 13 | | Plano | | 0.181 | | | | |
| 14 | Image | Plano | | — | | | | |

Note:
Reference Wavelength is 587.6 nm (d-line)

TABLE 22

Aspheric Coefficients

| Surface # | 1 | 2 | 4 | 5 | 6 |
|---|---|---|---|---|---|
| k = | −6.1999E+00 | −9.3781E+00 | −6.7772E+00 | −1.8332E+01 | −3.0000E+01 |
| A4 = | 1.4476E−01 | 1.6393E−01 | 1.0233E−01 | −1.0271E+00 | −1.8566E+00 |
| A6 = | 8.7427E−01 | −2.5634E−01 | 5.4533E−01 | −9.2190E−01 | 2.2045E+00 |
| A8 = | −2.6715E+00 | 8.2233E+00 | −3.7887E+00 | −3.9733E+00 | −2.5116E+01 |
| A10 = | 3.2635E+00 | −4.8760E+01 | 5.0232E+00 | 1.1406E+01 | 9.8778E+01 |
| A12 = | −7.5683E−01 | 9.9756E+01 | | | −1.1523E+02 |

| Surface # | 7 | 8 | 9 | 10 | 11 |
|---|---|---|---|---|---|
| k = | 2.9774E+00 | 3.0000E+00 | −3.5481E+00 | −2.4199E+00 | −4.0803E+00 |
| A4 = | −8.0954E−01 | 1.6889E−01 | −4.0832E−01 | −1.2271E+00 | −5.8916E−01 |
| A6 = | 8.9712E−01 | −1.7069E+00 | 5.7765E−02 | 1.5957E+00 | 8.8795E−01 |
| A8 = | −9.2049E−01 | 7.2697E+00 | 1.3777E+00 | −1.7041E+00 | −1.0309E+00 |
| A10 = | −1.5434E+00 | −2.2354E+01 | −2.0993E+00 | 1.5153E+00 | 7.5848E−01 |
| A12 = | −2.8535E−08 | 3.6842E+01 | 8.0423E−01 | −8.0464E−01 | −3.4638E−01 |
| A14 = | | −3.8397E+01 | 3.9466E+00 | 2.1331E−01 | 8.8983E−02 |
| A16 = | | 1.6931E+01 | −3.7735E+00 | −2.5195E−02 | −9.8197E−03 |

The equation of the aspheric surface profiles of the eighth embodiment has the same form as that of the first embodiment. Moreover, the definitions of the parameters of the relations are the same as those set forth in the first embodiment, but the value of the relations of the eighth embodiment are listed in TABLE 23:

TABLE 23

(Embodiment 8)

| f [mm] | 1.94 | (R7 + R8)/(R7 − R8) | 1.08 |
|---|---|---|---|
| Fno | 2.00 | |R10/R9| | 0.21 |
| HFOV [deg.] | 38.1 | f/f1 | −0.318 |

TABLE 23-continued (Embodiment 8)

| V2/V3 | 2.40 | Td/ΣCT | 1.11 |
|---|---|---|---|
| CT4/f | 0.43 | Dsr4/Dr1r4 | 0.54 |
| (T34 + T45)/CT4 | 0.12 | FOV [deg.] | 76.2 |

Embodiment 9

Figure 9A:
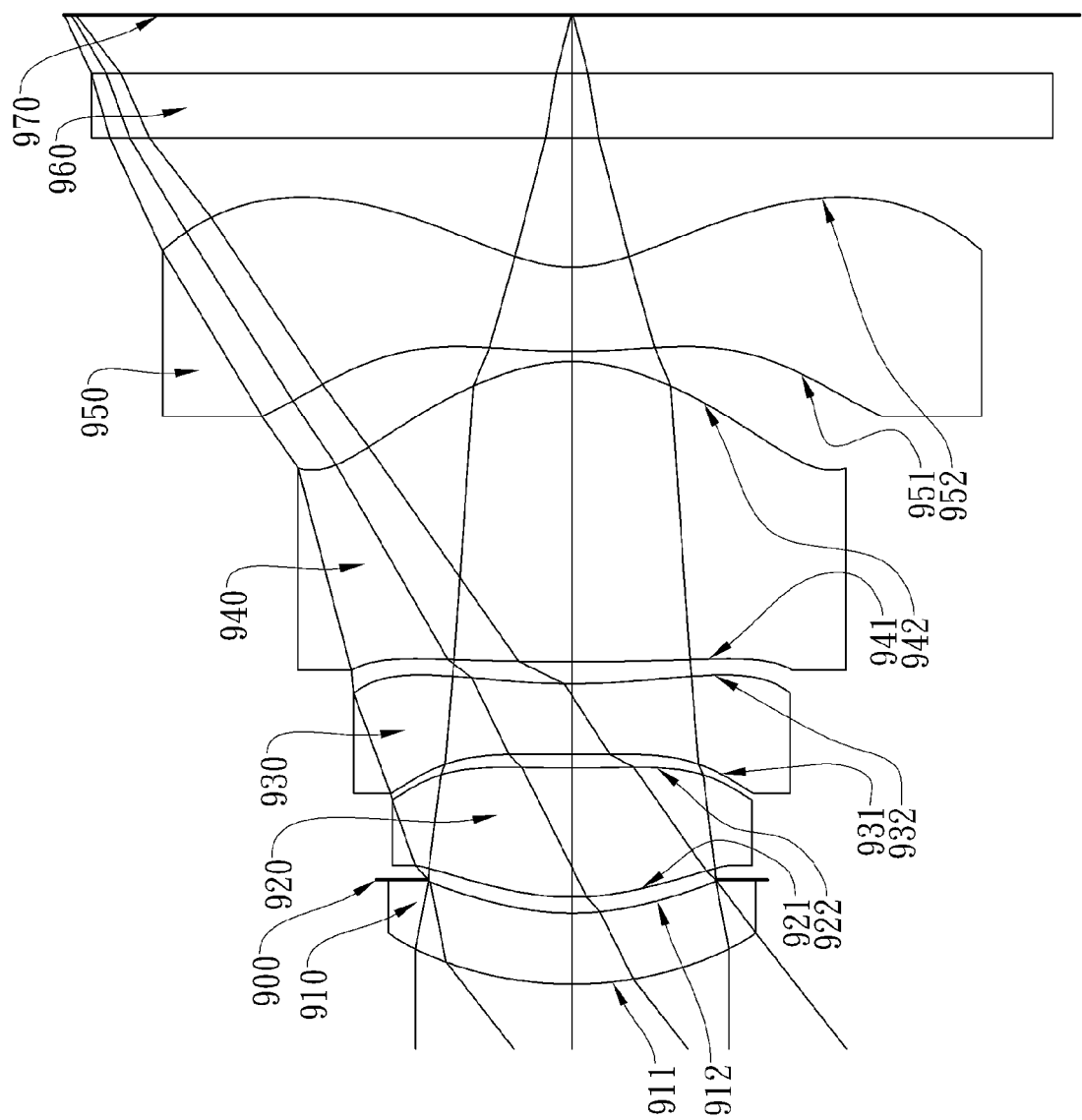
FIG. 9A shows an optical image capturing lens system in accordance with the ninth embodiment of the present invention.
Figure 9B:
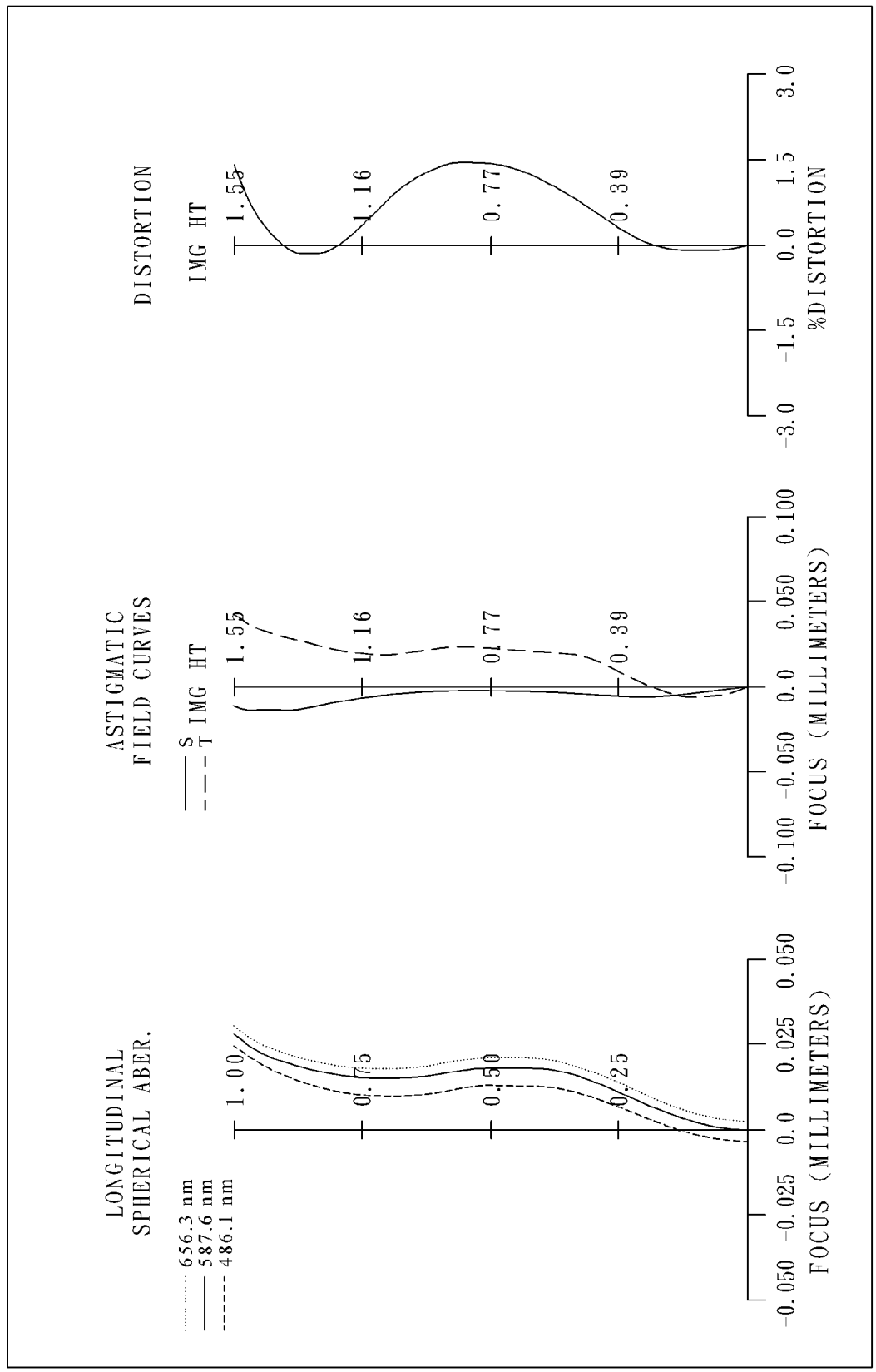
FIG. 9B shows the aberration curves of the ninth embodiment of the present invention.

FIG. 9A shows an optical image capturing lens system in accordance with the ninth embodiment of the present invention, and FIG. 9B shows the aberration curves of the ninth embodiment of the present invention. The optical image capturing lens system of the ninth embodiment of the present invention mainly comprises five lens elements with refractive power, in order from an object side to an image side:

a plastic first lens element 910 with negative refractive power having a convex object-side surface 911 at the paraxial region and a concave image-side surface 912 at the paraxial region, the object-side and image-side surfaces 911 and 912 thereof being aspheric;

a plastic second lens element 920 with positive refractive power having a convex object-side surface 921 at the paraxial region and a convex image-side surface 922 at the paraxial region, the object-side and image-side surfaces 921 and 922 thereof being aspheric;

a plastic third lens element 930 with negative refractive power having a convex object-side surface 931 at the paraxial region and a concave image-side surface 932 at the paraxial region and convex shape at the peripheral region, the object-side and image-side surfaces 931 and 932 thereof being aspheric;

a plastic fourth lens element 940 with positive refractive power having a convex object-side surface 941 at the paraxial region and a convex image-side surface 942 at the paraxial region, the object-side and image-side surfaces 941 and 942 thereof being aspheric; and a plastic fifth lens element 950 with negative refractive power having a convex object-side surface 951 at the paraxial region and a concave image-side surface 952 at the paraxial region and convex shape at the peripheral region, the object-side and image-side surfaces 951 and 952 thereof being aspheric;

wherein the lens elements of the optical image capturing lens system with refractive power are five lens elements which are the first lens element 910, the second lens element 920, the third lens element 930, the fourth lens element 940 and the fifth lens element 950;

wherein an aperture stop 900 is disposed between the first lens element 910 and the second lens element 920;

the optical image capturing lens system further comprises an IR filter 960 disposed between the image-side surface 952 of the fifth lens element 950 and an image plane 970, and the IR filter 960 is made of glass and has no influence on the focal length of the optical image capturing lens system.

The detailed optical data of the ninth embodiment is shown in TABLE 24, and the aspheric surface data is shown in TABLE 25, wherein the units of curvature radius, the central thickness and the focal length are expressed in mm, and HFOV is defined as half of the maximal field of view.

TABLE 24

(Embodiment 9)
f = 1.94 mm, Fno = 2.00, HFOV = 38.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.101 | ASP | 0.220 | Plastic | 1.640 | 23.3 | −6.08 |
| 2 | | 0.791 | ASP | 0.103 | | | | |
| 3 | Ape. Stop | Plano | | −0.053 | | | | |
| 4 | Lens 2 | 0.790 | ASP | 0.400 | Plastic | 1.544 | 55.9 | 1.68 |
| 5 | | 4.847 | ASP | 0.041 | | | | |
| 6 | Lens 3 | 6.275 | ASP | 0.220 | Plastic | 1.640 | 23.3 | −4.53 |
| 7 | | 1.955 | ASP | 0.068 | | | | |
| 8 | Lens 4 | 10.824 | ASP | 0.931 | Plastic | 1.544 | 55.9 | 0.94 |
| 9 | | −0.522 | ASP | 0.030 | | | | |
| 10 | Lens 5 | 1.896 | ASP | 0.262 | Plastic | 1.535 | 56.3 | −1.03 |
| 11 | | 0.405 | ASP | 0.400 | | | | |
| 12 | IR-filter | Plano | | 0.200 | Glass | 1.517 | 64.2 | — |
| 13 | | Plano | | 0.181 | | | | |
| 14 | Image | Plano | | — | | | | |

Note:
Reference Wavelength is 587.6 nm (d-line)

TABLE 25

Aspheric Coefficients

| Surface # | 1 | 2 | 4 | 5 | 6 |
|---|---|---|---|---|---|
| k = | −5.5775E+00 | −8.1818E+00 | −7.3717E+00 | −3.0000E+01 | −2.9302E+01 |
| A4 = | 2.1409E−01 | 2.0444E−01 | 4.8730E−02 | −1.1703E+00 | −1.8485E+00 |
| A6 = | 1.0005E+00 | −1.8234E−01 | 2.4655E−01 | −1.2496E+00 | 2.5335E+00 |
| A8 = | −2.8209E+00 | 7.7621E+00 | −4.9591E+00 | −3.1658E+00 | −2.4613E+01 |
| A10 = | 4.5383E+00 | −4.8489E+01 | 4.0093E+00 | 1.7689E+01 | 1.0172E+02 |
| A12 = | −7.5683E−01 | 9.9756E+01 | | | −1.1523E+02 |

| Surface # | 7 | 8 | 9 | 10 | 11 |
|---|---|---|---|---|---|
| k = | 2.8286E+00 | −3.0000E+01 | −4.0754E+00 | −2.1149E+00 | −4.0500E+00 |
| A4 = | −7.8690E−01 | 1.5698E−01 | −3.9652E−01 | −1.2961E+00 | −6.1402E−01 |
| A6 = | 8.1869E−01 | −1.6331E+00 | 7.4336E−02 | 1.5591E+00 | 9.0503E−01 |
| A8 = | −8.7040E−01 | 7.1382E+00 | 1.3546E+00 | −1.6505E+00 | −1.0502E+00 |
| A10 = | −2.0535E+00 | −2.2028E+01 | −2.1201E+00 | 1.5645E+00 | 7.6839E−01 |
| A12 = | 1.4156E−06 | 3.6842E+01 | 8.2077E−01 | −7.9119E−01 | −3.4467E−01 |
| A14 = | | −3.8397E+01 | 3.9664E+00 | 2.0834E−01 | 8.7164E−02 |
| A16 = | | 1.6931E+01 | −3.8170E+00 | −5.8050E−02 | −9.7253E−03 |

The equation of the aspheric surface profiles of the ninth embodiment has the same form as that of the first embodiment. Moreover, the definitions of the parameters of the relations are the same as those set forth in the first embodiment, but the value of the relations of the ninth embodiment are listed in the following TABLE 26:

TABLE 26

(Embodiment 9)

| f [mm] | 1.94 | (R7 + R8)/(R7 − R8) | 0.91 |
|---|---|---|---|
| Fno | 2.00 | |R10/R9| | 0.21 |
| HFOV [deg.] | 38.1 | f/f1 | −0.319 |
| V2/V3 | 2.40 | Td/ΣCT | 1.09 |
| CT4/f | 0.48 | Dsr4/Dr1r4 | 0.52 |
| (T34 + T45)/CT4 | 0.11 | FOV [deg.] | 76.1 |

Embodiment 10

Figure 10A:
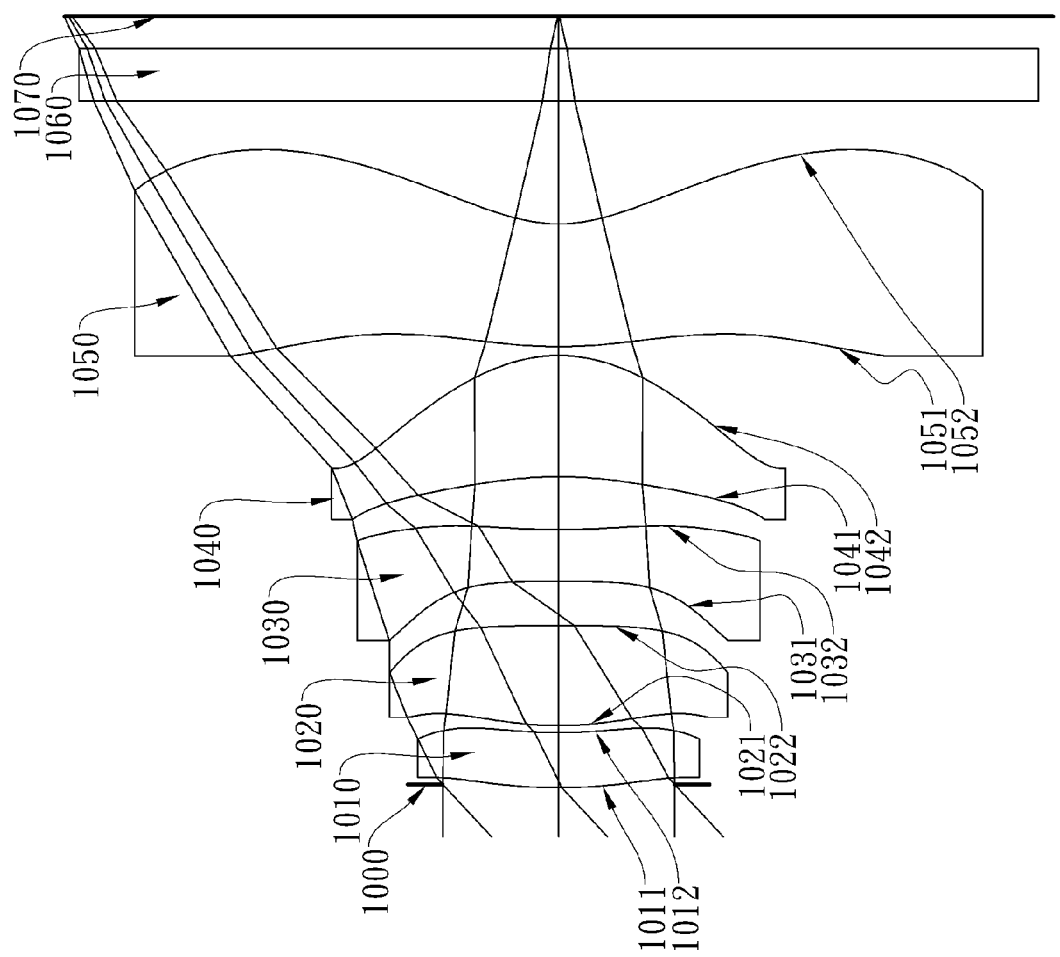
FIG. 10A shows an optical image capturing lens system in accordance with the tenth embodiment of the present invention.
Figure 10B:
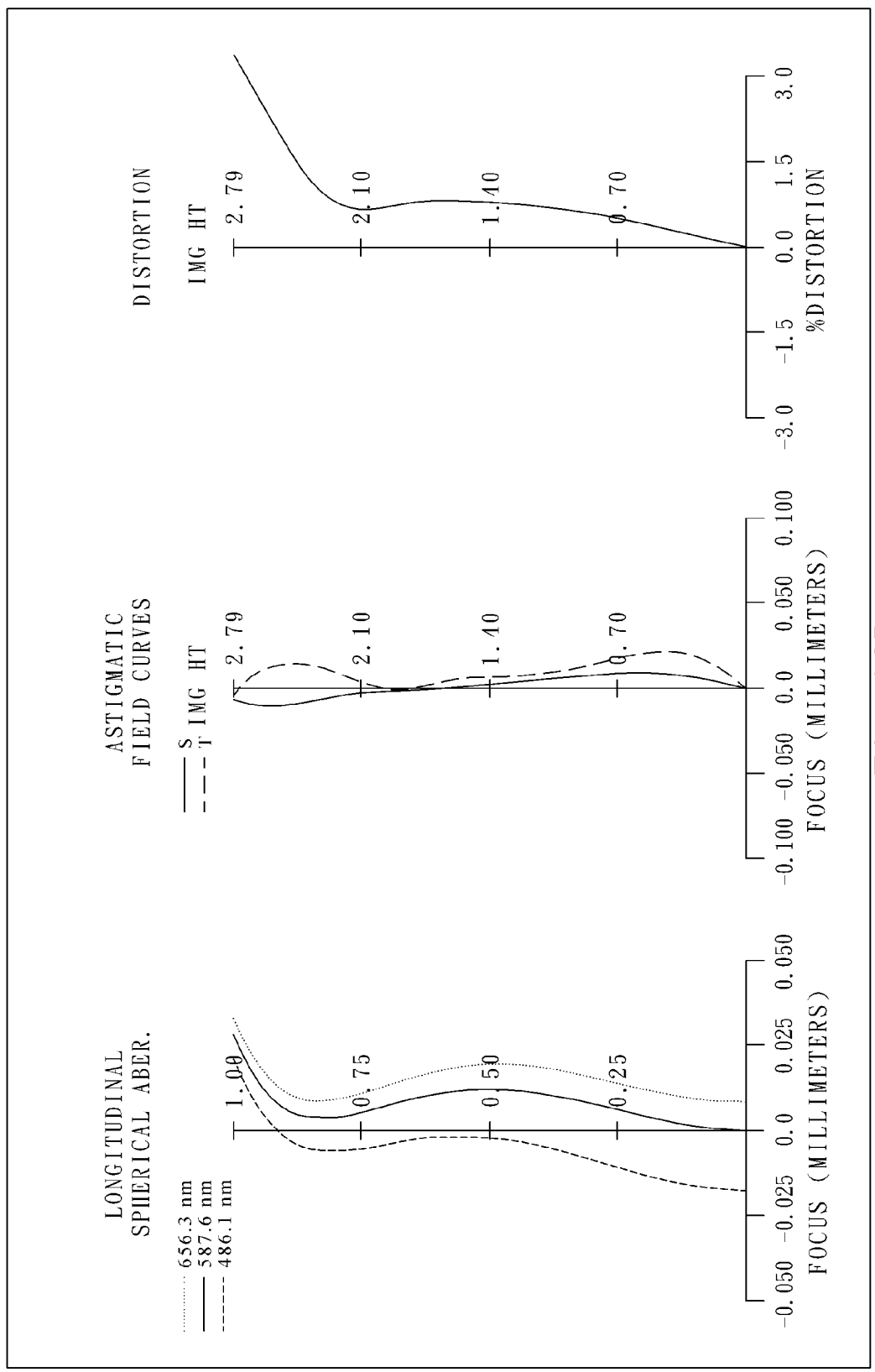
FIG. 10B shows the aberration curves of the tenth embodiment of the present invention.

FIG. 10A shows an optical image capturing lens system in accordance with the tenth embodiment of the present invention, and FIG. 10B shows the aberration curves of the tenth embodiment of the present invention. The optical image capturing lens system of the tenth embodiment of the present invention mainly comprises five lens elements with refractive power, in order from an object side to an image side:

a plastic first lens element 1010 with negative refractive power having a convex object-side surface 1011 at the paraxial region and a concave image-side surface 1012 at the paraxial region, the object-side and image-side surfaces 1011 and 1012 thereof being aspheric;

a plastic second lens element 1020 with positive refractive power having a convex object-side surface 1021 at the paraxial region and a convex image-side surface 1022 at the paraxial region, the object-side and image-side surfaces 1021 and 1022 thereof being aspheric;

a plastic third lens element 1030 with negative refractive power having a concave object-side surface 1031 at the paraxial region and a concave image-side surface 1032 at the paraxial region and convex shape at the peripheral region, the object-side and image-side surfaces 1031 and 1032 thereof being aspheric;

a plastic fourth lens element 1040 with positive refractive power having a concave object-side surface 1041 at the paraxial region and a convex image-side surface 1042 at the paraxial region, the object-side and image-side surfaces 1041 and 1042 thereof being aspheric; and a plastic fifth lens element 1050 with negative refractive power having a convex object-side surface 1051 at the paraxial region and a concave image-side surface 1052 at the paraxial region and convex shape at the peripheral region, the object-side and image-side surfaces 1051 and 1052 thereof being aspheric;

wherein the lens elements of the optical image capturing lens system with refractive power are five lens elements which are the first lens element 1010, the second lens element 1020, the third lens element 1030, the fourth lens element 1040 and the fifth lens element 1050;

wherein an aperture stop 1000 is disposed between an object and the first lens element 1010;

the optical image capturing lens system further comprises an IR filter 1060 disposed between the image-side surface 1052 of the fifth lens element 1050 and an image plane 1070, and the IR filter 1060 is made of glass and has no influence on the focal length of the optical image capturing lens system.

The detailed optical data of the tenth embodiment is shown in TABLE 27, and the aspheric surface data is shown in TABLE 28, wherein the units of curvature radius, the central thickness and the focal length are expressed in mm, and HFOV is defined as half of the maximal field of view.

TABLE 27

(Embodiment 10)
f = 2.91 mm, Fno = 2.20, HFOV = 42.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.020 | | | | |
| 2 | Lens 1 | 2.674 | ASP | 0.315 | Plastic | 1.544 | 55.9 | −192.78 |
| 3 | | 2.499 | ASP | 0.040 | | | | |
| 4 | Lens 2 | 1.825 | ASP | 0.571 | Plastic | 1.544 | 55.9 | 1.68 |
| 5 | | −18.189 | ASP | 0.252 | | | | |
| 6 | Lens 3 | −56.866 | ASP | 0.296 | Plastic | 1.634 | 23.8 | −5.97 |
| 7 | | 4.061 | ASP | 0.302 | | | | |
| 8 | Lens 4 | −2.255 | ASP | 0.692 | Plastic | 1.544 | 55.9 | 2.19 |
| 9 | | −0.865 | ASP | 0.050 | | | | |
| 10 | Lens 5 | 2.349 | ASP | 0.701 | Plastic | 1.535 | 56.3 | −2.87 |
| 11 | | 0.831 | ASP | 0.700 | | | | |
| 12 | IR-filter | Plano | | 0.300 | Glass | 1.517 | 64.2 | — |
| 13 | | Plano | | 0.185 | | | | |
| 14 | Image | Plano | | — | | | | |

Note:
Reference Wavelength is 587.6 nm (d-line)

TABLE 28

Aspheric Coefficients

| Surface # | 2 | 3 | 4 | 5 | 6 |
|---|---|---|---|---|---|
| k = | −3.1936E+01 | −1.4407E+00 | −4.7833E+00 | 5.0000E+01 | 5.0000E+01 |
| A4 = | 1.1162E−01 | −3.7012E−01 | −1.6558E−01 | −1.3017E−01 | −4.2215E−01 |

TABLE 28-continued

| Aspheric Coefficients | | | | | |
|---|---|---|---|---|---|
| A6 = | −4.2468E−01 | −2.7624E−03 | −9.1538E−02 | −1.2298E−01 | −1.1302E−01 |
| A8 = | 5.6983E−01 | −3.2361E−01 | 5.8324E−02 | 1.1298E−01 | −1.8857E−01 |
| A10 = | −8.1041E−01 | 5.6868E−01 | −4.8841E−01 | −6.2331E−01 | 6.6734E−01 |
| A12 = | 3.9794E−01 | −2.9765E−01 | 8.2299E−01 | 6.7977E−01 | −3.0024E−01 |
| A14 = | −3.2414E−02 | 1.1884E−01 | −3.3913E−01 | −2.0547E−01 | |

| Surface # | 7 | 8 | 9 | 10 | 11 |
|---|---|---|---|---|---|
| k = | −3.2279E+01 | −2.4102E+00 | −2.4902E+00 | −2.4488E+01 | −4.2957E+00 |
| A4 = | −1.1991E−01 | 1.0836E−01 | −1.8100E−01 | −6.1605E−02 | −7.6786E−02 |
| A6 = | −1.0480E−01 | 3.3743E−02 | 2.0881E−01 | −1.3294E−02 | 3.1736E−02 |
| A8 = | 1.6509E−01 | −2.5927E−01 | −1.7202E−01 | 7.1151E−03 | −9.6490E−03 |
| A10 = | −3.9646E−02 | 2.6518E−01 | 6.9875E−02 | −1.1342E−03 | 1.6144E−03 |
| A12 = | −1.3425E−02 | −1.1312E−01 | 7.7178E−03 | −7.4951E−05 | −1.3022E−04 |
| A14 = | | 1.4282E−02 | −6.1372E−03 | 1.9328E−05 | 3.4925E−06 |

The equation of the aspheric surface profiles of the tenth embodiment has the same form as that of the first embodiment. Moreover, the description of the factors in the relations is as those set forth in the first embodiment, but the values of the relations of the tenth embodiment are listed in TABLE 29.

TABLE 29

| (Embodiment 10) | | | |
|---|---|---|---|
| f [mm] | 2.91 | (R7 + R8)/(R7 − R8) | 2.24 |
| Fno | 2.20 | |R10/R9| | 0.35 |
| HFOV [deg.] | 42.9 | f/f1 | −0.015 |
| V2/V3 | 2.35 | Td/ΣCT | 1.25 |
| CT4/f | 0.24 | Dsr4/Dr1r4 | 0.98 |
| (T34 + T45)/CT4 | 0.51 | FOV [deg.] | 85.8 |

Embodiment 11

Figure 11A:
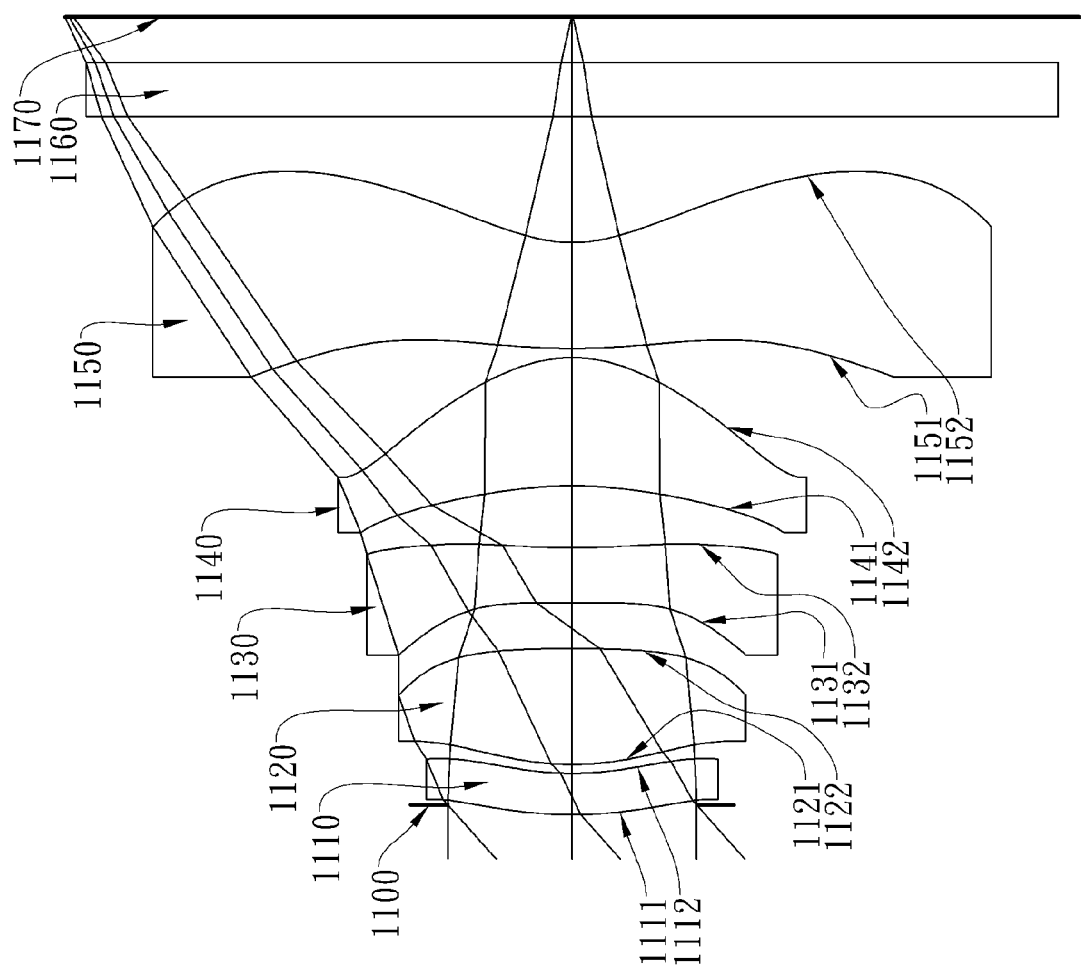
FIG. 11A shows an optical image capturing lens system in accordance with the eleventh embodiment of the present invention.
Figure 11B:
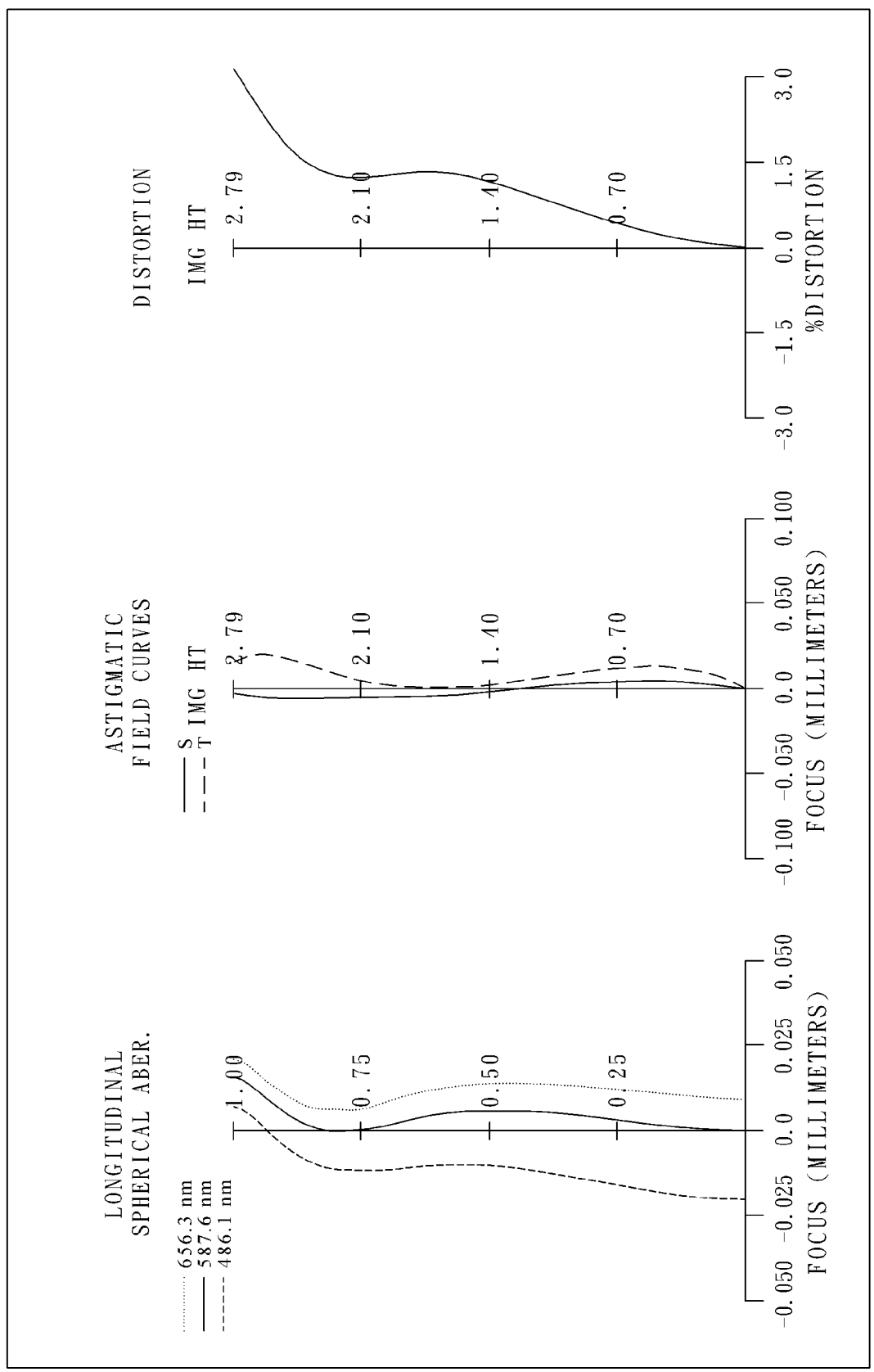
FIG. 11B shows the aberration curves of the eleventh embodiment of the present invention.

FIG. 11A shows an optical image capturing lens system in accordance with the tenth embodiment of the present invention, and FIG. 11B shows the aberration curves of the tenth embodiment of the present invention. The optical image capturing lens system of the tenth embodiment of the present invention mainly comprises five lens elements with refractive power, in order from an object side to an image side:

a plastic first lens element 1110 with negative refractive power having a convex object-side surface 1111 at the paraxial region and a concave image-side surface 1112 at the paraxial region, the object-side and image-side surfaces 1111 and 1112 thereof being aspheric;

a plastic second lens element 1120 with positive refractive power having a convex object-side surface 1121 at the paraxial region and a convex image-side surface 1122 at the paraxial region, the object-side and image-side surfaces 1121 and 1122 thereof being aspheric;

a plastic third lens element 1130 with negative refractive power having a plane object-side surface 1131 at the paraxial region and a concave image-side surface 1132 at the paraxial region and convex shape at the peripheral region, the object-side and image-side surfaces 1131 and 1132 thereof being aspheric;

a plastic fourth lens element 1140 with positive refractive power having a concave object-side surface 1141 at the paraxial region and a convex image-side surface 1142 at the paraxial region, the object-side and image-side surfaces 1141 and 1142 thereof being aspheric; and a plastic fifth lens element 1150 with negative refractive power having a convex object-side surface 1151 at the paraxial region and a concave image-side surface 1152 at the paraxial region and convex shape at the peripheral region, the object-side and image-side surfaces 1151 and 1152 thereof being aspheric;

wherein the lens elements of the optical image capturing lens system with refractive power are five lens elements which are the first lens element 1110, the second lens element 1120, the third lens element 1130, the fourth lens element 1140 and the fifth lens element 1150;

wherein an aperture stop 1100 is disposed between an object and the first lens element 1110;

the optical image capturing lens system further comprises an IR filter 1160 disposed between the image-side surface 1152 of the fifth lens element 1150 and an image plane 1170, and the IR filter 1160 is made of glass and has no influence on the focal length of the optical image capturing lens system.

The detailed optical data of the eleventh embodiment is shown in TABLE 30, and the aspheric surface data is shown in TABLE 31, wherein the units of curvature radius, the central thickness and the focal length are expressed in mm, and HFOV is defined as half of the maximal field of view.

TABLE 30

| (Embodiment 11) f = 3.04 mm, Fno = 2.20, HFOV = 41.7 deg. | | | | | | | |
|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | −0.055 | | | | |
| 2 | Lens 1 | 2.172 | ASP | 0.230 | Plastic | 1.544 | 55.9 | −12.16 |
| 3 | | 1.574 | ASP | 0.050 | | | | |
| 4 | Lens 2 | 1.527 | ASP | 0.644 | Plastic | 1.544 | 55.9 | 2.50 |
| 5 | | −10.421 | ASP | 0.256 | | | | |
| 6 | Lens 3 | ∞ | ASP | 0.305 | Plastic | 1.634 | 23.8 | −6.55 |
| 7 | | 4.154 | ASP | 0.344 | | | | |

TABLE 30-continued (Embodiment 11)
f = 3.04 mm, Fno = 2.20, HFOV = 41.7 deg.

| Surface # | | Curvature Radius | | Thickness | Material | Index | Abbe # | Focal Length |
|---|---|---|---|---|---|---|---|---|
| 8 | Lens 4 | −2.372 | ASP | 0.714 | Plastic | 1.544 | 55.9 | 1.77 |
| 9 | | −0.757 | ASP | 0.050 | | | | |
| 10 | Lens 5 | 3.450 | ASP | 0.589 | Plastic | 1.535 | 56.3 | −1.97 |
| 11 | | 0.760 | ASP | 0.700 | | | | |
| 12 | IR-filter | Plano | | 0.300 | Glass | 1.517 | 64.2 | — |
| 13 | | Plano | | 0.254 | | | | |
| 14 | Image | Plano | | — | | | | |

Note:
Reference Wavelength is 587.6 nm (d-line)

TABLE 31

Aspheric Coefficients

| Surface # | 2 | 3 | 4 | 5 | 6 |
|---|---|---|---|---|---|
| k = | −2.1507E+01 | −2.1945E+00 | −3.9639E+00 | 5.0000E+01 | −1.0000E+00 |
| A4 = | 1.2869E−01 | −3.0420E−01 | −9.5988E−02 | −1.6547E−01 | −4.0087E−01 |
| A6 = | −4.2342E−01 | 2.3683E−01 | 1.4597E−02 | −7.9649E−02 | −5.5343E−02 |
| A8 = | 6.6151E−01 | −6.1435E−01 | 1.8631E−02 | 1.9240E−01 | −1.7538E−01 |
| A10 = | −8.1372E−01 | 6.7602E−01 | −6.4310E−01 | −6.0812E−01 | 6.6666E−01 |
| A12 = | 3.9825E−01 | −3.1277E−01 | 9.2599E−01 | 6.3074E−01 | −3.5774E−01 |
| A14 = | −3.2414E−02 | 1.1884E−01 | −3.3914E−01 | −2.1735E−01 | |

| Surface # | 7 | 8 | 9 | 10 | 11 |
|---|---|---|---|---|---|
| k = | −4.1459E+01 | 2.7399E−01 | −3.3040E+00 | −1.0696E+01 | −4.7645E+00 |
| A4 = | −1.0923E−01 | 7.6372E−02 | −2.1082E−01 | −9.4310E−02 | −7.1577E−02 |
| A6 = | −8.4051E−02 | 7.2151E−02 | 2.1880E−01 | 7.3439E−03 | 2.5892E−02 |
| A8 = | 1.6376E−01 | −2.6194E−01 | −1.7326E−01 | 7.0656E−03 | −7.7141E−03 |
| A10 = | −5.2108E−02 | 2.6011E−01 | 6.7265E−02 | −1.5038E−03 | 1.3259E−03 |
| A12 = | −9.3755E−03 | −1.1086E−01 | 7.2355E−03 | −1.2099E−04 | −1.1852E−04 |
| A14 = | | 1.4421E−02 | −5.4683E−03 | 4.0787E−05 | 3.7385E−06 |

The equation of the aspheric surface profiles of the eleventh embodiment has the same form as that of the first embodiment. Moreover, the description of the factors in the relations is as those set forth in the first embodiment, but the values of the relations of the tenth embodiment are listed in TABLE 32.

TABLE 32

(Embodiment 11)

| f [mm] | 3.04 | (R7 + R8)/(R7 − R8) | 1.94 |
|---|---|---|---|
| Fno | 2.20 | |R10/R9| | 0.22 |
| HFOV [deg.] | 41.7 | f/f1 | −0.250 |
| V2/V3 | 2.35 | Td/ΣCT | 1.28 |
| CT4/f | 0.24 | Dsr4/Dr1r4 | 0.94 |
| (T34 + T45)/CT4 | 0.55 | FOV [deg.] | 83.4 |

Embodiment 12

Figure 12A:
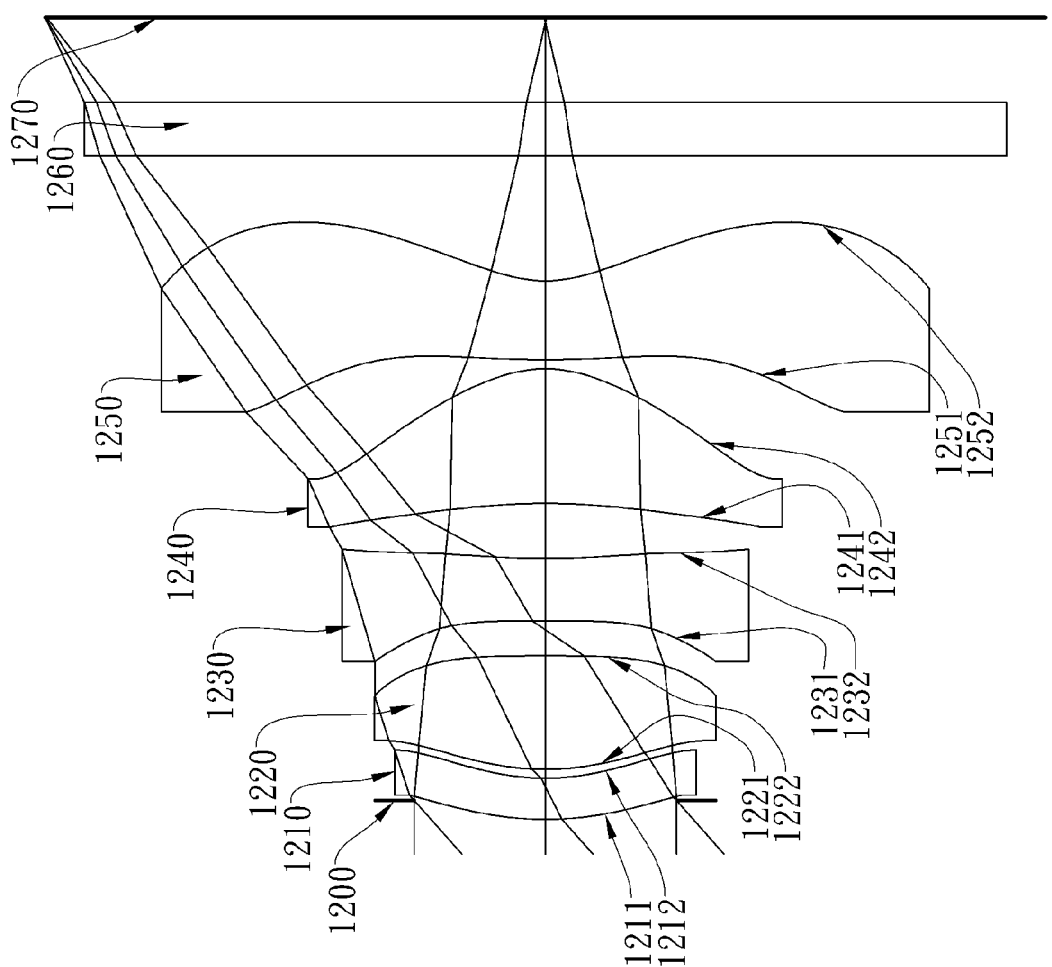
FIG. 12A shows an optical image capturing lens system in accordance with the twelfth embodiment of the present invention.
Figure 12B:
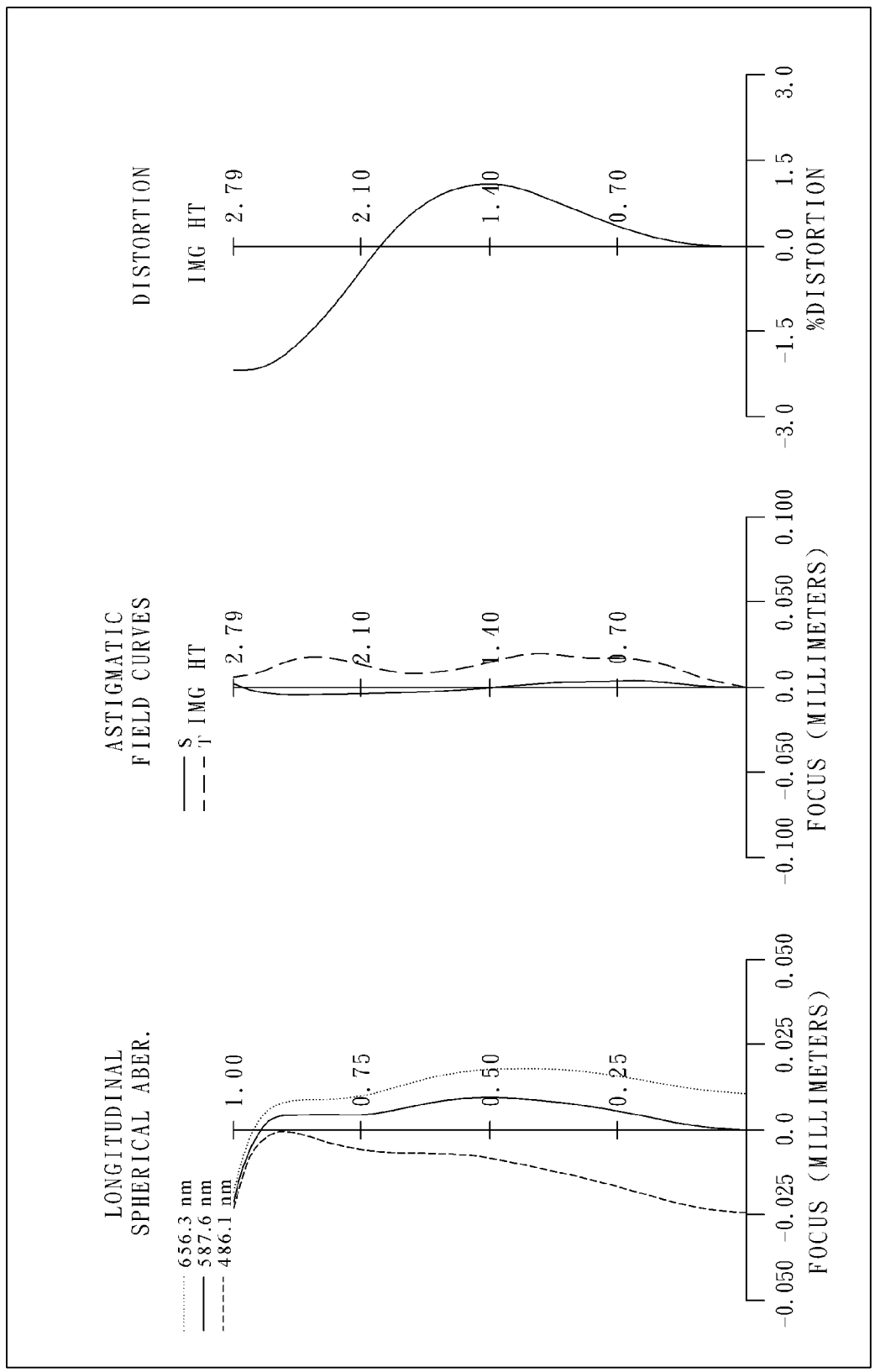
FIG. 12B shows the aberration curves of the twelfth embodiment of the present invention.

FIG. 12A shows an optical image capturing lens system in accordance with the tenth embodiment of the present invention, and FIG. 12B shows the aberration curves of the tenth embodiment of the present invention. The optical image capturing lens system of the tenth embodiment of the present invention mainly comprises five lens elements with refractive power, in order from an object side to an image side:

a glass first lens element 1210 with negative refractive power having a convex object-side surface 1211 at the paraxial region and a concave image-side surface 1212 at the paraxial region, the object-side and image-side surfaces 1211 and 1212 thereof being aspheric;

a plastic second lens element 1220 with positive refractive power having a convex object-side surface 1221 at the paraxial region and a convex image-side surface 1222 at the paraxial region, the object-side and image-side surfaces 1221 and 1222 thereof being aspheric;

a plastic third lens element 1230 with negative refractive power having a convex object-side surface 1231 at the paraxial region and a concave image-side surface 1232 at the paraxial region and convex shape at the peripheral region, the object-side and image-side surfaces 1231 and 1232 thereof being aspheric;

a plastic fourth lens element 1240 with positive refractive power having a concave object-side surface 1241 at the paraxial region and a convex image-side surface 1242 at the paraxial region, the object-side and image-side surfaces 1241 and 1242 thereof being aspheric; and a plastic fifth lens element 1250 with negative refractive power having a convex object-side surface 1251 at the paraxial region and a concave image-side surface 1252 at the paraxial region and convex shape at the peripheral region, the object-side and image-side surfaces 1251 and 1252 thereof being aspheric;

wherein the lens elements of the optical image capturing lens system with refractive power are five lens elements which are the first lens element 1210, the second lens element 1220, the third lens element 1230, the fourth lens element 1240 and the fifth lens element 1250;

wherein an aperture stop 1200 is disposed between an object and the first lens element 1210;

the optical image capturing lens system further comprises an IR filter 1260 disposed between the image-side surface 1252 of the fifth lens element 1250 and an image plane 1270, and the IR filter 1260 is made of glass and has no influence on the focal length of the optical image capturing lens system.

The detailed optical data of the twelfth embodiment is shown in TABLE 33, and the aspheric surface data is shown in TABLE 34, wherein the units of curvature radius, the central thickness and the focal length are expressed in mm, and HFOV is defined as half of the maximal field of view.

TABLE 33

(Embodiment 11)
f = 3.22 mm, Fno = 2.20, HFOV = 41.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.105 | | | | |
| 2 | Lens 1 | 1.707 | ASP | 0.230 | Plastic | 1.542 | 62.9 | −9.91 |
| 3 | | 1.234 | ASP | 0.050 | | | | |
| 4 | Lens 2 | 1.435 | ASP | 0.635 | Plastic | 1.544 | 55.9 | 2.52 |
| 5 | | −25.120 | ASP | 0.194 | | | | |
| 6 | Lens 3 | 32.147 | ASP | 0.350 | Plastic | 1.634 | 23.8 | −7.06 |
| 7 | | 3.914 | ASP | 0.309 | | | | |
| 8 | Lens 4 | −3.659 | ASP | 0.753 | Plastic | 1.544 | 55.9 | 1.44 |
| 9 | | −0.694 | ASP | 0.050 | | | | |
| 10 | Lens 5 | 4.833 | ASP | 0.442 | Plastic | 1.535 | 56.3 | −1.53 |
| 11 | | 0.675 | ASP | 0.700 | | | | |
| 12 | IR-filter | Plano | | 0.300 | Glass | 1.517 | 64.2 | — |
| 13 | | Plano | | 0.473 | | | | |
| 14 | Image | Plano | | — | | | | |

Note:
Reference Wavelength is 587.6 nm (d-line)

TABLE 34

Aspheric Coefficients

| Surface # | 2 | 3 | 4 | 5 | 6 |
|---|---|---|---|---|---|
| k = | −1.3438E+01 | −1.6377E+00 | −3.9236E+00 | −5.0000E+01 | −1.0000E+00 |
| A4 = | 1.8962E−01 | −2.7326E−01 | −5.4267E−02 | −2.2089E−01 | −3.8810E−01 |
| A6 = | −4.3718E−01 | 3.9845E−01 | 6.1122E−02 | −7.4572E−02 | −3.1866E−02 |
| A8 = | 6.7596E−01 | −8.1425E−01 | −9.4529E−03 | 2.4927E−01 | −1.0783E−01 |
| A10 = | −7.8876E−01 | 6.8054E−01 | −7.4291E−01 | −5.2114E−01 | 7.4866E−01 |
| A12 = | 3.9825E−01 | −3.1277E−01 | 9.8129E−01 | 5.6979E−01 | −5.0933E−01 |
| A14 = | −3.2414E−02 | 1.1884E−01 | −3.3914E−01 | −2.5868E−01 | |

| Surface # | 7 | 8 | 9 | 10 | 11 |
|---|---|---|---|---|---|
| k = | −3.3945E+01 | −3.5250E−01 | −3.8853E+00 | −2.6656E+00 | −5.2666E+00 |
| A4 = | −8.8513E−02 | 4.1149E−02 | −1.9774E−01 | −1.2852E−01 | −8.7133E−02 |
| A6 = | −5.1064E−02 | 9.8659E−02 | 2.1930E−01 | 7.1874E−04 | 2.7582E−02 |
| A8 = | 1.5863E−01 | −2.5003E−01 | −1.6975E−01 | 9.8668E−03 | −7.6835E−03 |
| A10 = | −7.3779E−02 | 2.4539E−01 | 6.7535E−02 | −6.4428E−04 | 1.1928E−03 |
| A12 = | 4.6605E−03 | −1.1291E−01 | 6.1182E−03 | −1.2778E−04 | −8.5098E−05 |
| A14 = | | 1.9543E−02 | −6.0160E−03 | −8.7956E−06 | 3.6807E−07 |

The equation of the aspheric surface profiles of the twelfth embodiment has the same form as that of the first embodiment. Moreover, the description of the factors in the relations is as those set forth in the first embodiment, but the values of the relations of the tenth embodiment are listed in TABLE 35.

TABLE 35

(Embodiment 12)

| f [mm] | 3.22 | (R7 + R8)/(R7 − R8) | 1.47 |
|---|---|---|---|
| Fno | 2.20 | |R10/R9| | 0.14 |
| HFOV [deg.] | 41.5 | f/f1 | −0.325 |
| V2/V3 | 2.35 | Td/ΣCT | 1.25 |

TABLE 35-continued (Embodiment 12)

| CT4/f | 0.23 | Dsr4/Dr1r4 | 0.89 |
|---|---|---|---|
| (T34 + T45)/CT4 | 0.48 | FOV [deg.] | 83.1 |

Embodiment 13

Figure 13A:
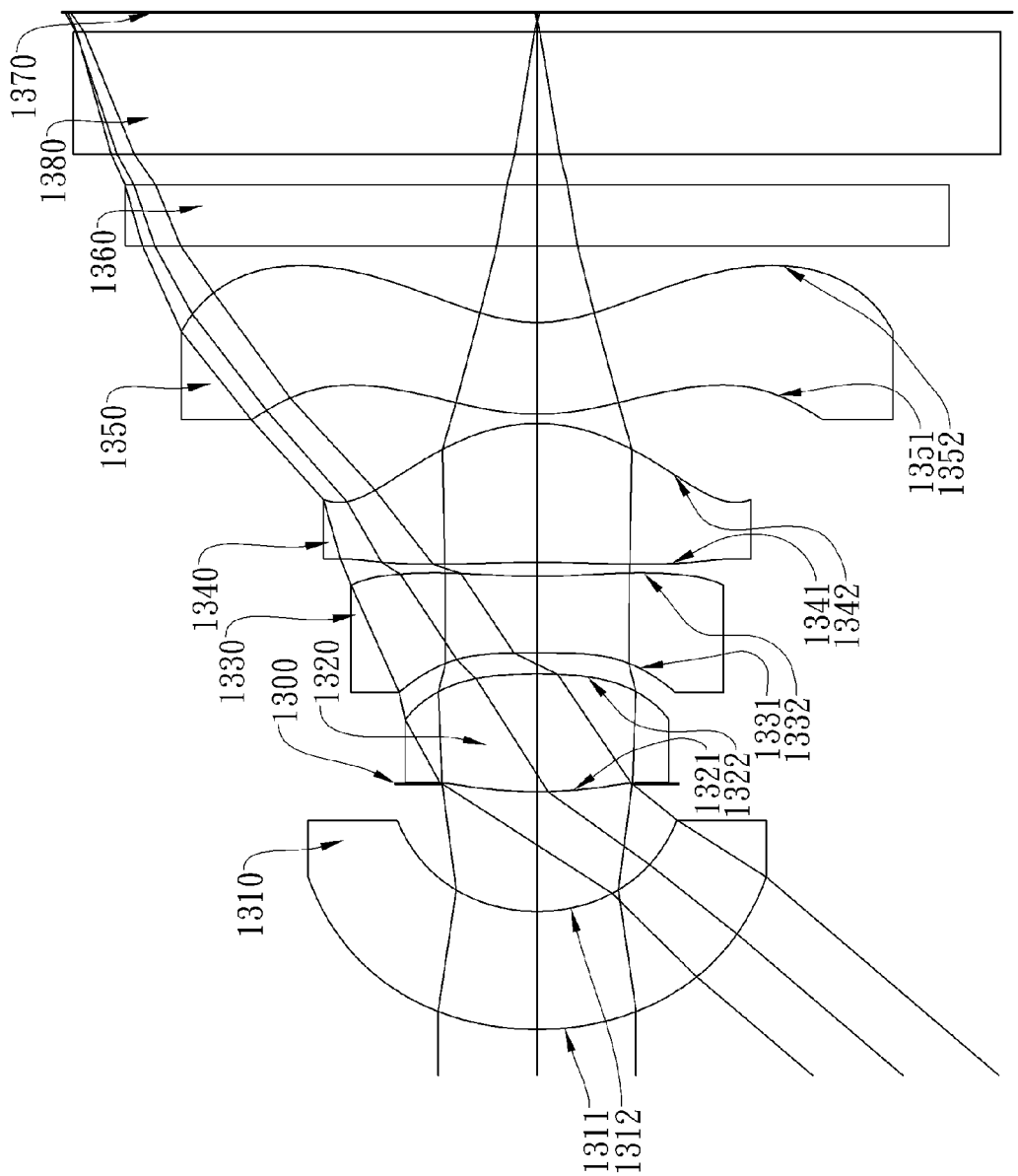
FIG. 13A shows an optical image capturing lens system in accordance with the thirteenth embodiment of the present invention.
Figure 13B:
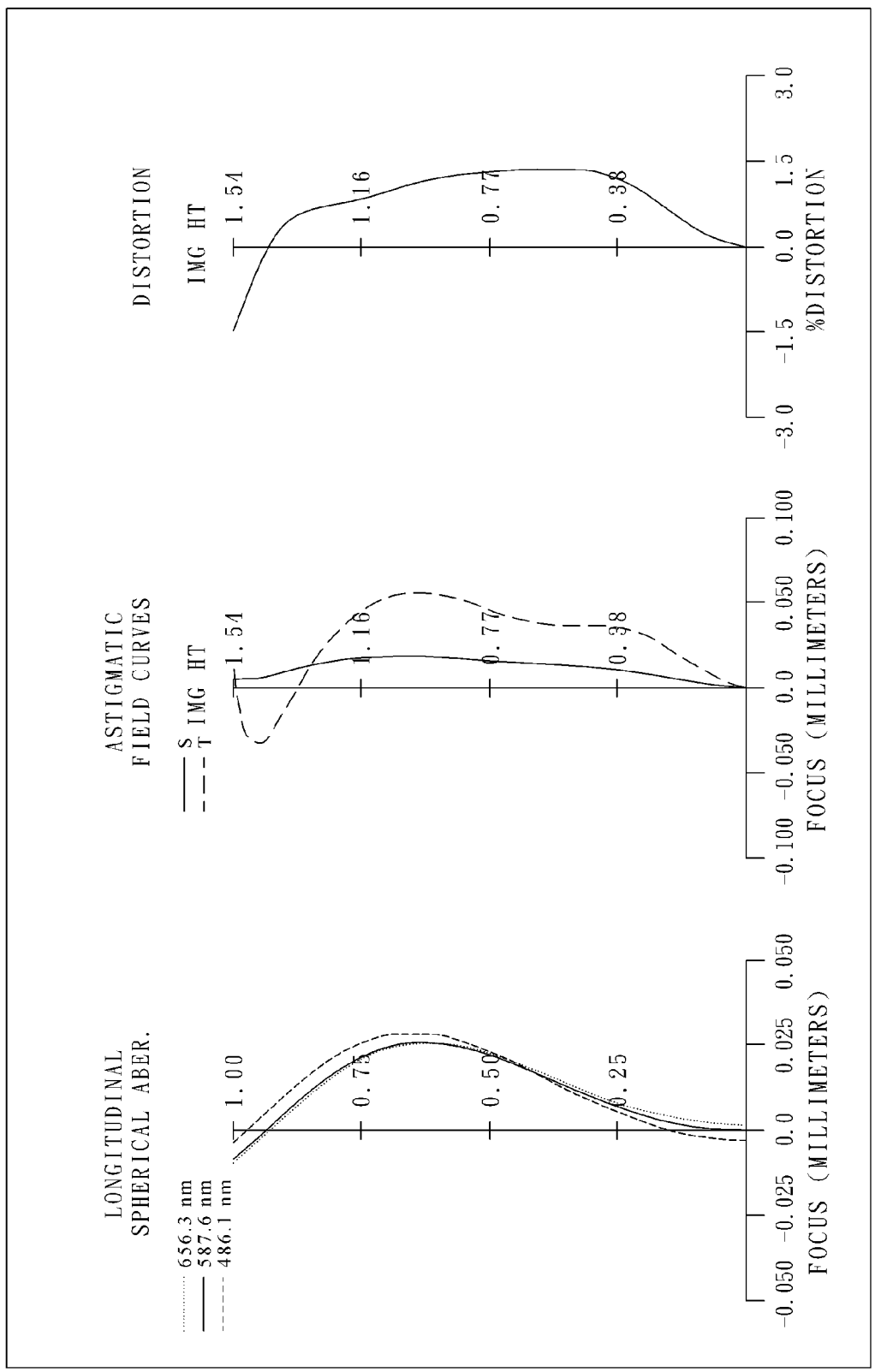
FIG. 13B shows the aberration curves of the thirteenth embodiment of the present invention.

FIG. 13A shows an optical image capturing lens system in accordance with the tenth embodiment of the present invention, and FIG. 13B shows the aberration curves of the tenth embodiment of the present invention. The optical image capturing lens system of the tenth embodiment of the present invention mainly comprises five lens elements with refractive power, in order from an object side to an image side:

a plastic first lens element 1310 with negative refractive power having a convex object-side surface 1311 at the paraxial region and a concave image-side surface 1312 at the paraxial region, the object-side and image-side surfaces 1311 and 1312 thereof being aspheric;

a plastic second lens element 1320 with positive refractive power having a convex object-side surface 1321 at the paraxial region and a convex image-side surface 1322 at the paraxial region, the object-side and image-side surfaces 1321 and 1322 thereof being aspheric;

a plastic third lens element 1330 with negative refractive power having a concave object-side surface 1331 at the paraxial region and a concave image-side surface 1332 at the paraxial region and convex shape at the peripheral region, the object-side and image-side surfaces 1331 and 1332 thereof being aspheric;

a plastic fourth lens element 1340 with positive refractive power having a concave object-side surface 1341 at the paraxial region and a convex image-side surface 1342 at the paraxial region, the object-side and image-side surfaces 1341 and 1342 thereof being aspheric; and a plastic fifth lens element 1350 with negative refractive power having a convex object-side surface 1351 at the paraxial region and a concave image-side surface 1352 at the paraxial region and convex shape at the peripheral region, the object-side and image-side surfaces 1351 and 1352 thereof being aspheric;

wherein the lens elements of the optical image capturing lens system with refractive power are five lens elements which are the first lens element 1310, the second lens element 1320, the third lens element 1330, the fourth lens element 1340 and the fifth lens element 1350;

wherein an aperture stop 1300 is disposed between the first lens element 1310 and the second lens element 1320;

the optical image capturing lens system further comprises an IR filter 1360 and a cover glass 1380 in order disposed between the image-side surface 1352 of the fifth lens element 1350 and an image plane 1370, and the IR filter 1360 and the cover glass 1380 are made of glass and has no influence on the focal length of the optical image capturing lens system.

The detailed optical data of the thirteenth embodiment is shown in TABLE 36, and the aspheric surface data is shown in TABLE 37, wherein the units of curvature radius, the central thickness and the focal length are expressed in mm, and HFOV is defined as half of the maximal field of view.

TABLE 36

(Embodiment 13)
$f = 1.33$ mm, Fno = 2.05, HFOV = 49.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 0.952 | ASP | 0.386 | Plastic | 1.634 | 23.8 | −3.44 |
| 2 | | 0.559 | ASP | 0.417 | | | | |
| 3 | Ape. Stop | Plano | | −0.026 | | | | |
| 4 | Lens 2 | 1.391 | ASP | 0.385 | Plastic | 1.544 | 55.9 | 1.54 |
| 5 | | −1.901 | ASP | 0.069 | | | | |
| 6 | Lens 3 | −12.150 | ASP | 0.250 | Plastic | 1.634 | 23.8 | −2.70 |
| 7 | | 2.012 | ASP | 0.046 | | | | |
| 8 | Lens 4 | −3.750 | ASP | 0.454 | Plastic | 1.544 | 55.9 | 1.11 |
| 9 | | −0.542 | ASP | 0.030 | | | | |
| 10 | Lens 5 | 0.782 | ASP | 0.300 | Plastic | 1.535 | 56.3 | −4.04 |
| 11 | | 0.498 | ASP | 0.250 | | | | |
| 12 | IR-filter | Plano | | 0.200 | Glass | 1.517 | 64.2 | — |
| 13 | | Plano | | 0.100 | | | | |
| 14 | Cover Glass | Plano | | 0.400 | Glass | 1.517 | 64.2 | |
| 15 | | Plano | | 0.063 | | | | |
| 16 | Image | Plano | | — | | | | |

Note:
Reference Wavelength is 587.6 nm (d-line)

TABLE 37

Aspheric Coefficients

| Surface # | 1 | 2 | 4 | 5 | 6 |
|---|---|---|---|---|---|
| k = | −8.2723E−01 | −3.8536E+00 | −8.2586E+00 | 1.6662E+01 | 7.7524E+00 |
| A4 = | 3.4809E−01 | 3.5096E+00 | 3.0566E−01 | −2.8052E+00 | −4.6957E+00 |
| A6 = | −2.8305E−01 | −1.0256E+01 | −8.9168E+00 | 4.4928E+00 | 1.1208E+01 |
| A8 = | 2.3083E+00 | 8.3709E+01 | 8.1800E+01 | −1.8993E−01 | −2.8751E+01 |
| A10 = | −4.5239E+00 | −3.1700E+02 | −4.7317E+02 | −3.1723E+01 | 1.6840E+02 |
| A12 = | 5.1250E+00 | 7.9850E+02 | −3.3583E−06 | −1.7572E−06 | −4.2654E+02 |
| A14 = | 1.8237E−03 | −2.2843E−06 | −2.9076E−06 | −2.9152E−06 | −2.8638E−06 |

| Surface # | 7 | 8 | 9 | 10 | 11 |
|---|---|---|---|---|---|
| k = | −3.8762E+01 | −8.0092E+01 | −1.9871E+00 | −6.7899E−01 | −3.4102E+00 |
| A4 = | −1.2871E+00 | 7.3309E−01 | −3.6917E−01 | −1.6820E+00 | −8.3229E−01 |
| A6 = | 3.9137E+00 | −3.1000E+00 | 4.8631E−01 | 2.4192E+00 | 1.4623E+00 |
| A8 = | −5.7538E+00 | 1.5760E+01 | 3.5242E+00 | −3.3840E+00 | −2.0617E+00 |
| A10 = | −3.5685E−01 | −5.5032E+01 | −4.5300E+00 | 3.0924E+00 | 1.8511E+00 |
| A12 = | −3.1109E−03 | 1.0942E+02 | 3.3794E+00 | −2.2849E+00 | −1.0630E+00 |
| A14 = | | −9.9145E+01 | 1.3347E+01 | 1.5042E+00 | 3.8111E−01 |
| A16 = | | 7.0737E+00 | −2.5651E+01 | −4.7737E−01 | −7.3569E−02 |

The equation of the aspheric surface profiles of the thirteenth embodiment has the same form as that of the first embodiment. Moreover, the description of the factors in the relations is as those set forth in the first embodiment, but the values of the relations of the tenth embodiment are listed in TABLE 38.

TABLE 38

(Embodiment 13)

| f [mm] | 1.33 | (R7 + R8)/(R7 − R8) | 1.34 |
|---|---|---|---|
| Fno | 2.05 | |R10/R9| | 0.64 |
| HFOV [deg.] | 49.5 | f/f1 | −0.386 |
| V2/V3 | 2.35 | Td/ECT | 1.30 |
| CT4/f | 0.34 | Dsr4/Dr1r4 | 0.31 |
| (T34 + T45)/CT4 | 0.17 | FOV [deg.] | 99.1 |

It is to be noted that TABLES 1-38 show different data of the different embodiments; however, the data of the different embodiments are obtained from experiments. Therefore, any optical image capturing lens system of the same structure is considered to be within the scope of the present invention even if it uses different data. The embodiments depicted above and the appended drawings are exemplary and are not intended to limit the scope of the present invention.

What is claimed is:

1. An optical image capturing lens system comprising, in order from an object side to an image side:
    a first lens element with negative refractive power having a convex object-side surface at a paraxial region and a concave image-side surface at the paraxial region;
    a second lens element with positive refractive power;
    a third lens element with negative refractive power;
    a fourth lens element with positive refractive power having a convex image-side surface at the paraxial region;
    a fifth lens element with negative refractive power having a convex object-side surface at the paraxial region as well as a concave at the paraxial region and convex at a peripheral region image-side surface, at least one of an object-side surface and the image-side surface thereof being aspheric, and the fifth lens element is made of plastic; and
    wherein the lens elements of the optical image capturing lens system with refractive power are the first lens element, the second lens element, the third lens element, the fourth lens element and the fifth lens element;
    wherein a focal length of the optical image capturing lens system is f, a focal length of the first lens element is f1, an axial distance between the object-side surface of the first lens element and the image-side surface of the fifth lens element of the optical image capturing lens system is Td, a sum of central thicknesses of all lens elements with refractive power of the optical image capturing lens system is ΣCT, a central thickness of the fourth lens element is CT4, and they satisfy the following relations:

$0.33<f/f1<0$;

$1.0<Td/\Sigma CT<1.33$; and $0.15<CT4/f<0.60$.

2. The optical image capturing lens system according to claim 1, wherein the object-side surface of the second lens element is convex at the paraxial region and the object-side surface of the third lens element is concave or plane at the paraxial region.

3. The optical image capturing lens system according to claim 2, wherein the object-side surface of the fourth lens element is concave at the paraxial region.

4. The optical image capturing lens system according to claim 3, wherein a stop is disposed between the first lens element and the second lens element.

5. The optical image capturing lens system according to claim 3, wherein an Abbe number of the second lens element is V2, an Abbe number of the third lens element is V3, and they satisfy the following relation:

$1.5<V2/V3<3.0$.

6. The optical image capturing lens system according to claim 3, wherein an axial distance between the third lens element and the fourth lens element is T34, an axial distance between the fourth lens element and the fifth lens element is T45, a central thickness of the fourth lens element is CT4, and they preferably satisfy the following relation:

$0.10<(T34+T45)/CT4<0.50$.

7. The optical image capturing lens system according to claim 3, wherein a curvature radius of the object-side surface of the fifth lens element is R9, a curvature radius of the image-side surface of the fifth lens element is R10, and they satisfy the following relations:

$0<|R10/R9|<0.70$.

8. The optical image capturing lens system according to claim 3, wherein the maximal field of view of the optical image capturing lens system is FOV, and it satisfies the following relation:

72 degrees<FOV<95 degrees.

9. The optical image capturing lens system according to claim 1, wherein the axial distance between the object-side surface of the first lens element and the image-side surface of the fifth lens element of the optical image capturing lens system is Td, a sum of central thicknesses of all lens elements with refractive power of the optical image capturing lens system is ΣCT, and they satisfy the following relation:

$1.05<Td/\Sigma CT \leq 1.25$.

10. The optical image capturing lens system according to claim 9, wherein the object-side surface of the third lens element is concave at the peripheral region and the image-side surface of the third lens element is convex at the peripheral region.

11. The optical image capturing lens system according to claim 1, wherein an image-side surface of the third lens element is concave at the paraxial region and convex at the peripheral region.

12. The optical image capturing lens system according to claim 1, wherein a focal length of the optical image capturing lens system is f, a focal length of the first lens element is f1, and they satisfy the following relation:

$-0.25 \leq f/f1<0$.

13. The optical image capturing lens system according to claim 1, wherein the optical image capturing lens system further comprises a stop, an axial distance between the stop and the image-side surface of the second lens element is Dsr4, an axial distance between the object-side surface of the first lens element and the image-side surface of the second lens element is Dr1r4, and they satisfy the following relation:

$0.30<Dsr4/Dr1r4<0.95$.

14. The optical image capturing lens system according to claim 1, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and T23 is the largest axial distance among T12, T23, T34, T45.

15. An optical image capturing lens system comprising, in order from an object side to an image side:
   a first lens element with negative refractive power;
   a second lens element with positive refractive power;
   a third lens element with negative refractive power;
   a fourth lens element with positive refractive power having a convex image-side surface at the paraxial region;
   a fifth lens element with negative refractive power having a concave at the paraxial region and convex at a peripheral region image-side surface, at least one of an object-side surface and the image-side surface thereof being aspheric, and the fifth lens element is made of plastic; and
   wherein the lens elements of the optical image capturing lens system with refractive power are the first lens element, the second lens element, the third lens element, the fourth lens element and the fifth lens element;
   wherein a focal length of the optical image capturing lens system is f, a focal length of the first lens element is f1, an axial distance between the object-side surface of the first lens element and the image-side surface of the fifth lens element of the optical image capturing lens system is Td, a sum of central thicknesses of all lens elements with refractive power of the optical image capturing lens system is ΣCT, a curvature radius of the object-side surface of the fifth lens element is R9, a curvature radius of the image-side surface of the fifth lens element is R10, and they satisfy the following relations:

$-0.33 < f/f1 < 0;$ $1.0 < Td/\Sigma CT < 1.33;$ and $0 < |R10/R9| < 0.70.$

16. The optical image capturing lens system according to claim 15, wherein a curvature radius of the object-side surface of the fourth lens element is R7, a curvature radius of the image-side surface of the fourth lens element is R8, and they satisfy the following relation:

$0.75 < (R7+R8)/(R7-R8) < 2.5.$

17. The optical image capturing lens system according to claim 16, wherein the optical image capturing lens system further comprises a stop, an axial distance between the stop and the image-side surface of the second lens element is Dsr4, an axial distance between the object-side surface of the first lens element and the image-side surface of the second lens element is Dr1r4, and they satisfy the following relation:

$0.30 < Dsr4/Dr1r4 < 0.95.$

18. The optical image capturing lens system according to claim 16, wherein a focal length of the optical image capturing lens system is f, a focal length of the first lens element is f1, and they satisfy the following relation:

$-0.25 \leq f/f1 < 0.$

19. The optical image capturing lens system according to claim 16, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and T23 is the largest axial distance among T12, T23, T34, T45.

20. The optical image capturing lens system according to claim 15, wherein the axial distance between the object-side surface of the first lens element and the image-side surface of the fifth lens element of the optical image capturing lens system is Td, a sum of central thicknesses of all lens elements with refractive power of the optical image capturing lens system is ΣCT, and they satisfy the following relation:

$1.05 < Td/\Sigma CT \leq 1.25.$

21. The optical image capturing lens system according to claim 20, wherein an Abbe number of the second lens element is V2, an Abbe number of the third lens element is V3, and they satisfy the following relation:

$1.5 < V2/V3 < 3.0.$

22. The optical image capturing lens system according to claim 20, wherein the object-side surface of the first lens element at the paraxial region is convex and the image-side surface of the first lens element at the paraxial region is concave.

23. The optical image capturing lens system according to claim 20, wherein the maximal field of view of the optical image capturing lens system is FOV, and it satisfies the following relation:

72 degrees<FOV<95 degrees.

24. The optical image capturing lens system according to claim 20, wherein an image-side surface of the third lens element is concave at the paraxial region and convex at the peripheral region.

25. An optical image capturing lens system comprising, in order from an object side to an image side:
   a first lens element with negative refractive power having a convex object-side surface at a paraxial region and a concave image-side surface at the paraxial region;
   a second lens element with positive refractive power having a convex object-side surface at the paraxial region;
   a third lens element with negative refractive power having a concave or plane object-side surface at the paraxial region, both of the object-side and the image-side surfaces thereof being aspheric, and the third lens element is made of plastic;
   a fourth lens element with positive refractive power having a concave object-side surface at the paraxial region and a convex image-side surface at the paraxial region, both of the object-side and the image-side surfaces thereof being aspheric, and the fourth lens element is made of plastic;
   a fifth lens element with negative refractive power having a convex object-side surface at the paraxial region as well as a concave at the paraxial region and convex at a peripheral region image-side surface, both of the object-side and the image-side surfaces thereof being aspheric, and the fifth lens element is made of plastic; and
   wherein the lens elements of the optical image capturing lens system with refractive power are the first lens element, the second lens element, the third lens element, the fourth lens element and the fifth lens element; and the optical image capturing lens system further comprises a stop disposed between an object and the second lens element;
   wherein a focal length of the optical image capturing lens system is f, a focal length of the first lens element is f1, an axial distance between the object-side surface of the first lens element and the image-side surface of the fifth lens element of the optical image capturing lens system is Td, a sum of central thicknesses of all lens elements with refractive power of the optical image capturing lens system is ΣCT, a central thickness of the fourth lens element is CT4, and they satisfy the following relations:

$-0.45 < f/f1 < 0$; and $1.0 < Td/\Sigma CT < 1.33$.

26. The optical image capturing lens system according to claim 25, wherein an image-side surface of the third lens element is concave at the paraxial region and convex at the peripheral region.

27. The optical image capturing lens system according to claim 25, wherein the optical image capturing lens system further comprises a stop, an axial distance between the stop and the image-side surface of the second lens element is Dsr4, an axial distance between the object-side surface of the first lens element and the image-side surface of the second lens element is Dr1r4, and they satisfy the following relation:

$0.30 < Dsr4/Dr1r4 < 0.95$.

28. The optical image capturing lens system according to claim 25, wherein the axial distance between the object-side surface of the first lens element and the image-side surface of the fifth lens element of the optical image capturing lens system is Td, the sum of central thicknesses of all lens elements with refractive power of the optical image capturing lens system is ΣCT, and they satisfy the following relation:

$1.05 < Td/\Sigma CT \leq 1.25$.

29. The optical image capturing lens system according to claim 25, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and T23 is the largest axial distance among T12, T23, T34, T45.

30. The optical image capturing lens system according to claim 25, wherein a curvature radius of the object-side surface of the fifth lens element is R9, a curvature radius of the image-side surface of the fifth lens element is R10, and they satisfy the following relation:

$0 < |R10/R9| < 0.70$.

* * * * *

UNITED STATES PATENT AND TRADEMARK OFFICE
CERTIFICATE OF CORRECTION

| | |
|---|---|
| PATENT NO. | : 8,649,113 B1 |
| APPLICATION NO. | : 13/612201 |
| DATED | : February 11, 2014 |
| INVENTOR(S) | : Tsung-Han Tsai |

Page 1 of 1

It is certified that error appears in the above-identified patent and that said Letters Patent is hereby corrected as shown below:

In the Claims

Column 43, Claim 1, Line 57, the left-hand formula should appear as follows:

$-0.33 < f/f1 < 0;$

Signed and Sealed this
Twenty-third Day of December, 2014

Michelle K. Lee
*Deputy Director of the United States Patent and Trademark Office*